United States Patent [19]

Nakaya et al.

[11] Patent Number: 5,585,856
[45] Date of Patent: Dec. 17, 1996

[54] IMAGE PROCESSING APPARATUS THAT CAN PROVIDE IMAGE DATA OF HIGH QUALITY WITHOUT DETERIORATION IN PICTURE QUALITY

[75] Inventors: Mitsuyoshi Nakaya; Atsushi Okada, both of Nara; Kazuhiko Fukui; Yasushi Yasuda, both of Osaka, all of Japan

[73] Assignee: Sharp Kabushiki Kaisha, Osaka, Japan

[21] Appl. No.: 329,339

[22] Filed: Oct. 26, 1994

[30] Foreign Application Priority Data

| | | | |
|---|---|---|---|
| Oct. 27, 1993 | [JP] | Japan | 5-268608 |
| Feb. 1, 1994 | [JP] | Japan | 6-010401 |
| Apr. 20, 1994 | [JP] | Japan | 6-081162 |
| Aug. 10, 1994 | [JP] | Japan | 6-188116 |
| Sep. 26, 1994 | [JP] | Japan | 6-229941 |
| Sep. 26, 1994 | [JP] | Japan | 6-229942 |

[51] Int. Cl.$^6$ ................................. H04N 7/01
[52] U.S. Cl. ........................................ 348/441
[58] Field of Search .................... 348/441, 443–446, 348/448, 450–454; 345/132, 154; H04N 7/01

[56] References Cited

U.S. PATENT DOCUMENTS

| | | | |
|---|---|---|---|
| 4,872,054 | 10/1989 | Gray et al. | 348/441 |
| 5,294,984 | 3/1994 | Mori et al. | 348/441 |
| 5,309,227 | 5/1994 | Inoue | 348/441 |
| 5,327,235 | 7/1994 | Richards | 348/441 |
| 5,453,292 | 9/1995 | Gifford | 348/441 |

FOREIGN PATENT DOCUMENTS

| | | |
|---|---|---|
| 0329189 | 2/1989 | European Pat. Off. . |
| WO9110320 | 7/1991 | European Pat. Off. . |
| 0575769A2 | 5/1993 | European Pat. Off. . |
| 4-185087 | 7/1992 | Japan . |
| 4-229789 | 8/1992 | Japan . |
| 5-68241 | 3/1993 | Japan . |

*Primary Examiner*—Victor R. Kostak

[57] ABSTRACT

Digital image data obtained by A/D converting an output signal from an image sensing device by an A/D conversion circuit is converted into image data corresponding to a predetermined image format by a digital process of an image conversion circuit. Therefore, an image of higher quality without deterioration in the picture can be provided in comparison with the case where digital image data obtained by A/D converting an output signal from an image sensing device is first converted into analog video data and then into A/D data. Further format conversion can be performed using a series of controllable image converters. The image converters and a signal processing unit can be selectively programmed to perform a variety of format conversions and image-type specific signal processing, respectively. Programming can be performed manually or automatically according to the type of input device or the type of information in the image.

21 Claims, 40 Drawing Sheets

IMAGE PROCESSING APPARATUS THAT CAN PROVIDE IMAGE DATA OF HIGH QUALITY WITHOUT DETERIORATION IN PICTURE QUALITY

BACKGROUND OF THE INVENTION

1. Field of the Invention

The present invention relates to image processing apparatuses, and more particularly, to an image processing apparatus suitable for computer systems such as a personal computer and a work station, domestic information terminals such as a HA (Home Automation) system and portable information terminals, and also communication systems of television telephones and television conferences.

2. Description of the Background Art

A conventional image processing apparatus compresses image data by converting a video signal from a video movie camera or the like into an intermediate format called a CIF (Common Intermediate Format). The compressed image data is transmitted via a telephone line.

Such an image processing apparatus will be described hereinafter with reference to FIG. 71 showing a structure of a conventional image processing apparatus.

Referring to FIG. 71, an image processing apparatus includes a video movie 201, an A/D converter 202, a luminance signal processing circuit 203, a color signal processing circuit 204, an image conversion circuit 205, and a frame memory 206.

An analog video signal or a YC separation signal from video movie 201 is converted into a digital video signal by A/D converter 202. Digital luminance signal Y and digital color signal C of the digital video signal are processed by luminance signal processing circuit 203 and color signal processing circuit 204, respectively, to be provided to image conversion circuit 205. The digital video signals processed by each of processing circuits 203 and 204 are stored in frame memory 206 via image conversion circuit 205. Image conversion circuit 205 reads out the digital video signal stored in frame memory 206 to convert the same into a CIF format by applying frame frequency conversion, line conversion, and pixel conversion thereto. Such a conventional image processing apparatus is disclosed in for example, Japanese Patent Laying-Open Nos. 4-229789 and 4-185087.

Because such a conventional image processing apparatus has to carry out complicated frame frequency conversion, pixel conversion, and line conversion, the circuit complexity thereof is increased. An additional complexity is that a frame memory is required. Furthermore, when an arbitrary image format conversion is to be carried out, the storage capacity required for the frame memory is increased, resulting in even greater circuit complexity. When compressed image data is to be generated by skipping image data, the converted image is reduced in size, and there is a possibility of distortion in the resulting image.

SUMMARY OF THE INVENTION

An object of the present invention is to provide an image processing apparatus that can provide high quality image data without increasing memory capacity and circuit complexity.

An image processing apparatus according to an aspect of the present invention includes an image signal output unit for converting image sensed light incident from an object into a digital image signal and outputting the image signal, a signal processing circuit for applying signal processing on the digital image signal to output a digital video signal, and a conversion circuit for converting the digital video signal into image data corresponding to a predetermined image format.

According to the above-described structure, image sensed light incident from an object is directly converted into a digital image signal, the converted digital image signal is subjected to signal processing to be converted into a digital video signal, and then further converted into image data corresponding to a predetermined image format. Therefore, the memory capacity and the circuit complexity are not increased, and image data of high quality can be output.

An image processing apparatus according to another aspect of the present invention includes: an image signal output unit for converting image sensed light incident from an object into a digital image signal and outputting the same; a memory for storing program data corresponding to a predetermined video system; and a signal processing logic circuit that can have an arbitrary logic programmed therein. The signal processing logic circuit has a predetermined logic programmed according to program data stored in the memory, and converts a digital image signal into a digital video signal of a predetermined video system.

According to the above-described structure, an arbitrary logic can be programmed in a signal processing logic circuit, and a digital image signal can be converted into a digital video signal corresponding to a desired video system to be output. As a result, the storage capacity and the circuit complexity are not increased, and image data of high quality can be output.

An image processing apparatus according to a further aspect of the present invention includes: an image signal output unit for converting image sensed light incident from an object into a digital image signal to output the same; an input unit for applying program data corresponding to a predetermined video system input from an external device into a main body of the apparatus; and a signal processing logic circuit that can have an arbitrary logic programmed. The signal processing logic circuit has a predetermined logic programmed according to program data input from an external device via the input unit, and a digital image signal is converted into a digital video signal corresponding to the predetermined video system to be output.

According to the above-described structure, an arbitrary logic can be programmed in a signal processing logic circuit from an external device, and a digital image signal is converted into a digital video signal according to a desired video system to be output. As a result, image data of high quality can be output without increasing storage capacity and circuit complexity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

An image processing apparatus according to a first embodiment of the present invention will be described hereinafter.

Figure 1:
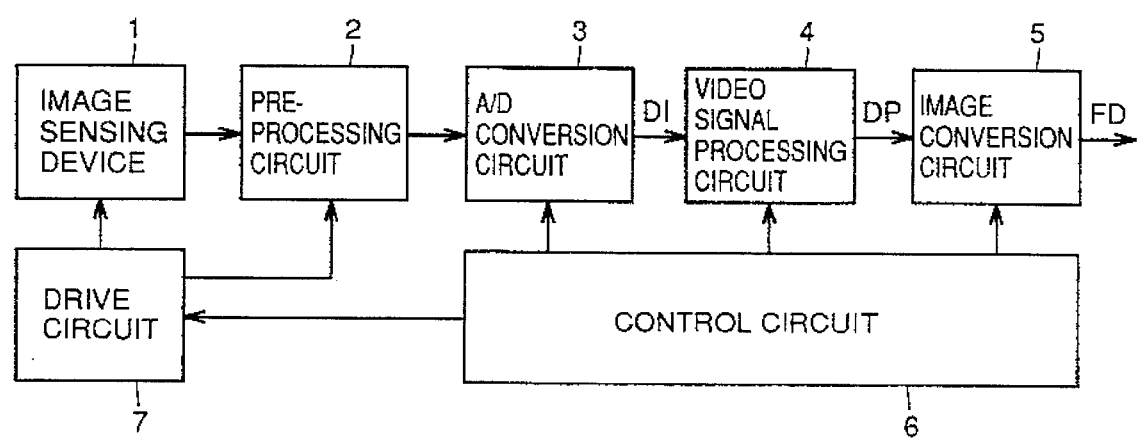
FIG. 1 is a block diagram showing a structure of an image processing apparatus according to a first embodiment of the present invention.

Referring to FIG. 1, an image processing apparatus includes an image sensing device 1, a pre-processing circuit 2, an A/D conversion circuit 3, a video signal processing circuit 4, an image conversion circuit 5, a control circuit 6, and a drive circuit 7.

Image sensing device 1 converts image sensed light captured by an internal lens (not shown) into an electrical signal. Pre-processing circuit 2 sample-holds a signal output from image sensing device 1 and applies a process such as automatic gain control (AGC) on the sample-held output signal. A/D conversion circuit 3 converts an output signal of pre-processing circuit 2 into digital data in the units of pixels, and provides a digital image signal DI.

Video signal processing circuit 4 generates a luminance signal Y, and color signals R-Y, B-Y on the basis of a digital image signal DI output from A/D conversion circuit 3, and provides the same as a digital video signal DP. Here, video signal processing circuit 4 carries out white balance process, gamma correction, and the like, whereby luminance signal Y and color signals R-Y and B-Y are output as digital signals. Here, the color signals are output as dot sequential color difference of R-Y/B-Y.

Drive circuit 7 generates a pulse such as a drive timing pulse, a video signal synchronizing pulse, and a video signal processing pulse to control the operation of image sensing device 1. Control circuit 6 controls the operation of A/D conversion circuit 3, video signal processing circuit 4, image conversion circuit 5, and drive circuit 7. Image conversion circuit 5 converts luminance signal Y and color signals R-Y and B-Y output from video signal processing circuit 4 into image data FD of a screen size specified by control circuit 6 which is output to an external source. The screen size is externally input into control circuit 6.

A circuit that carries out conversion into a CIF format will be described in detail hereinafter as an image conversion circuit. A CIF format is a common video signal format on the basis of video codec intercommunication conforming to the coding system employed in H.261 or the like. A luminance sample of a CIF format is arranged in an orthogonal grid array with 352 pixels per line and 288 lines per frame. Each sample of the two color difference components are arranged in an orthogonal grid array with 176 pixels per line and 144 lines per frame. The above-described image region has an aspect ratio of 4:3, and matches the valid screen of a standard television signal. The number of frames per second is 30.

A CIF format conversion will be described hereinafter using an image sensing device of 320000 pixels. Here, the number of pixels of the image sensing device is 512(H)×582(V).

According to control circuit 6 and drive circuit 7, a non-interlaced read out electrical signal is output from image sensing device 1. This electrical signal is converted into a digital video signal DP by pre-processing circuit 2, A/D conversion circuit 3, and video signal processing circuit 4, whereby luminance data and color data (dot sequential color difference) of 512(H)×291(V) pixels are obtained. Image conversion circuit 5 generates image data FD of 352(H)×288(V) pixels corresponding to a CIF format according to the obtained luminance data and color data.

Figure 2:
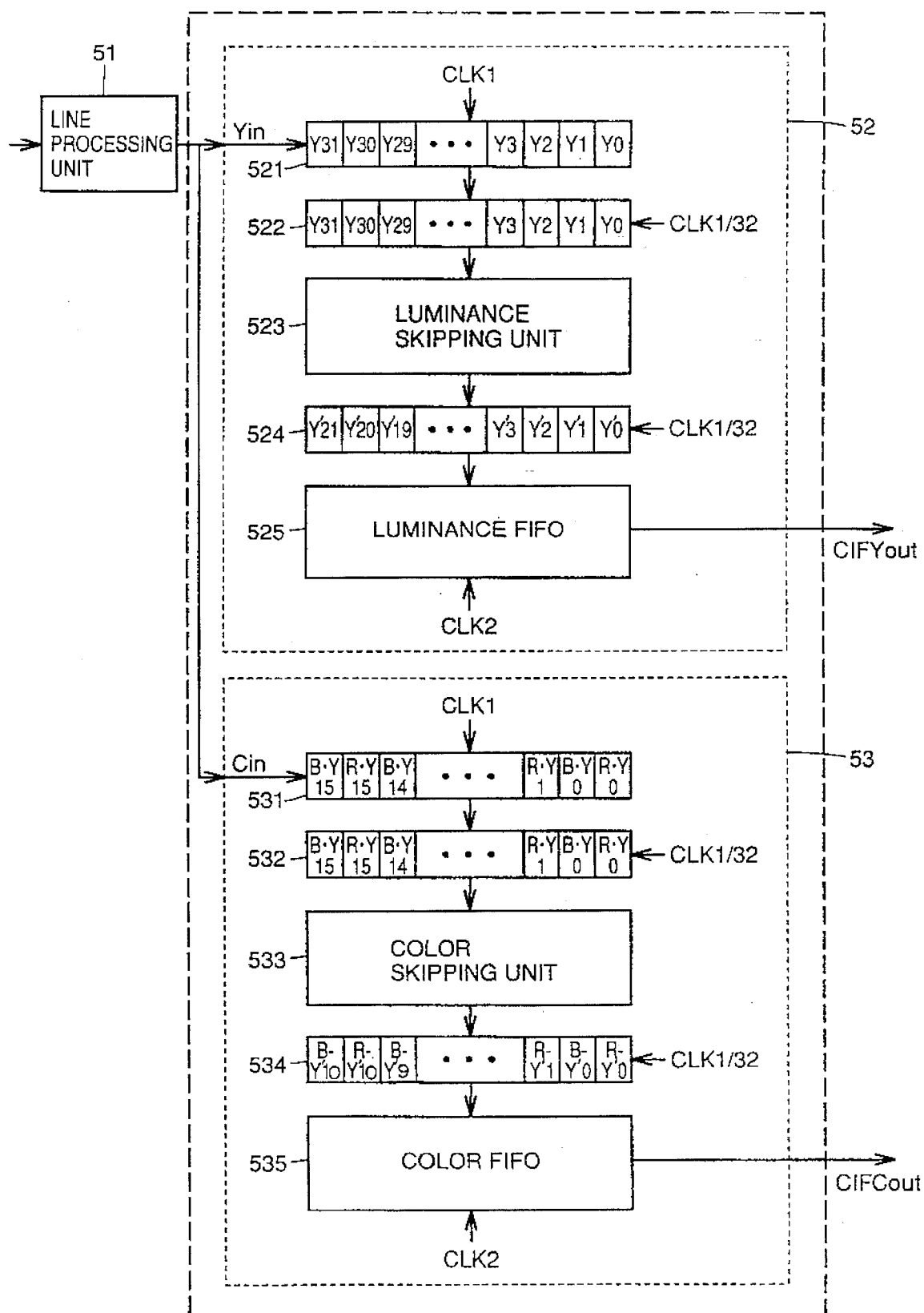
FIG. 2 is a block diagram showing a structure of a first specific example of the image conversion circuit of FIG. 1.

The above image conversion circuit will be described in detail with reference to FIG. 2. Referring to FIG. 2, an image conversion circuit includes a line processing unit 51, a horizontal luminance processing unit 52, and a horizontal color processing unit 53. Horizontal luminance processing unit 52 includes a shift circuit 521, a luminance memory circuit 522, a luminance skipping unit 523, a luminance buffer circuit 524, and a luminance FIFO (First-In and First-Out) 525. Horizontal color processing unit 53 includes a shift circuit 531, a color memory circuit 532, a color skipping unit 533, a color buffer circuit 534, and a color FIFO 535.

First, line processing unit 51 dicards 3 lines of data from the luminance data and the color data of 291 lines to result in data of 288 lines. This conversion can be realized by, for example, providing an internal counter to count a line synchronizing signal, and making valid only data of 288 lines.

Then, for each of the 288 lines of image data output from line processing unit 51, a skipping process in the horizontal direction is carried out for each line. More specifically, the luminance data is converted from 512 pixels to 352 pixels, and each color data is converted from 256 pixels to 176 pixels.

As to this conversion process, first the operation of horizontal luminance processing unit 52 will be described. Here, luminance data Yin is applied to a skipping process for every 32 pixels to generate data of 22 pixels. First, an input luminance data Yin is shifted by 1 clock by shift circuit 521 in synchronization with a clock CLK1. When 32 pixels are shifted, the shifted luminance data Yin is stored into luminance memory circuit 522 in synchronization with a clock CLK1/32. Luminance skipping unit 523 converts luminance data Y0–Y31 of 32 pixels into luminance data Y'0–Y'21 of 22 pixels as set forth in the following.

Y'0=Y0
Y'1=Y1+Y2
Y'2=Y3
Y'3=Y4+Y5
Y'4=Y6
Y'5=Y7+Y8
Y'6=Y8+Y9
Y'7=Y10+Y11
Y'8=Y11+Y12

Y'9=Y13
Y'10=Y14+Y15
Y'11=Y16
Y'12=Y17+Y18
Y'13=Y19
Y'14=Y20+Y21
Y'15=Y22
Y'16=Y23+Y24
Y'17=Y24+Y25
Y'18=Y26+Y27
Y'19=Y27+Y28
Y'20=Y29
Y'21=Y30+Y31

By carrying the above-described conversion operation 16 times, the pixels are converted from 512 pixels to 352 pixels, resulting in a skipping process for 1 line. By carrying this operation for the 288 lines, image data corresponding to a CIF format can be obtained.

The converted luminance data Y'0–Y'21 are stored into luminance buffer circuit 524 in synchronization with a clock CLK1/32. Then, luminance data Y'0–Y'21 are transferred to luminance FIFO 525, and then externally output as luminance data CIFYout in synchronization with a transfer clock CLK2.

Color data are also processed by horizontal color processing unit 53 in parallel to the above-described process. Color data R-Y and B-Y input from line processing unit 51 are respectively shifted by 16 pixels by shift circuit 531. The color data is stored into color memory circuit 532 in synchronization with clock CLK1/32. The stored color data R-Y0–R-Y15 and B-Y0–B-Y15 are converted into color data R-Y'0–R-Y'10 and B-Y'0–B-Y'10 according to the following skipping process, similar to luminance signal, by color skipping unit 533.

(R-Y'0)=R-Y0

(R-Y'1)=R-Y2

(R-Y'2)=R-Y3

(R-Y'3)=R-Y4

(R-Y'4)=R-Y6

(R-Y'5)=R-Y7

(R-Y'6)=R-Y9

(R-Y'7)=R-Y10

(R-Y'8)=R-Y12

(R-Y'9)=R-Y13

(R-Y'10)=R-Y15

(B-Y'0)=B-Y0

(B-Y'1)=B-Y2

(B-Y'2)=B-Y3

(B-Y'3)=B-Y4

(B-Y'4)=B-Y6

(B-Y'5)=B-Y7

(B-Y'6)=B-Y9

(B-Y'7)=B-Y10

(B-Y'8)=B-Y12

(B-Y'9)=B-Y13

(B-Y'10)=B-Y15

By carrying out the above-described conversion operation 16 times, the data is converted from 256 pixels into 176 pixels, resulting in a skipping process of 1 line. This conversion operation is carried out only for the 256 pixels. By carrying out the above-described operation for the 288 lines, an image size corresponding to a CIF format is obtained.

The converted color data R-Y'0–R-Y'10 and B-Y'0–B-Y'10 are stored into color buffer circuit 534 in synchronization with clock CLK 1/32. Then, color data R-Y'0–R-Y'10 and B-Y'0–B-Y'10 are transferred to color FIFO 535, and then externally output as color data CIFCout in synchronization with transfer clock CLK2.

The luminance data and the color data processed as described above are output for every 1 line as a data pair. Thus, image conversion data corresponding to an externally specified format, for example a CIF format, can be output.

An image processing apparatus according to a second embodiment of the present invention will be described hereinafter.

Figure 3:
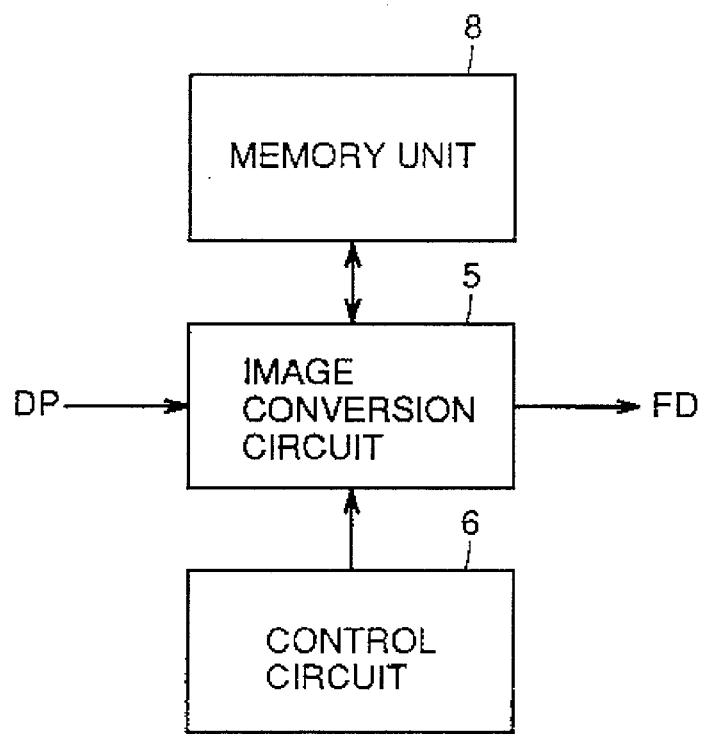
FIGS. 3 and 4 are block diagrams showing a structure of the main components of an image processing apparatus according to a second embodiment and a third embodiment, respectively, of the present invention.

Referring to FIG. 3, the image processing apparatus of the second embodiment has a memory 8 added in image conversion circuit 5. Memory 8 stores field data (digital video data) output from video signal processing circuit 4. In the above-described first embodiment, image data is processed for every 1 field (odd number field or even number field), so that only ½ vertical lines of 1 frame can be obtained in a non-interlace process. The second embodiment has interlaced input image data converted into non-interlaced image data, whereby image conversion circuit 5 converts the same into an externally specified image format. As a result, a maximum number of vertical lines of 1 frame can be obtained. The conversion process of the image format is similar to that of the first embodiment.

Figure 4:
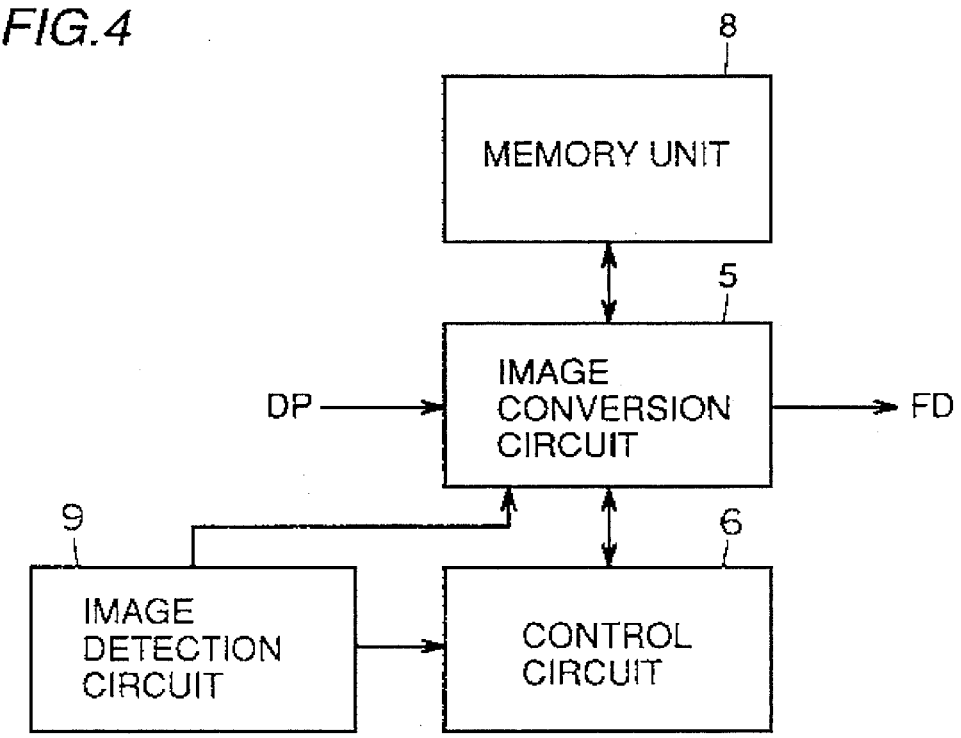

An image processing apparatus according to a third embodiment of the present invention will be described hereinafter with reference to FIG. 4. The image processing apparatus of the third embodiment includes an image detection circuit 9 in addition to the structure of the second embodiment. Memory 8 stores video data. Image detection circuit 9 is a circuit for detecting a feature of the image of the video data applied from video signal processing circuit 4. For example, determination is made whether the image is mainly of a person, text, or whether it is a still picture or a moving picture. In the third embodiment, image conversion circuit 5 selects a predetermined image conversion method according to the determination result of image detection circuit 9.

Figure 5:
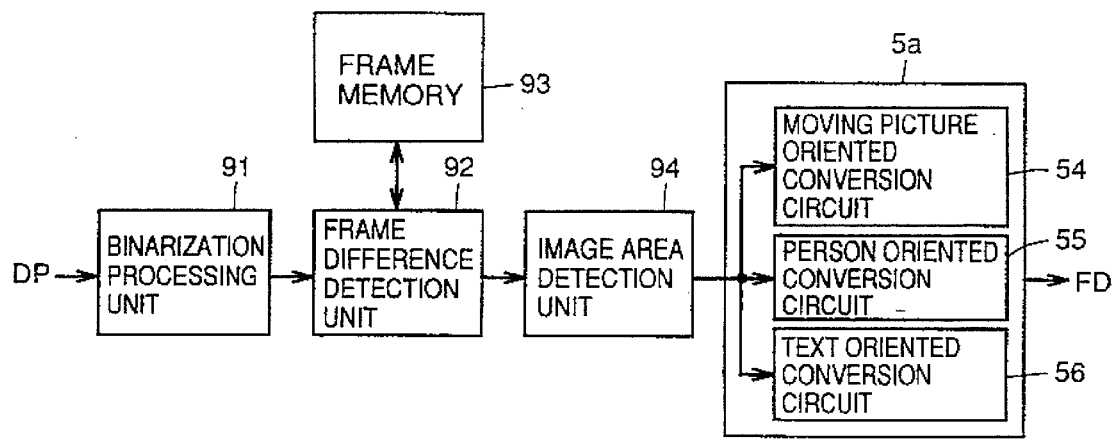
FIG. 5 is a block diagram showing a specific structure of the main components of the image processing apparatus of FIG. 4.

A specific structure of the main components of the image processing apparatus shown in FIG. 4 will be described hereinafter. Referring to FIG. 5, the image processing apparatus includes a binarization processing circuit 91, a frame difference detection unit 92, a frame memory 93, an image area detection unit 94, and an image conversion circuit 5a. Image conversion circuit 5a includes a moving picture oriented conversion circuit 54, a person oriented conversion circuit 55, and a text oriented conversion circuit 56.

Binarization processing unit 91 converts the luminance data of the Nth frame applied from video signal processing circuit 4 into binary data. The binarized data of the Nth frame is stored in frame memory 93 via frame difference detection unit 92. Frame difference detection unit 92 compares the binary data of the Nth frame stored in frame memory 93 and the subsequent input binary data of the (N+1)th frame. By this comparison, frame difference detection unit 92 detects whether there is movement between the frames. Next, binary data of the (N+1)th frame is stored into frame memory 93. Then, the above-described operation is sequentially carried out. Frame difference detection unit 92 determines whether there is movement in the input image. Determination is made by frame difference detection unit 92 that the image is a moving picture when there is movement, and a still picture when there is no movement.

Image area detection unit 94 calculates the occupying area of the image on the basis of the binary data output from frame difference detection unit 92. Determination is made by image area detection unit 94 that the data is image data mainly of a person when there is a large image portion with respect to the image data of 1 frame. In contrast, if the image portion is small, determination is made that it is text data. In the case of a moving picture, the area detection process is not carried out, and determination is directly made of a moving picture data.

The determination carried out by image area detection unit 94 is based on calculating the ratio of black data to white data in 1 frame using binary data of 1 frame binarized into either white or black. When black is great, a process is carried out on the assumption that it is image data mainly of a person. When white is great, a process is carried out on the assumption that it is image data mainly of text.

Image area detection unit 94 applies the image data into moving picture oriented conversion circuit 54 of image conversion circuit 5a when determination is made of a moving image according to the above-described process. When determination is made of a still picture of a person, the image data is input into person oriented conversion circuit 55 in image conversion circuit 5a. The image data is applied to text oriented conversion circuit 56 in image conversion circuit 5a when determination is made that the image is a still picture and text image. Thus, the feature of the input image data is detected, and an image format conversion process, a filtering process, or the like is selected according to the determination result. Thus, an optimum image format conversion process is realized.

Figure 6:
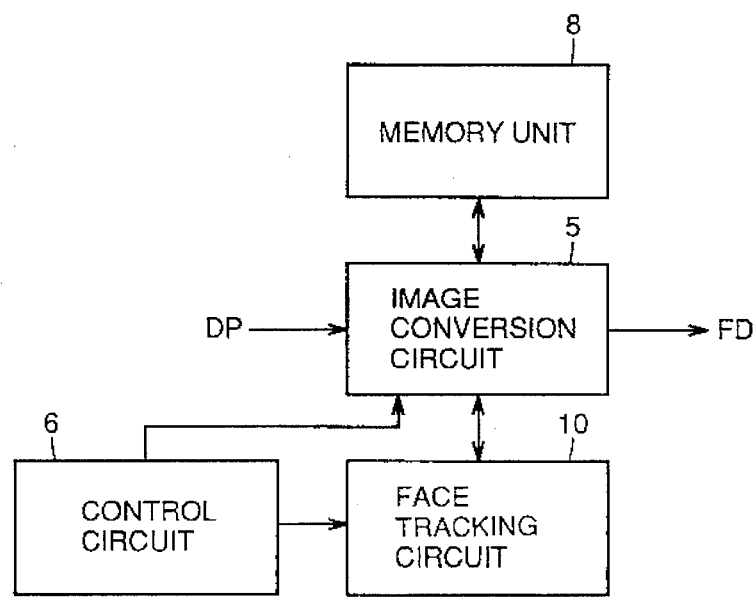
FIG. 6 is a block diagram showing a structure of the main components of an image processing apparatus according to a fourth embodiment of the present invention.

A structure of the main components of an image processing apparatus according to a fourth embodiment of the present invention will be described hereinafter with reference to FIG. 6. The image processing apparatus according to the fourth embodiment includes a face tracking circuit 10 instead of image detection circuit 9 of the third embodiment. The image data provided from video signal processing circuit 4 is applied to face tracking circuit 10 via image conversion circuit 5. Face tracking circuit 10 extracts the face of a person according to the input image data. Image conversion circuit 5 generates image data of a screen size corresponding to an externally specified format, for example a CIF format, with the position of the extracted face as the center.

By such a process, an image of a face that is reduced in distortion can be transmitted effectively by conversion in the case where image data mainly of a person is transferred such as on the screen of a television telephone or television conference.

Figure 7:
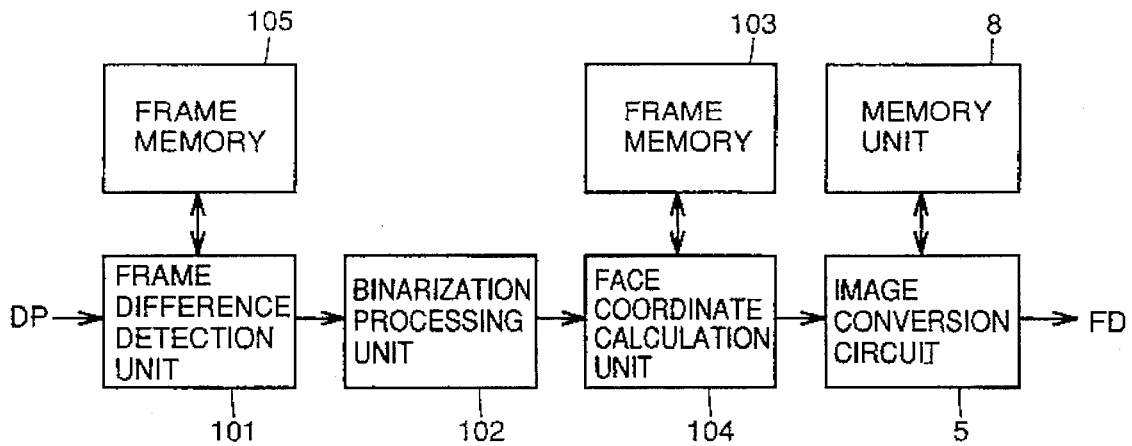
FIG. 7 is a block diagram showing a specific structure of the main components of the image processing apparatus of FIG. 6.

A specific structure of the main component of the image processing circuit of FIG. 7 will be described. Referring to FIG. 7, the image processing apparatus includes a frame difference detection unit 101, a binarization processing unit 102, frame memories 103 and 105, a face coordinate calculation unit 104, an image conversion circuit 5, and a memory 8.

Digital video data DP input from video signal processing circuit 4 is applied to frame difference detection unit 101. Frame difference detection unit 101 compares the image data stored in frame memory 105 and the image data applied at the next 1 frame to detect the difference thereof. Frame difference detection unit 101 detects the edge of the moving portion of the image according to the difference thereof.

Figure 8:
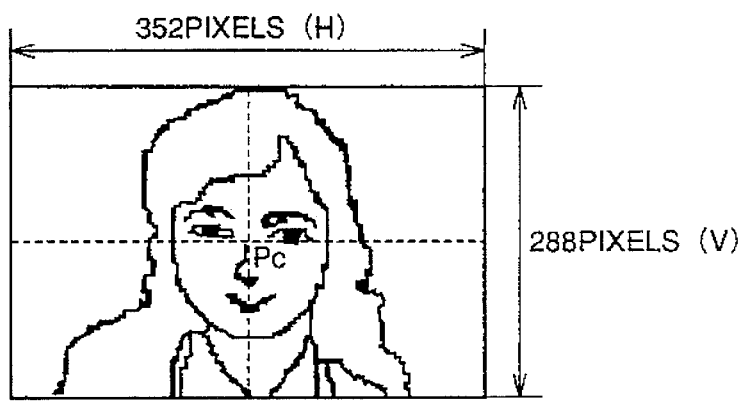
FIG. 8 is a diagram for describing the center coordinates Pc of a face.

The differential data of the moving portion generated by frame difference detection unit 101 is binarized by binarization processing unit 102. Binarization processing unit 102 applies a labeling process on the binary data for adjustment, and also removes noise. Then, face coordinate calculation unit 104 calculates the position data of the face portion, and specifies a face region. Frame memory 103 stores the image data of the specified region. On the basis of this face data, the center coordinates Pc of a face (refer to FIG. 8) is extracted. According to the data obtained by the above-described process, image conversion circuit 5 carries out a zooming or skipping process so that the entire face fits into the size of the CIF format (352 pixels×288 pixels) with the center coordinates Pc of the face as the center.

By directly applying image conversion on an image signal output from an image sensing device according to the present invention, a natural picture with little distortion in the image can be obtained without increasing the memory capacity and the circuit complexity in comparison with the conventional case where image format conversion is carried out after the image signal is converted into a NTCS or a PLA analog video signal. Also, by detecting the position of a face, image format conversion can be carried out only on a required region in which a face is extracted, and only the image data required for an image compression circuit or the like can be output. Therefore, the image data can be reduced. Furthermore, because data other than the face that is not required is not output, the peripheral unrequired image in a television telephone or the like does not have to be transferred.

An image processing apparatus according to a fifth embodiment of the present invention will be described hereinafter. The following fifth-eighth embodiments are image processing apparatuses that can obtain image data of different formats such as CIF, QCIF, SIF and QSIF. Also, a frame memory is not required, and an increase in circuit complexity can be avoided.

Figure 9:
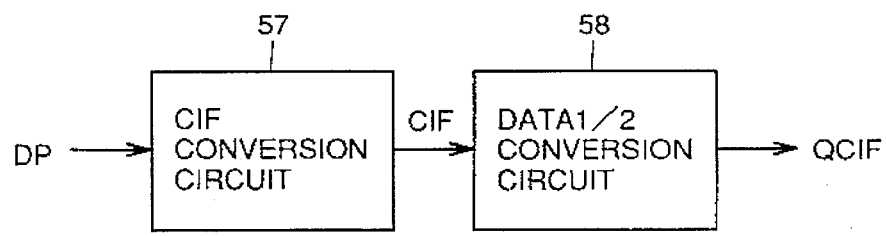
FIG. 9 is a block diagram showing a structure of an image conversion circuit of an image processing apparatus according to a fifth embodiment of the present invention.

Referring to FIG. 9, the image conversion circuit of the image processing apparatus of the fifth embodiment includes a CIF conversion circuit 57, and a data ½ conversion circuit 58. The other components are similar to those of the first embodiment shown in FIG. 1, and there details will not be repeated. The image processing apparatus of the fifth embodiment includes CIF conversion circuit 57 for converting digital video data DP applied from a signal processing circuit 4 into a CIF format of 352 dots×288 lines as shown in FIG. 9. At a subsequent stage of CIF conversion circuit 57, data ½ conversion circuit 58 is provided as a format conversion circuit that converts image data CIF corresponding to a CIF format into image data of another format. More specifically, a conversion circuit is added that provides image data QCIF corresponding to a QCIF format of 176 dots×144 lines by converting the horizontal information and the vertical information of the CIF data to ½.

Figure 10:
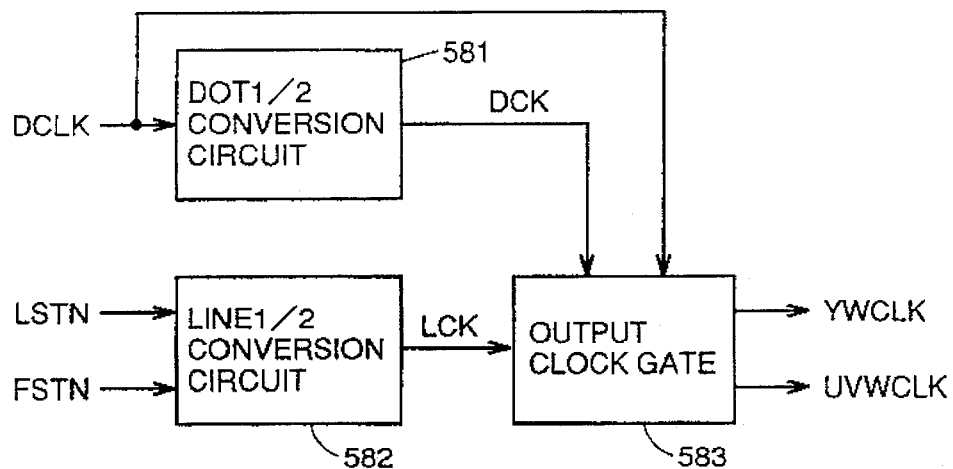
FIG. 10 is a block diagram showing a first specific example of a data ½ conversion circuit of FIG. 9.

A structure of the data ½ conversion circuit of FIG. 9 will be described with reference to FIG. 10. Referring to FIG. 10, a data ½ conversion circuit includes a dot ½ conversion circuit 581, a line ½ conversion circuit 582, and an output clock gate 583.

Dot ½ conversion circuit 581 reduces only the horizontal information of image data CIF to ½, and provides a dot clock signal DCK into output clock gate 583. Line ½ conversion circuit 582 reduces only the vertical information of image data CIF to ½, and provides a line clock signal LCK to output clock gate 583. Output clock gate 583 receives a timing signal DCLK applied to image data CIF, in addition to dot clock signal DCK and line clock signal LCK. Timing signal DCLK is a reference signal indicating an output timing of a dot.

The operation of the image processing apparatus of the fifth embodiment will be described with reference to FIGS.

Figure 11:
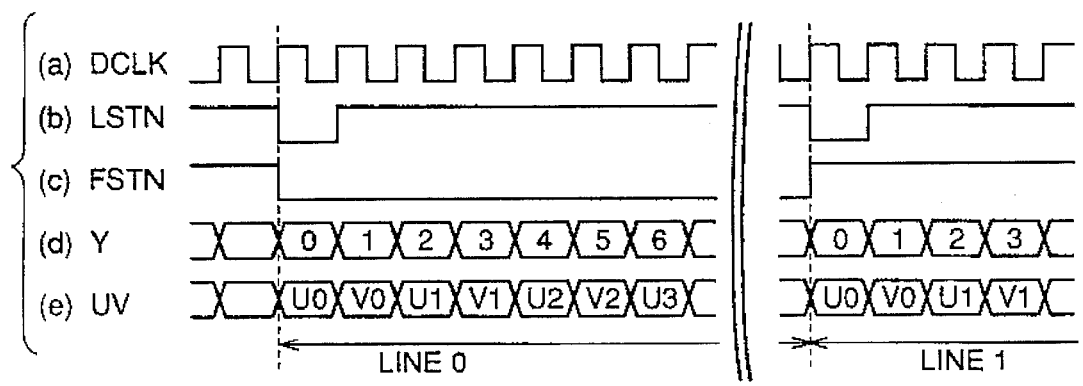
FIGS. 11 and 12 are first and second timing charts for describing the operation of the data ½ conversion circuit of FIG. 10.

11 and 12. Image data CIF converted into a CIF format is output from CIF conversion circuit 57 according to a timing shown in FIG. 11o Image data CIF from CIF conversion circuit 57 is applied to data ½ conversion circuit 58 which is provided at a succeeding stage of CIF conversion circuit 57. In FIG. 11, luminance signal Y and color signal UV are signals showing the luminance and color of image data CIF. Signal LSTN is a signal indicating the start of a dot which is the horizontal information of image data CIF. Signal FSTN is a signal indicating the start of a line which is the vertical information of image data CIF. The broken line in FIG. 11 indicates the lines of 1 unit of image data CIF, i.e. the lines from line 0 to line 287.

Figure 12:
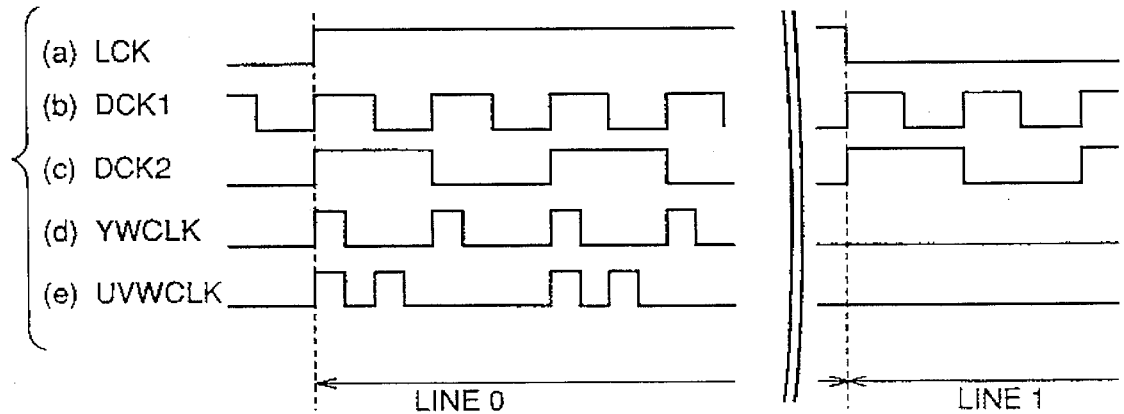

When image data CIF is applied to data ½ conversion circuit 58, a line clock signal LCK that is driven to H (logical high) and L (logical low) for every signal LSTN is output from line ½ conversion circuit 582 as shown in FIG. 12. From dot ½ conversion circuit 581, a first dot clock signal DCK1 driven to H and L for every 1 dot of a luminance signal and a second dot clock signal DCK2 driven to H and L for every 2 dots of color signals are respectively output. Here, when the first dot clock signal DCK1 and line clock signal LCK both attain H, an output clock signal YWCLK according to timing signal DCLK is provided from output clock gate 583. When second dot clock signal DCK2 and line clock signal LCK both attain H, an output clock signal UVWCLK according to timing signal DCLK is provided from output clock gate 583. As a result, image data QCIF converted into a QCIF format of 176 dots×144 lines is output from data ½ conversion circuit 58 by having the horizontal and vertical information of image data CIF respectively converted to ½.

In the fifth embodiment, when data ½ conversion circuit 58 is not operated, image data CIF is directly output from data ½ conversion circuit 58. Therefore, by selecting whether data ½ conversion circuit 58 is to be operated or not, image data of a CIF format or a QCIF format can be selectively output.

The present invention is not limited to the fifth embodiment in which a data ½ conversion circuit including dot ½ conversion circuit 581, line ½ conversion circuit 582, and output clock gate 583 is employed, and image data of a CIF format can have the horizontal information and the vertical information converted to ½ by carrying out a calculation of taking the average value of two data.

A second specific example of the data ½ conversion circuit of FIG. 9 will be described hereinafter with reference to FIGS. 13–14. The present second example is a data ½ conversion circuit that carries out averaging by calculation.

Figure 13:
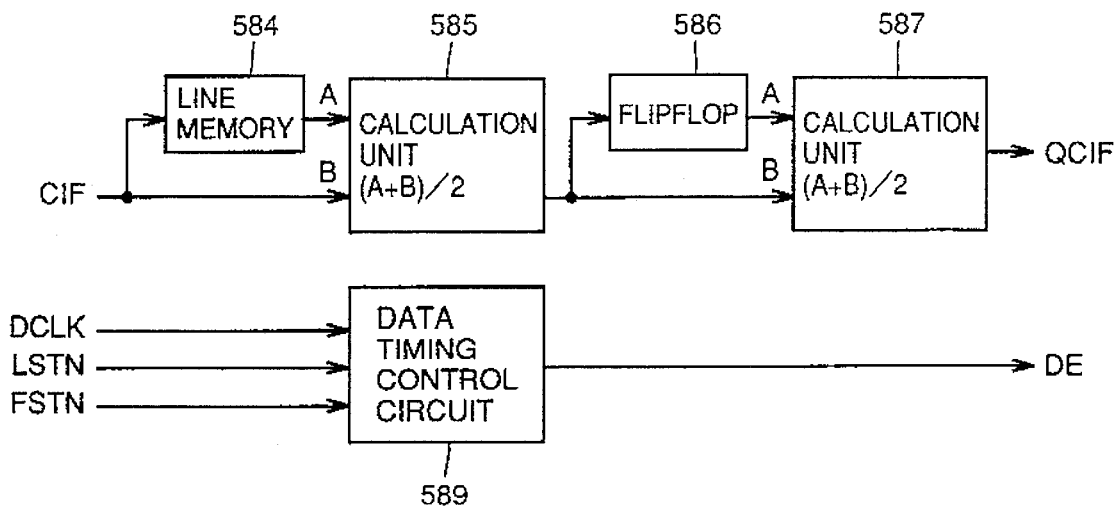
FIG. 13 is a block diagram showing a second specific structure of the data ½ conversion circuit of FIG. 9.
Figure 14:
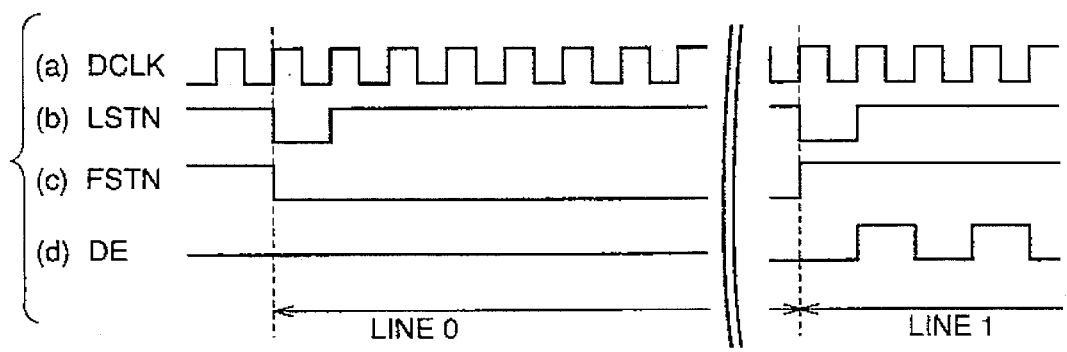
FIG. 14 is a timing chart for describing the operation of the data ½ conversion circuit of FIG. 13.

Referring to FIG. 13, a data ½ conversion circuit includes a line memory 584, calculation units 585 and 587, a flipflop 586, and a data timing control circuit 589. Line memory 584 and calculation circuit 585 process at least the vertical information of luminance signal Y of image data CIF input according to the format shown in FIG. 11. Similarly, flipflop 586 and calculation unit 587 process the horizontal information.

Data timing control circuit 589 outputs a data enable signal DE generated according to signal FSTN, signal LSTN and timing signal DCLK of the image data of the CIF format. Here, line memory 584 stores vertical data A in the input line of 1 unit, and provides to calculation unit 585 the stored vertical data A when vertical data B of the next line of 1 unit is input. Calculation unit 585 merges vertical data A input from line memory 584 and the next directly input vertical data B, i.e., carries out a (A+B)/2 process.

Flipflop 586 operates with timing signal DCLK as a clock signal. Calculation unit 587 merges horizontal data A of the line of 1 unit provided from flipflop 586 and the next input horizontal data B of the line of 1 unit, i.e., carries out a (A+B)/2 process. As a result, a luminance signal of image data CIF subjected to a ½ averaging process in both the horizontal and vertical directions is output from calculation unit 587.

Data timing control circuit 589 outputs a data enable signal DE that is rendered to H and to L for every line of 1 unit subsequent to the preceding line of 1 unit according to signal FSTN, and that is rendered to H and to L for every dot of 1 unit subsequent to the preceding 1 unit according to signal LSTN. The period when data enable signal DE attains a H level is the active period for data entry. When data enable signal DE having this active period is provided together with the image data output from calculation unit 587, image data QCIF corresponding to a QCIF format of 176 dots×144 lines is output from the data ½ conversion circuit of the present embodiment, similar to that of the fifth embodiment.

Figure 15:
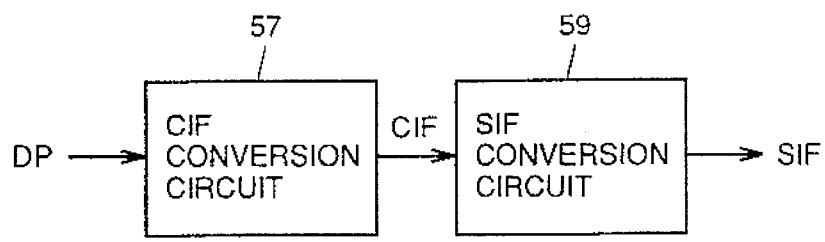
FIG. 15 is a block diagram showing a structure of an image conversion circuit of an image processing apparatus according to a sixth embodiment of the present invention.

An image conversion circuit of an image processing apparatus according to a sixth embodiment of the present invention will be described hereinafter. Referring to FIG. 15, an image conversion circuit includes a CIF conversion circuit 57, and a SIF conversion circuit 59. In the sixth embodiment, conversion to a CIF format is carried out by reducing the image data of a CIF format of 352 dots×288 lines at the top and bottom 24 lines in the vertical direction.

The apparatus of the sixth embodiment includes a CIF conversion circuit 57 that converts a digital video signal input from a signal processing circuit into a CIF format of 352 dots×288 lines, as shown in FIG. 15. At a succeeding stage of CIF conversion circuit 57, a SIF conversion circuit 59 that carries out format conversion is provided. More specifically, a conversion circuit is provided that converts data of a CIF format into image data SIF corresponding to a SIF format of 352 dots×240 lines.

Figure 16:
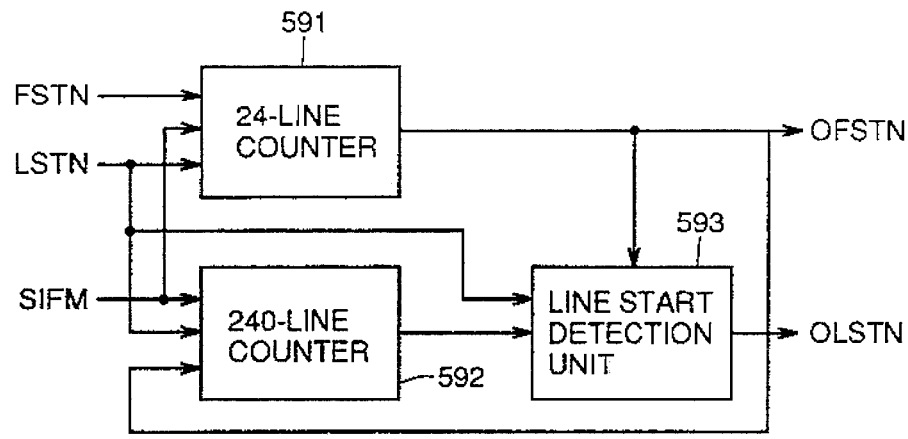
FIG. 16 is a block diagram showing a structure of an SIF conversion circuit of FIG. 15.

The SIF conversion circuit of FIG. 15 will be described hereinafter with reference to FIGS. 16 and 17. Referring to FIG. 16, a SIF conversion circuit includes a 24-line counter 591, a 240-line counter 592, and a line start detection unit 593. 24-line counter 591 delays the initiation of the vertical information process of the image data of the CIF format by 24 lines in the SIF format conversion operation. 240-line counter 592 detects the end of the vertical information process.

Figure 17:
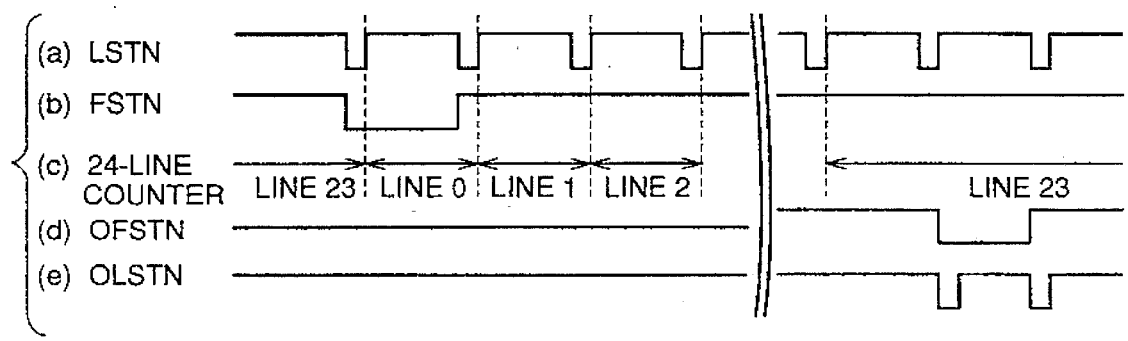
FIG. 17 is a timing chart for describing the operation of the SIF conversion circuit of FIG. 16.

When a SIF conversion is to be carried out, 24-line counter 591 receives signal FSTN, as shown in FIG. 17, and then counts 24 lines of the vertical data of image data CIF, and delays signal OFSTN as signal FSTN output to an external source. As a result, vertical data of 24 lines is removed. Here, 240-line counter 592 detects signal OFSTN output from 24-line counter 591, and counts 240 lines of the vertical data of the CIF format image data. Then, 240-line counter 592 provides to line start detection unit 593 a signal having an active period for indicating a fetching valid period of the vertical information.

After detection of signal OFSTN, line start detection unit 593 externally provides signal OLSTN which is obtained corresponding to signal LSTN when the signal output from 240-line counter 592 is active. As a result, image data SIF corresponding to a SIF format converted into 352 dots×240 lines is output from SIF conversion circuit 59.

When SIF conversion circuit 59 of the present embodiment is not operated, image data corresponding to a CIF format is directly output from SIF conversion circuit 59. Because SIF conversion circuit 59 receives a mode signal CIFM instructing a CIF conversion instead of a mode signal SIFM instructing a SIF conversion, 240-line counter 591 receiving mode signal CIFM directly outputs the input signal FSTN. Therefore, 240-line counter 592 will always output an active signal. Therefore, image data corresponding to a CIF format is output without being subjected to any conversion process by the SIF conversion circuit. By selecting whether a SIF conversion circuit is to be operated or not according to a mode signal in the present embodiment, image data corresponding to a CIF format or a SIF format can be selectively output.

An image conversion circuit of an image processing apparatus according to a seventh embodiment of the present invention will be described hereinafter with reference to FIG. 18. In the seventh embodiment, conversion is carried out on image data of a CIF format of 352 dots×288 lines to obtain image data QSIF corresponding to a QSIF format of 176 dots×120 lines.

Figure 18:
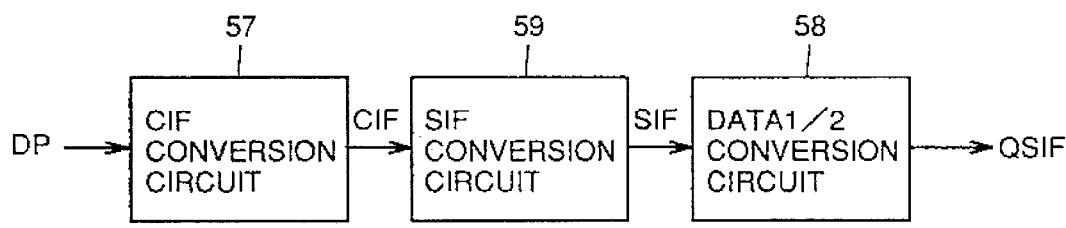
FIGS. 18 and 19 are block diagrams showing a structure of an image conversion circuit of an image processing apparatus according to a seventh embodiment and an eighth embodiment, respectively, of the present invention.

Referring to FIG. 18, an image conversion circuit includes a CIF conversion circuit 57, a SIF conversion circuit 59, and a data ½ conversion circuit 58. CIF conversion circuit 57 converts a digital video signal DP applied from a signal processing circuit into image data CIF of a CIF format of 352 dots×288 lines. SIF conversion circuit 59 converts image data CIF of a CIF format into image data SIF of a SIF format of 352 dots×240 lines. Similar to the data ½ conversion circuit of FIG. 9, data ½ conversion circuit 58 includes a dot ½ conversion circuit 581, a line ½ conversion circuit 582, and an output clock gate 583.

When SIF format image data SIF is applied to data ½ conversion circuit 58 of the above-described structure, only the horizontal information of the SIF format image data is skipped to ½, and a dot clock signal is output to output clock gate 583. Also, line ½ conversion circuit 582 skips only the vertical information of the SIF format image data to ½, and provides a line clock signal to output clock gate 583. Because output clock gate 583 receives timing signal DCLK applied to the SIF format image data, and also a dot clock signal and a line clock signal, output clock signals YWCLK and UVWCLK are provided from output clock gate 583, similar to the embodiment shown in FIG. 10.

According to the present embodiment, image data QSIF of a QSIF format of 176 dots×120 lines obtained by respectively converting the horizontal and vertical information of the SIF format image data to ½ is output from data ½ conversion circuit 58.

Figure 19:
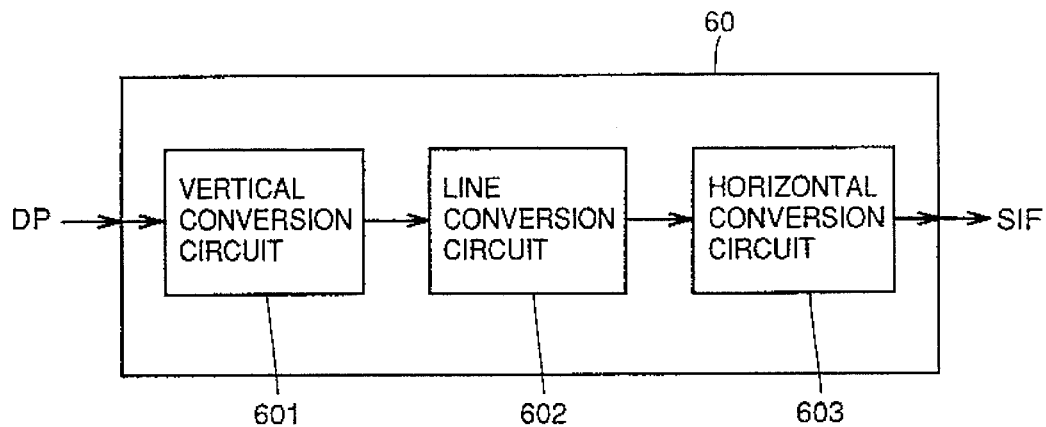

An image processing apparatus according to an eighth embodiment of the present invention will be described hereinafter with reference to FIG. 19. According to the eighth embodiment, image data SIF of a SIF format of 352 dots×240 lines is obtained. Referring to FIG. 19, a CIF/SIF conversion circuit 60 includes a vertical conversion circuit 601, a line conversion circuit 602, and a horizontal conversion circuit 603. Vertical and horizontal conversion circuits 601 and 603 have the vertical information and then the horizontal information of the digital video signal DP from a signal processing circuit converted into a CIF format. A line conversion circuit 602 is provided between vertical and horizontal conversion circuits 601 and 603. Vertical and horizontal conversion circuits 601 and 603 form the CIF conversion circuit 57 in the above-described embodiments. Line conversion circuit 602 has a function corresponding to that of SIF conversion circuit 59 of FIG. 15. More specifically, it converts the vertical data of the CIF format image data into 240 lines from 288 lines.

According to the image conversion circuit of the above-described structure, digital video signal DP provided from a signal processing circuit is applied to vertical conversion circuit 601 forming CIF/SIF conversion circuit 60, whereby only the vertical data is converted into image data of 288 lines. Then, the image data including the vertical information of 288 lines is applied to line conversion circuit 602 to be subjected to the above-described line conversion process, resulting in image data having vertical data of 240 lines. Then, the image data having vertical data of 240 lines is applied to horizontal conversion circuit 603. Horizontal conversion circuit 603 converts the horizontal data into image data of 352 dots. As a result, digital video signal DP applied to CIF/SIF conversion circuit 60 is converted into image data SIF of a SIF format of 352 dots×240 lines to be output.

When line conversion circuit 602 is not operated in the present embodiment, CIF/SIF conversion circuit 60 carries out only the function of a CIF conversion circuit. Therefore, digital video signal DP applied from a signal processing circuit is subjected to the conversion of only a CIF format image data. Here, image data corresponding to CIF format of 352 dots×288 lines is output from CIF/SIF conversion circuit 60. By making selection whether line conversion circuit 602 forming CIF/SIF conversion circuit 60 is to be operated or not, image data of a CIF format or a SIF format can be selectively output.

Because, a format conversion circuit that can convert image data of a CIF format into image data of another format is added at a subsequent stage of a CIF conversion circuit, the CIF format image data can easily be converted into image data of another format, for example a QCIF, a SIF, or a QSIF format. By controlling the operation of the format conversion circuit, image data of a CIF format or another format can be provided from the format conversion circuit. As a result, a frame memory is not required in the above described embodiments. Image data of a desired format can be obtained without increasing the circuit complexity.

Figure 20:
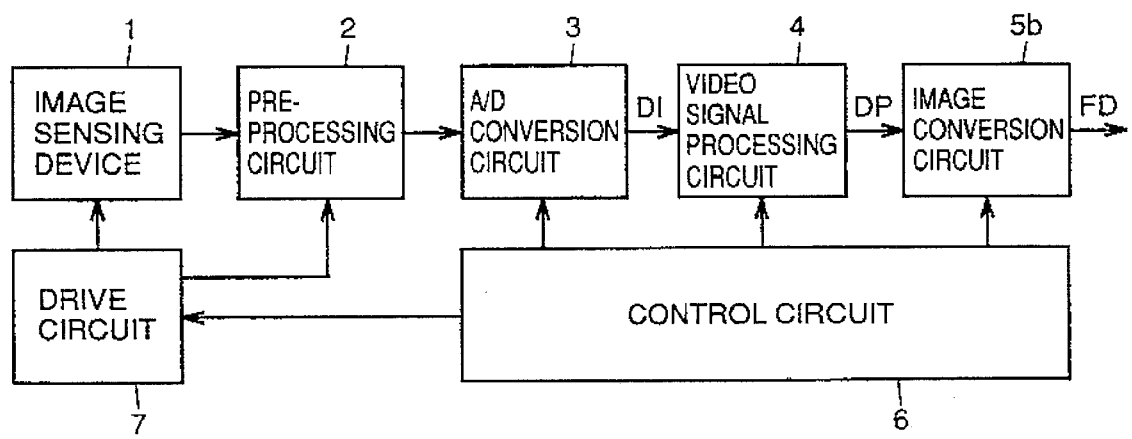
FIG. 20 is a block diagram showing a structure of an image processing apparatus according to a ninth embodiment of the present invention.

An image processing apparatus according to a ninth embodiment of the present invention will be described hereinafter with reference to FIGS. 20. The image processing apparatus of FIG. 20 differs from the image processing apparatus of FIG. 1 in that the image conversion circuit is modified into an image conversion circuit 5b. The remaining components are similar to those of the first embodiment, and the same components have the same reference characters denoted. Their description will not be repeated.

Figure 21:
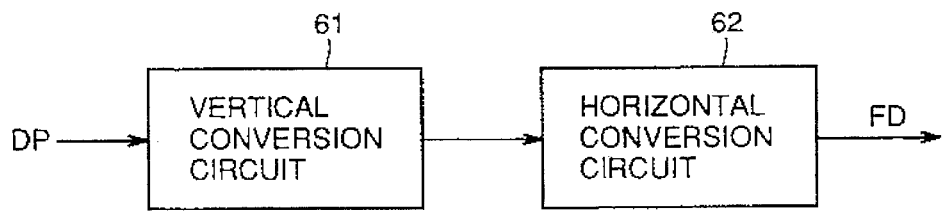
FIG. 21 is a block diagram showing a structure of an image conversion circuit of FIG. 20.

An image conversion circuit of FIG. 20 will be described hereinafter with reference to FIG. 21. The image conversion circuit includes a vertical conversion circuit 61, and a horizontal conversion circuit 62. Vertical conversion circuit 61 receives digital video signal DP. Horizontal conversion circuit 62 is connected at the succeeding stage of vertical conversion circuit 61.

Vertical conversion circuit 61 sequentially processes the input data, or carries out a process using the line memory to convert the data into a predetermined number of lines. Horizontal conversion circuit 62 sequentially processes the input data to convert the data into a predetermined number of dots. According to the present embodiment, data is sequentially processed, and the data process is carried out using a frame memory. Because horizontal and vertical conversion is not carried out at once, a conversion is possible without using a frame memory.

A vertical and horizontal conversion processes according to the above image conversion circuit will be described hereinafter. The case where one vertical 246-line type data of a CCD (Charge Coupled Device) of 190000 pixels or 270000 pixels is converted into 288 lines of a CIF format will be described.

Figure 22:
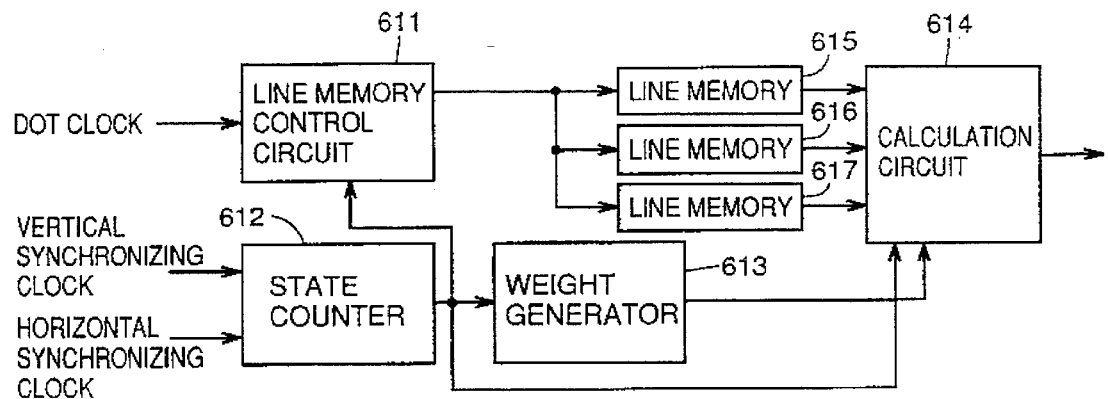
FIG. 22 is a block diagram showing a structure of a vertical conversion circuit of FIG. 21.

First, the structure of the vertical conversion circuit of FIG. 21 will be described. Referring to FIG. 22, a vertical conversion circuit includes a line memory control circuit 611, a state counter 612, a weight generator 613, a calculation circuit 614, and line memories 615–617.

The vertical conversion circuit of FIG. 22 converts the line numbers to 288 lines by converting 6 lines into 7 lines. An approach of storing data into line memories of 6 lines and then carrying out conversion thereon is generally considered in converting 6 lines into 7 lines. However, in the present embodiment, conversion is carried out with line memories of 3 lines by applying a 7/6 line data process at 1 horizontal period. If the 246 lines are directly subjected to a conversion of 6 lines to 7 lines, only 287 lines are obtained. Actually, the converted 287 lines and 1 blanking line are added. When the number of dots in the horizontal direction can not be divided by 7/6, the 6 lines are processed by an integer closest to the dividable value, and entire adjustment may be carried out at the last seventh line.

Line memory control circuit 611 responds to a control signal for horizontal synchronization applied from a video signal processing circuit and a dot clock indicating the timing of a dot to write the entire video data of 1 line of the display period into any of line memories 615–617 according to the write line memory information provided from state counter 612. Although not shown, a digital video signal is directly provided from a signal processing circuit as write data into each of line memories 615–617.

Figure 23:
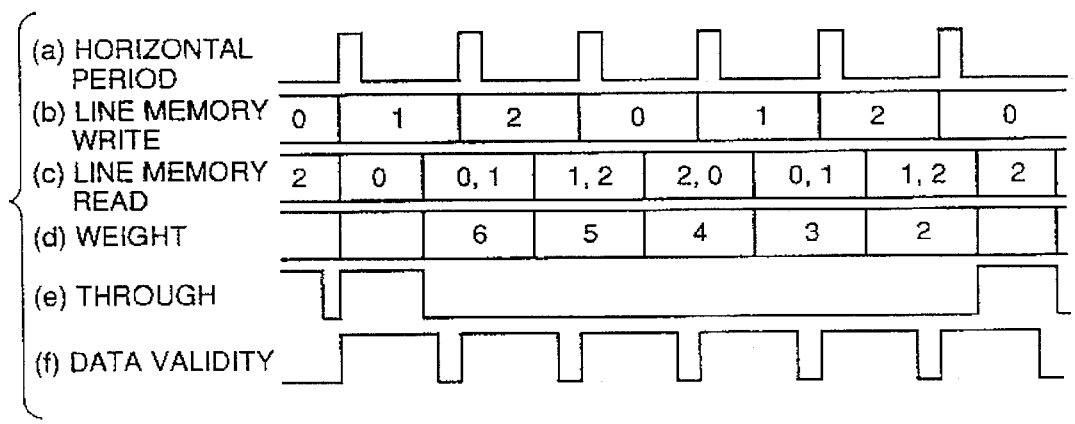
FIG. 23 is a timing chart for describing an operation of the vertical conversion circuit of FIG. 22.

The operation of the vertical conversion circuit of FIG. 22 will be described hereinafter. The line memory write shown in FIG. 23 shows to which line memory data is written. According to the information of read out line memory provided from state counter 612, data of a plurality of or one line memory is read out. The line memory read shown in FIG. 23 shows from which line memory data is read out. State counter 612 counts the writing and reading state of the line memory.

As to the writing operation, counting from 0 to 5 is repeated according to the horizontal synchronization to output six states. Also, the writing and reading are both initialized at the timing of the vertical synchronization. Here, vertical synchronization is the starting time point of a vertical display. As to a reading operation, the dot clock is counted, and when the end of 1 line process is detected, count 0 to 6 is repeated to output seven states.

The above-described vertical conversion circuit processes the 7/6 line data for one horizontal period to generate a signal indicating the valid timing of this data. In practice, a delay is considered that is generated by having the data processed by a calculation circuit or the like.

Weight generator 613 generates weight on the calculation according to the information provided from state counter 612. Weight generator 613 also generates a through signal to output the original data without carrying out the calculation on line 0 and line 6 after the conversion. Calculation circuit 614 selects data of line memories 615–617 according to information provided from state counter 612, and carries out calculation using the weight from weight generator 613.

By the above-described conversion process, data of 6 lines is converted into data of 7 lines as described in the following, and then eventually expanded to 288 lines.

line 0 after conversion←line 0 before conversion line 1 after conversion←(line 1 before conversion–line 0 before conversion)×5/7+line 0 before conversion line 2 after conversion←(line 2 before conversion–line 1 before conversion)×5/7+1 line 1 before conversion line 3 after conversion←(line 3 before conversion–line 2 before conversion)×4/7+1 line 2 before conversion line 4 after conversion←(line 4 before conversion–line 3 before conversion)×3/7+1 line 3 before conversion line 5 after conversion←(line 5 before conversion–line 4 before conversion)×2/7+1 line 4 before conversion line 6 after conversion←(line 5 before conversion According to the above-described conversion, output is made in the unit of 7/6 lines, and data of 1 continuous horizontal format will not be obtained. Therefore, the above-described conversion data is valid during the 7/6×1 horizontal display period out of the (1 horizontal display period+1 horizontal blanking period).

If a pipeline type calculation circuit is provided at a succeeding stage, a calculation process is sequentially carried out according to a dot clock. Therefore, the above-described discontinuous data cannot be directly process. However, erroneous operation can be prevented by processing the data valid timing to suppress provision of a clock to calculation circuit 614.

Figure 24:
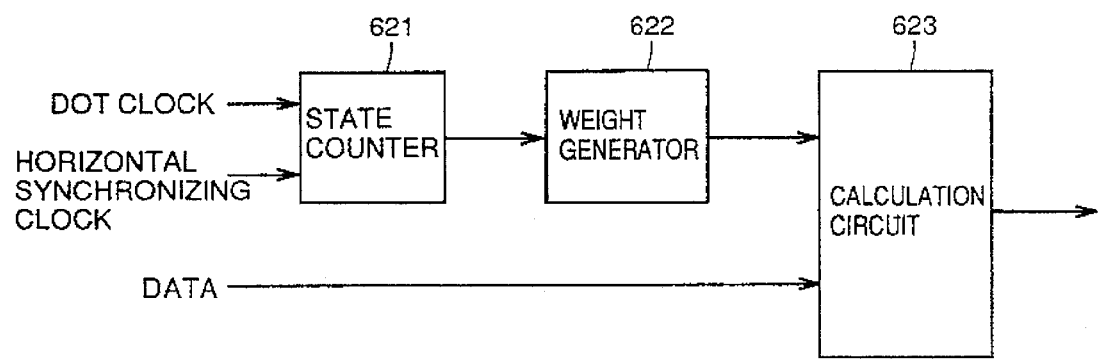
FIG. 24 is a block diagram showing a structure of an horizontal conversion circuit of FIG. 21.

The case of converting 512-dot type data such as a CCD of 270000 pixels or 320000 pixels into 352 dots of a CIF format will be described hereinafter. The horizontal conversion circuit of FIG. 24 carries out the above-described conversion operation by converting 16 dots into 11 dots. Referring to FIG. 24, a horizontal conversion circuit includes a state counter 621, a weight generator 622, and a calculation circuit 623.

State counter 621 is initialized at the start of a horizontal data, and then repeats counting according to a dot clock from 0 to 15 to output 16 states. According to the information output from state counter 621, weight generator 622 outputs weight to be used in the calculation, and indicates the dot that is not calculated by generating a through signal. The data valid timing is also generated by weight generator 622.

Figure 25:
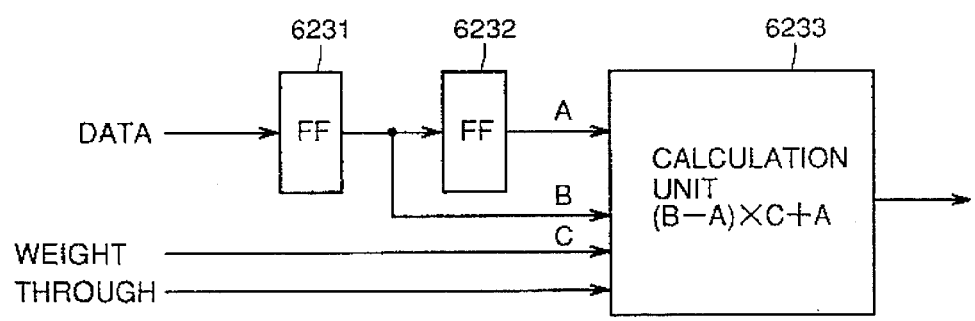
FIG. 25 is a block diagram showing a structure of a calculation circuit of FIG. 24.

Calculation circuit 623 sequentially calculates the input signal. Referring to FIG. 25, calculation circuit 623 includes flipflops 6231 and 6232, and a calculation unit 6233. Although the calculation results of sixteen dots is output for the 16 dots from the calculation circuit of FIG. 25, a data valid signal is output from weight generator 622 to select only 11 valid dots therefrom.

Figure 26:
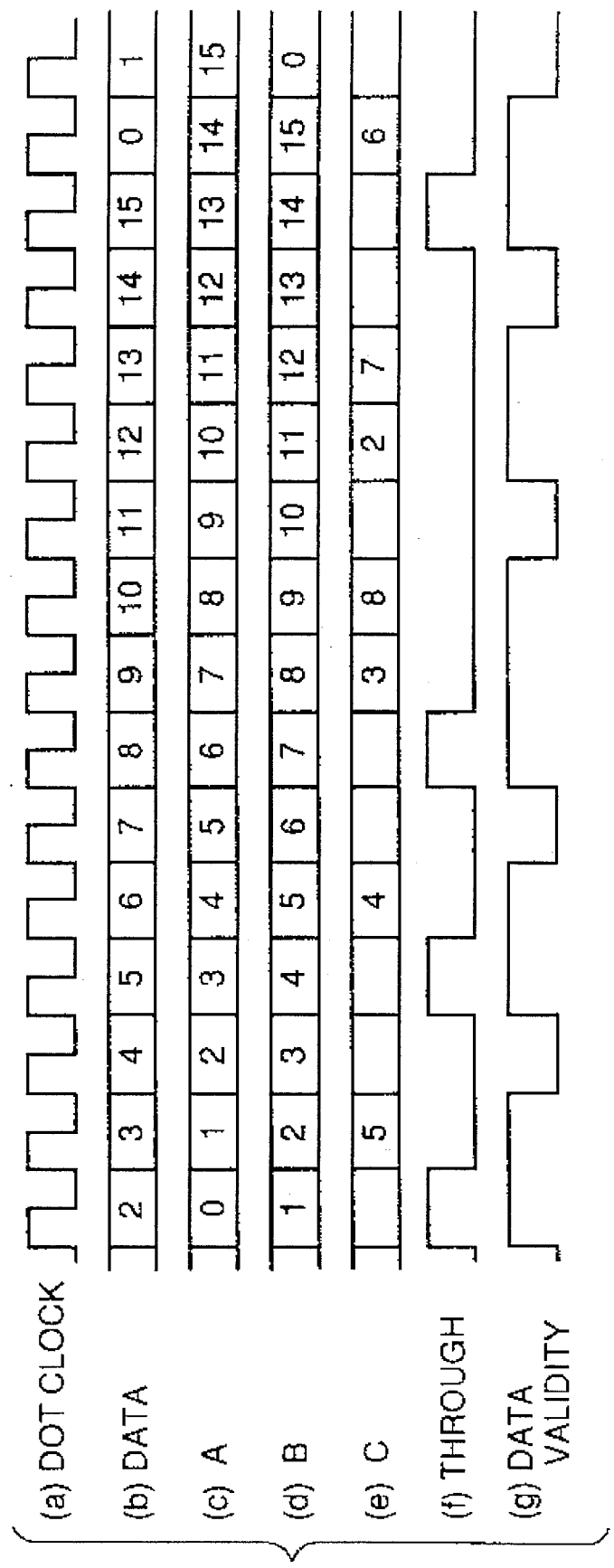
FIG. 26 is a timing chart for describing the operation of the horizontal conversion circuit of FIG. 24.

The operation of the horizontal conversion circuit of FIG. 24 will be described with reference to FIG. 26. Although data A, B and C are expressed as repeated from 0 to 15 for the sake of convenience, it is actually different data from 0 to 511. When calculation is not carried out by a through signal and the A side is directly output, the conversion result is as follows.

dot 0 after conversion←dot 0 before conversion dot 1 after conversion←(dot 2 before conversion–dot 1 before conversion)×5/11+dot 1 before conversion dot 2 after conversion←dot 3 after conversion dot 3 after conversion←(dot 5 before conversion–dot 4 before conversion)×4/11+dot 4 before conversion dot 4 after conversion←dot 6 before conversion dot 5 after conversion←(dot 8 before conversion–dot 7 before conversion)×3/11+dot 7 before conversion dot 6 after conversion←(dot 9 before conversion–dot 8 before conversion)×8/11+dot 8 before conversion dot 7 after conversion←(dot 11 before conversion–dot 10 before conversion)×2/11+dot 10 before conversion dot 8 after conversion←(dot 12 before conversion–dot 11 before conversion)×7/11+dot 11 before conversion dot 9 after conversion←dot 13 before conversion dot 10 after conversion←(dot 15 before conversion–dot 14 before conversion)×6/11+dot 14 before conversion Although the data itself is output discontinuously when 16 dots are converted into 11 dots as described above, erroneous operation of the circuit of the succeeding stage can be prevented by using a signal indicating the data valid timing. For example, when this data is to be output directly to an external circuit, a clock for transferring only the data valid timing is output. The output is shown in FIG. 27.

When the succeeding stage of the horizontal conversion circuit outputs 1 line of data discontinuously, the calculation circuit shown in FIG. 25 will process unnecessary data to result in erroneous conversion if the data valid timing of the vertical side is not used. However, when the data valid timing of the vertical side is inactive, unrequired data is not sent to flipflops 6231 and 6232 of FIG. 25 if the dot clock of the horizontal conversion circuit is suppressed. Therefore, a proper conversion process can be carried out.

Figure 27:
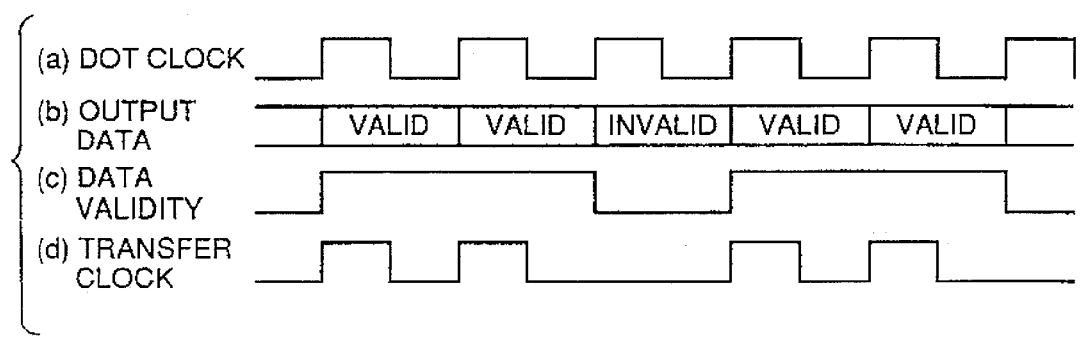
FIG. 27 is an output timing chart of a case where conversion is carried out by the horizontal conversion circuit of FIG. 24.
Figure 28:
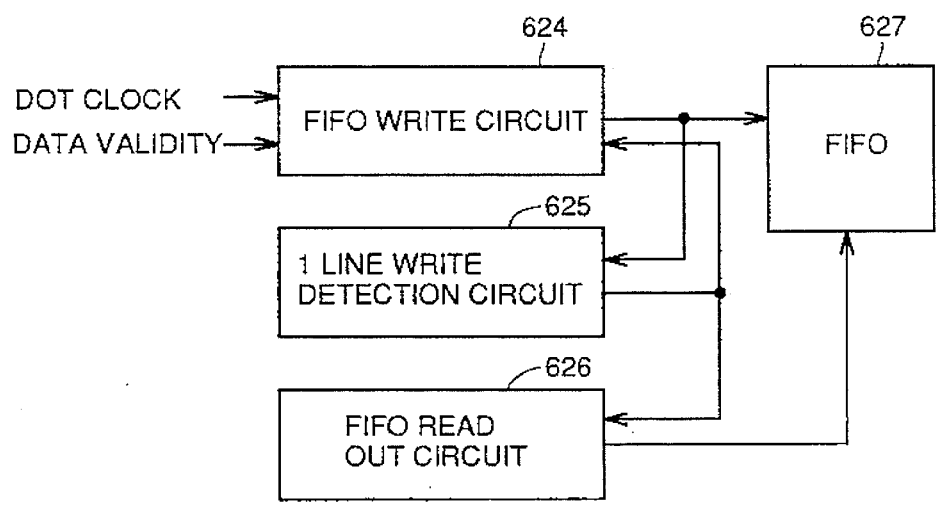
FIG. 28 is a block diagram showing a structure of a data control circuit.

In the case where data transfer is not allowed by an unconstant timing as shown in FIG. 27, data can be output for every constant cycle by using the data control circuit of FIG. 28. Referring to FIG. 28, a data control circuit includes a FIFO write circuit 624, a 1 line write detection circuit 625, a FIFO read circuit 626, and a FIFO 627.

FIFO write circuit 624 generates a write signal to FIFO 627 using a dot clock when the validity of the data is specified. Although not shown, it is assumed that data is directly applied to FIFO 627 from a CIF conversion circuit, for example, the above-described horizontal conversion circuit. The write signal to FIFO write circuit 624 is also applied to 1 line write detection circuit 625. 1 line write detection circuit 625 detects the write signal to FIFO 627, and provides a read out instruction to FIFO read circuit 626 when writing of 1 line, i.e. 352 dots in the case of a CIF format, is detected. FIFO read circuit 626 carries out a FIFO read out of 1 line when writing of 1 line is detected. As a result, data provided discontinuously can be converted into continuous data of 1 line.

In the above embodiments, image format conversion can be carried out without extracting data from the frame memory by means of processing the image data sequentially and separating the vertical and horizontal conversion process. This provides the advantages that the circuit complexity is reduced and construction of an ASIC circuit can be easily carried out. In expanding a scanning line, not only insertion or reduction of lines, but calculation of data in the line memory is carried out without using a frame memory, so that the picture quality can be improved.

Although usage of line memories of 6 lines can be considered in converting 6 lines into 7 lines, by providing data of approximately 7/6 line with respect to 1 line of the input side and providing the timing of data existing, a similar conversion can be carried out by line memories of 3 lines. Therefore, the number of components of the circuit can be reduced, which in turns lowers the cost thereof.

In carrying out conversion in the horizontal direction, a signal indicating the timing of valid data and a calculation circuit are used so that conversion can be achieved by just sending data sequentially to the calculation circuit without using a buffer or a shift register. Therefore, the number of components in the circuitry can be reduced. Furthermore, by carrying out FIFO control on the basis of a write detection of 1 line, continuous data of 1 line can be output.

An image processing apparatus according to a tenth embodiment of the present invention will be described. The image processing apparatus of the tenth embodiment can output image data of high quality corresponding to a square pixel.

Figure 29:
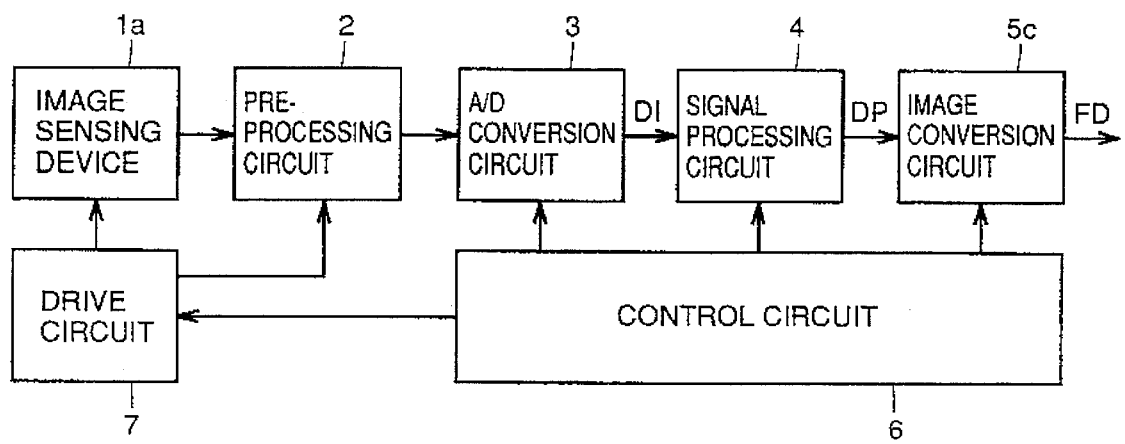
FIG. 29 is a block diagram showing a structure of an image processing circuit according to a tenth embodiment of the present invention.

The image processing apparatus of the tenth embodiment shown in FIG. 29 differs from the image processing apparatus of the first embodiment shown in FIG. 1 in that image sensing device 1 is modified into an image sensing device 1a formed of a CCD of 410000 pixels, and the image conversion circuit is modified into an image conversion circuit 5c for conversion into a VGA format corresponding to a square pixel. The remaining components are similar to those of the image processing apparatus of FIG. 1. The similar components have the same reference numerals denoted, and their description will not be repeated.

According to the tenth embodiment, image data of the image sensing device 1a is converted into a VGA (640×480 dots) corresponding to a square pixel by image conversion circuit 5c. It is assumed that one image is formed by sending 1 field (640×240 dots) of image data twice at an odd and even number field.

In reading out the CCD of 410000 pixels for every odd and even number field by 768×247 dots, the top 4 lines and the bottom 3 lines in the vertical direction are reduced in the present embodiment to result in 240 lines. In the horizontal direction, conversion into 640 dots is required. The present embodiment obtains 640 dots by converting 12 dots into 10 dots. By carrying out such vertical/horizontal conversion, image data of a VGA format corresponding to a square pixel can be output.

Figure 30:
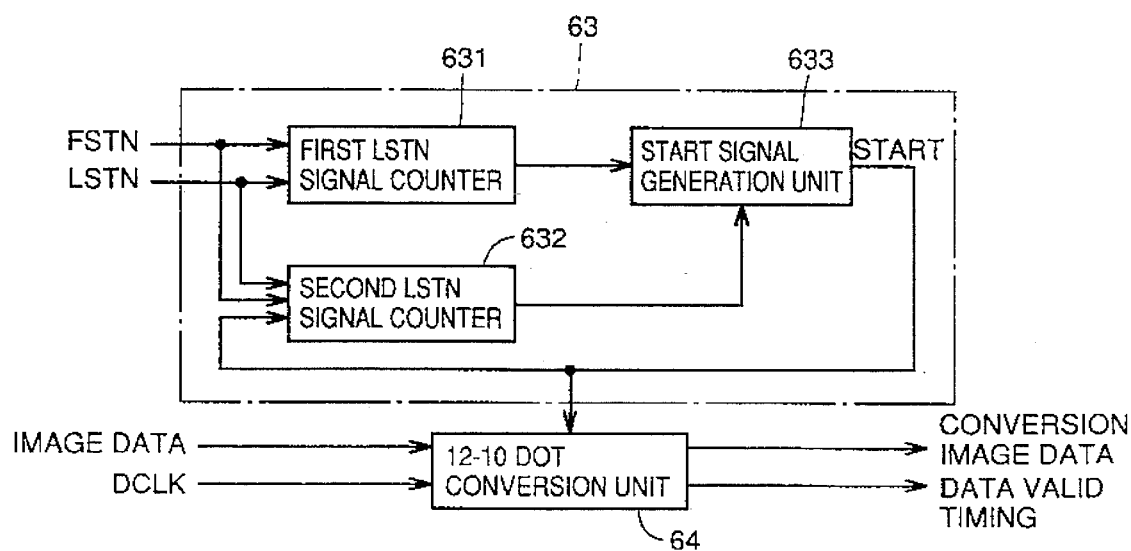
FIG. 30 is a block diagram showing a structure of an image conversion circuit of FIG. 29.

Referring to FIG. 30, an image conversion circuit shown in FIG. 29 will be described. The image conversion circuit includes a vertical valid timing generation unit 63, and a 12–10 dot conversion unit 64. Vertical valid timing generation unit 63 includes a first LSTN signal counter 631, a second LSTN signal counter 632, and a START signal generation unit 633.

Figure 31:
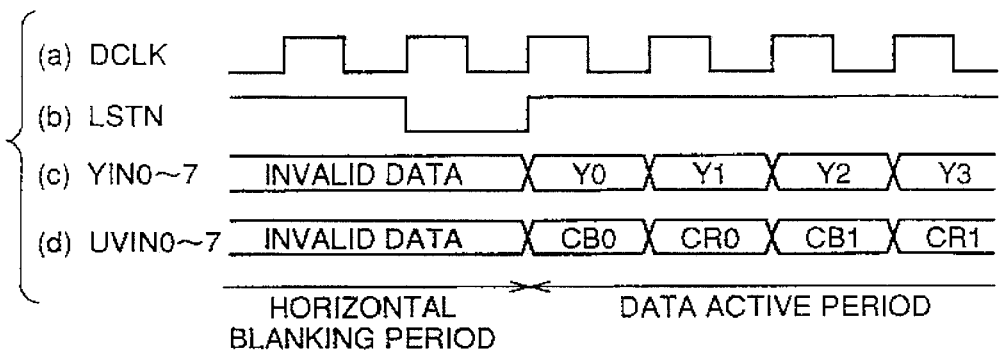
FIGS. 31 and 32 are first and second timing charts of an input signal into the image conversion circuit of FIG. 29.
Figure 32:
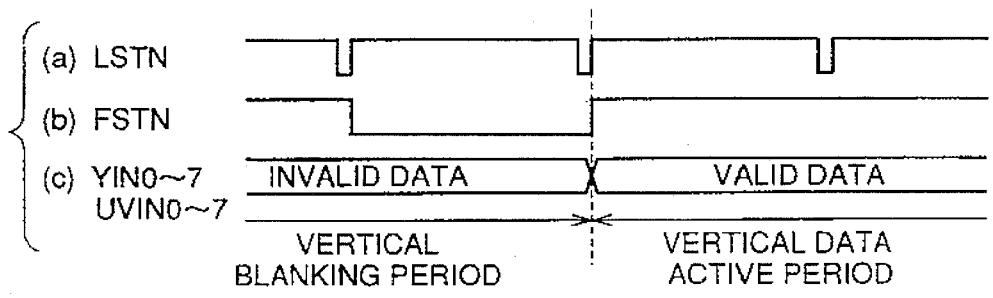

FIGS. 31 and 32 show signals applied to image conversion circuit 5c, i.e. output signals of the signal processing circuit. In FIGS. 31 and 32, the start of a horizontal period and the start of a vertical period are shown differing in the time axis.

Referring to FIG. 31, (a) shows a dot clock DCLK, (b) shows a horizontal start signal LSTN indicating the start of a horizontal period, (c) shows a luminance signal, and (d) shows a color signal. Referring to FIG. 32, (b) shows a vertical start signal FSTN indicating the start of a vertical period, and (c) shows a luminance signal and a color signal.

As shown in FIG. 31, immediately at the end of a vertical blanking period, dot clock DCLK and horizontal start signal LSTN rise, whereby a valid luminance signal and a color signal are input.

As shown in FIG. 32, immediately at the end of a vertical blanking period, horizontal start signal LSTN and vertical start signal FSTN rise, whereby a valid luminance signal and a color signal are input. These vertical and horizontal start signals FSTN and LSTN are formed from vertical and horizontal drive signals VD and HD.

Image conversion circuit 5c of the present embodiment includes a vertical valid timing generation unit 63 for providing a start signal START which becomes active only during a period corresponding to 240 valid lines in the vertical direction on the basis of vertical and horizontal start signals FSTN and LSTN, and a 12–10 dots conversion unit 64 for carrying out conversion of the number of dots in the horizontal direction.

Vertical valid timing generation unit 63 includes a first LSTN signal counter 631 for removing the top 4 lines, a second LSTN signal counter 632 for counting 240 valid lines, and a START signal generation unit 633 for providing a start signal START that is active only during the period of the valid 240 lines after the top 4 lines are removed according to the outputs of counters 631 and 632.

Figure 33:
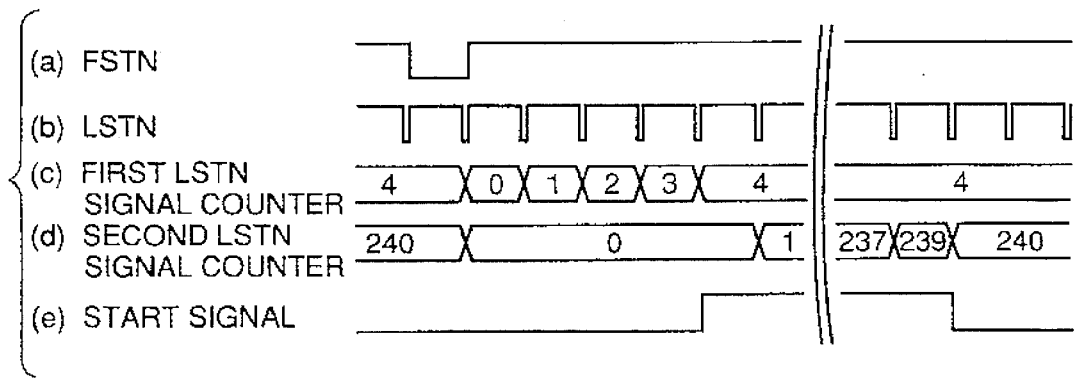
FIGS. 33 and 34 are timing charts for describing a vertical conversion operation and a horizontal conversion operation, respectively, of the image conversion circuit of FIG. 29.

FIG. 33 is a timing chart for describing the operation of vertical valid timing generation unit 63. In FIG. 33, (a) shows a vertical start signal FSTN, (b) shows a horizontal start signal LSTN, (c) shows an output of a first LSTN counter 631, (d) shows an output of a second LSTN signal counter 632, and (e) shows a start signal START.

As shown in FIG. 33, first LSTN counter 631 is cleared in response to the rise of horizontal start signal LSTN when vertical start signal FSTN is active, and counts 4 rises of the horizontal start signal. Second LSTN signal counter 632 is cleared in response to the fall of horizontal start signal LSTN when vertical start signal FSTN is active. Second LSTN signal counter 632 counts the fall of horizontal start signal LSTN during the active period of start signal START. When the count value becomes 240, an output for rendering start signal START inactive is provided to START signal generation unit 633. START signal generation unit 633 renders start signal START active at the first rise of horizontal start signal LSTN after the count value of first LSTN signal counter 631 becomes 4, and renders start signal START inactive when the count value of second LSTN signal counter 632 becomes 240.

In other words, vertical valid timing generation unit 63 outputs an active start signal START only during the period corresponding to 240 lines excluding the top 4 lines and the bottom 3 lines.

As to the method of converting the number of dots in the horizontal direction from 12 dots to 10 dots, there is a method of skipping 2 dots from 12 dots, or obtaining the 10 dots by the calculation of multiplying a coefficient by each data of the 12 dots. 12–10 dot conversion unit 64 of the present embodiment carries out this conversion by calculation.

Here, image data from video signal processing circuit 4 is continuously provided for 1 line in synchronization with dot clock DCLK. Therefore, when 10 dots are to be output with respect to 12 dots of image data, a signal having a period of $^{10}/_{12}$ the period of dot clock DCLK must be used, or, if a calculation result is to be output in synchronization with dot clock DCLK, two extra dots of data must be inserted.

In the present embodiment, the calculation result is output in synchronization with dot clock DCLK, and two extra dots of data are inserted. A data active signal DTACTV indicating whether the output data is valid/invalid is generated.

Figure 34:
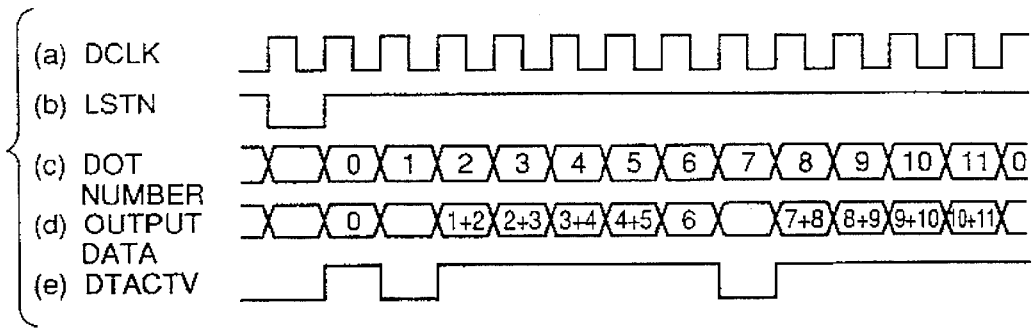

FIG. 34 is a timing chart for describing the above operation in 12–10 dot conversion unit 24. In FIG. 34, (a) shows a dot clock DCLK, (b) shows a horizontal start signal LSTN, (c) shows the dot number, (d) shows the output data which is the calculation result, and (e) shows data active signal DTACTV indicating the validity of the output data. Here, the number allocated to the output data shows the dot number used in the calculation. For example, 1+2 indicates that the image data of dot No. 1 and dot No. 2 are calculated and output.

In this calculation, not only simple addition, but weight is respectively applied. The present embodiment indicates the following calculation.

dot 0 after conversion=dot 0 before conversion dot 1 after conversion=(dot 1 before conversion×4 +dot 2 before conversion×1)/5 dot 2 after conversion=(dot 2 before conversion×3 +dot 3 before conversion×2)/5 dot 3 after conversion=(dot 3 before conversion×2 +dot 4 before conversion×3)/5 dot 4 after conversion=(dot 4 before conversion×1 +dot 5 before conversion×4)/5 dots 5 et seq. after conversion are similar to dots 0 et seq. after conversion.

This output has invalid data of 2 dots inserted with respect to the 12 dots. In the present embodiment, invalid data is inserted into the positions corresponding to dot 1 before conversion and dot 7 before conversion as shown in FIG. 34.

Data active signal DTACTV indicating valid/invalid of the output data is formed by decoding the count value of the dot counter (not shown) counting the dot number provided in 12–10 dot conversion unit 64. The color signal has simply 1 dot skipped from 6 dots.

This data active signal DTACTV has the above-described start signal START ANDed to be output as the data valid timing signal of FIG. 30. Therefore, at the succeeding stage of image conversion circuit 5c, a VGA format image data corresponding to a square pixel of 640 dots×240 dots can be received by fetching converted image data only during the active period of data valid timing signal DTACTV.

Because image data from the CCD of image sensing device 1a is digitized after A/D conversion to result in image data corresponding to a square pixel, an image of higher quality without picture distortion can be provided in comparison with the case where image data is converted into an analog signal and then subjected to A/D conversion. Furthermore, the image sensing device is not limited to a CCD corresponding to a square pixel.

Because the output image data is a digital signal, A/D conversion is not required in entering the same into a personal computer or a work station. As a result, the interface at the personal computer or work station side can be realized with a structure more simple than that in the case corresponding to the current analog input.

Figure 35:
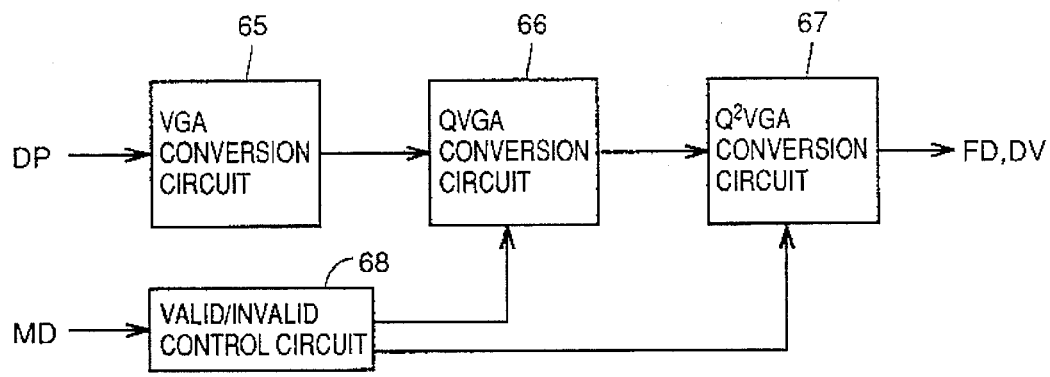
FIG. 35 is a block diagram showing another specific structure of the image conversion circuit of FIG. 29.

FIG. 35 is a block diagram showing another specific structure of an image conversion circuit of FIG. 29. The structure up to the preceding stage of this image conversion circuit is similar to that of the embodiment of FIG. 29.

According to a specified mode in the present embodiment, conversion is carried out into a VGA (640×480 dots) format (first format) conversion corresponding to a square pixel as described above, or into a QVGA (320×240 dots) format (second format) having the number of dots and the number of lines of the VGA format halved, or into a $Q^2VGA$ (160×120 dots) format (third format) having the number of dots and the number of lines of the QVGA format halved.

The image conversion circuit includes a VGA conversion circuit 65 for carrying out a VGA format conversion on the image data from video signal processing circuit 4, and generating a data valid timing signal similar to the above-described structure, a QVGA conversion circuit 66 for converting the VGA format into a QVGA format, a $Q^2VGA$ conversion circuit 67 for converting the QVGA format into a $Q^2VGA$ format, and a valid/invalid control circuit 68 responsive to a mode specification signal that specifies a conversion mode via a microcomputer or an operation switch not shown for inhibiting or allowing the conversion operation of each of conversion means 65–67. The structure of VGA conversion circuit 65 is similar to that of the above-described embodiment, and their description will not be repeated.

QVGA conversion circuit 66 converts image data of a VGA format from VGA conversion circuit 65 into image data of a QVGA format. More specifically, QVGA conversion circuit 66 converts the lines in the vertical direction to 240 lines by processing data of either an odd number field or an even number field, and converts the dots in the horizontal direction to 320 dots by taking the average value of two adjacent dots. Identification of a field is carried out using a field identification pulse that is output from a general timing IC that is used in drive circuit 7 of FIG. 29.

When image data in the horizontal direction is input and output in synchronization with dot clock DCLK as in the above-described embodiment, it is necessary to insert valid data of 1 dot with respect to 2 dots. In the present embodiment, a first data active signal DTACTV1 indicating the timing of a valid data is generated.

Figure 36:
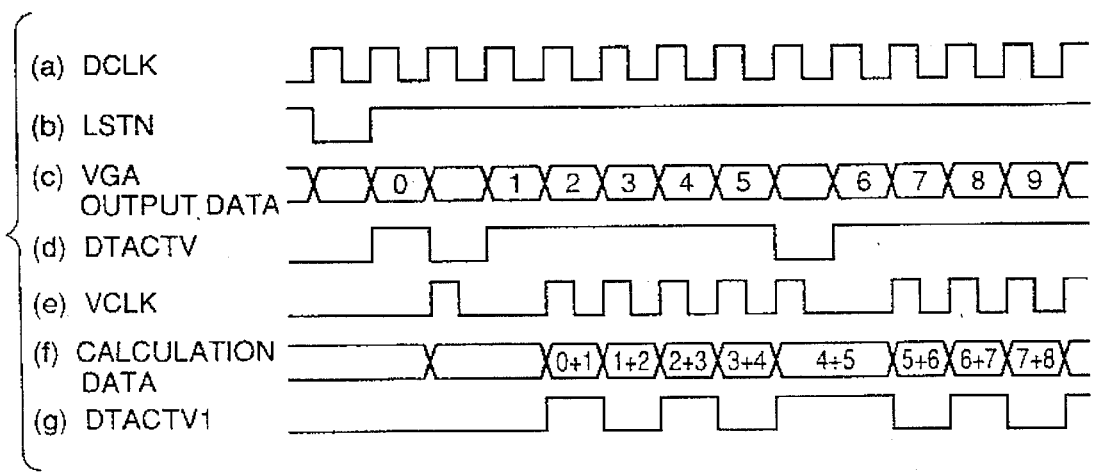
FIG. 36 is a timing chart for describing the operation of an QVGA conversion circuit of FIG. 35.

FIG. 36 is a timing chart for describing the conversion operation of QVGA conversion circuit 66. In FIG. 36, (a) shows a dot clock DCLK, (b) shows a horizontal start signal LSTN, (c) shows a VGA output data from VGA conversion circuit 65, (d) shows a data active signal DTACTV indicating whether VGA output data is valid/invalid, (e) shows a clock signal VCL which is an ANDed output of dot clock DCLK and data active signal DTACTV delayed by 1 dot clock, (f) is the calculated result of the average value of two adjacent dots, and (g) shows a first data active signal DTACTV1 indicating whether output data is valid/invalid. First data active signal DTACTV1 is a signal that has the level inverted in response to a rise of clock signal VCLK.

The calculation of the horizontal direction in QVGA conversion circuit 66 uses a calculation unit that outputs the average values of data adjacent to each other. Also, dot clock DCLK is used as clock and data active signal DTACTV is used as a clock enable, whereby only valid data of the VGA conversion is input to the calculation unit.

Figure 37:
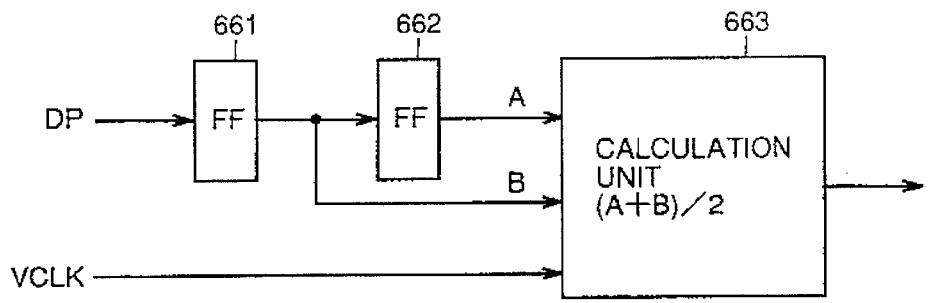
FIG. 37 is a block diagram showing a structure of a calculation circuit that carries out horizontal ½ conversion.

Clock signal VCLK which is an ANDed output of dot clock DCLK and data active signal DTACTV which is 1 dot clock delayed may be used as the clock instead of the clock enable. In this case, the structure of the circuitry includes two stages of flipflops 661 and 662, and a calculation unit 663, as shown in FIG. 37.

A data valid timing signal indicating the validity of QVGA output data of QVGA conversion circuit 66 is the ANDed output of first data active signal DTACTV1 and the above-described field identification pulse. This data valid timing signal is applied to Q$^2$VGA conversion circuit 67 together with a QVGA output.

The QVGA format image data from QVGA conversion circuit 66 will be described on the basis of Q$^2$VGA conversion circuit 67 that carries out a Q$^2$VGA format image data conversion. Q$^2$VGA conversion circuit 67 converts the image data of a QVGA format to ½ in both the vertical and horizontal direction.

As to the vertical direction, a method of calculating the average value of the data of 2 lines to obtain 1 line, and a method of simply skipping 1 line can be considered. In the present embodiment, the average value of two lines of data is calculated to be merged into 1 line. 1 line of valid data is obtained for every 2 lines, and a line active signal LNAV indicating whether the line is valid/invalid is generated.

As to the horizontal direction, similar to the conversion by QVGA conversion circuit 66, conversion is carried out by taking the average value of two adjacent dots, and a second data active signal DTACTV2 indicating whether the converted data is valid/invalid is generated.

Figure 38:
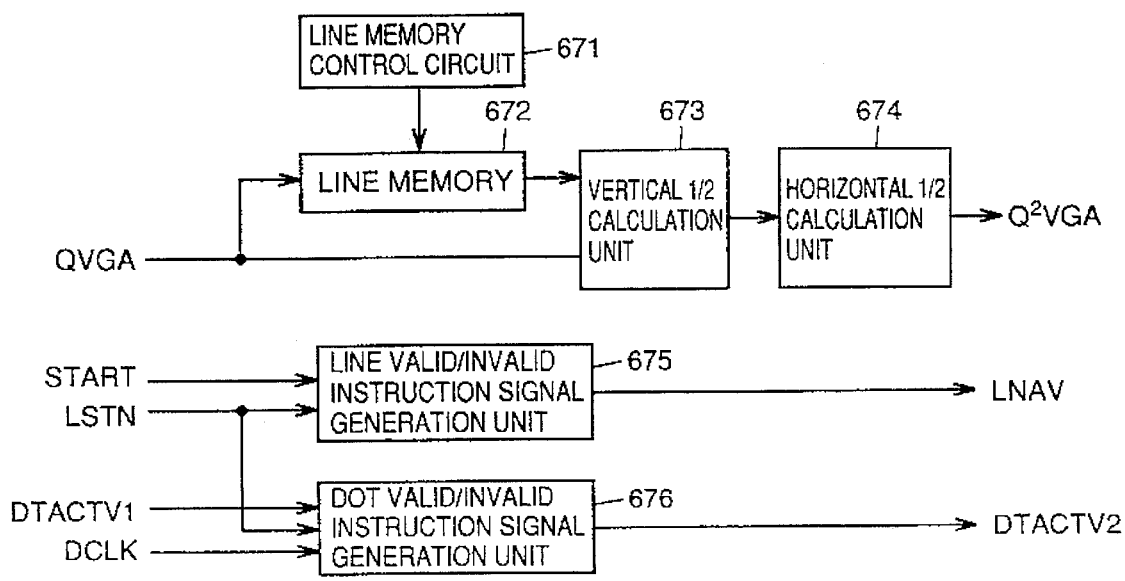
FIG. 38 is a block diagram showing a structure of a $Q^2VGA$ shown in FIG. 35.

Referring to FIG. 38, Q$^2$VGA conversion circuit 67 includes a line memory control circuit 671, a line memory 672, a vertical ½ calculation unit 673, a horizontal ½ calculation unit 674, a line valid/invalid indication signal generation unit 675, a dot valid/invalid indication signal generation unit 676.

Line memory control circuit 671 writes the QVGA output data into line memory 672, and carries out control so that data of the preceding line is read out. Then, vertical ½ calculation unit 673 calculates the average value of QVGA output data of 1 preceding line and the current QVGA output data. This data is applied to horizontal ½ calculation unit 674 in which calculation of an average value with an adjacent dot is carried out.

Figure 39:
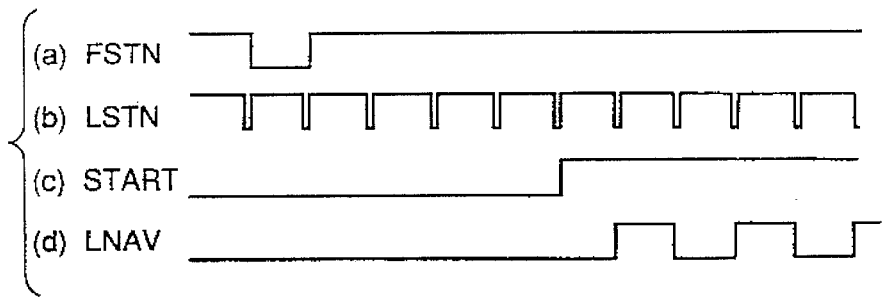
FIGS. 39 and 40 are first and second timing charts, respectively, for describing the operation of the $Q^2VGA$ shown in FIG. 38.

Line valid/invalid instruction signal generation unit 675 generates a line active signal LNAV which becomes active for every other 1 line as shown in FIG. 39(d) in response to start signal START shown in FIG. 39(c) and horizontal start signal LSTN shown in FIG. 39(b).

Figure 40:
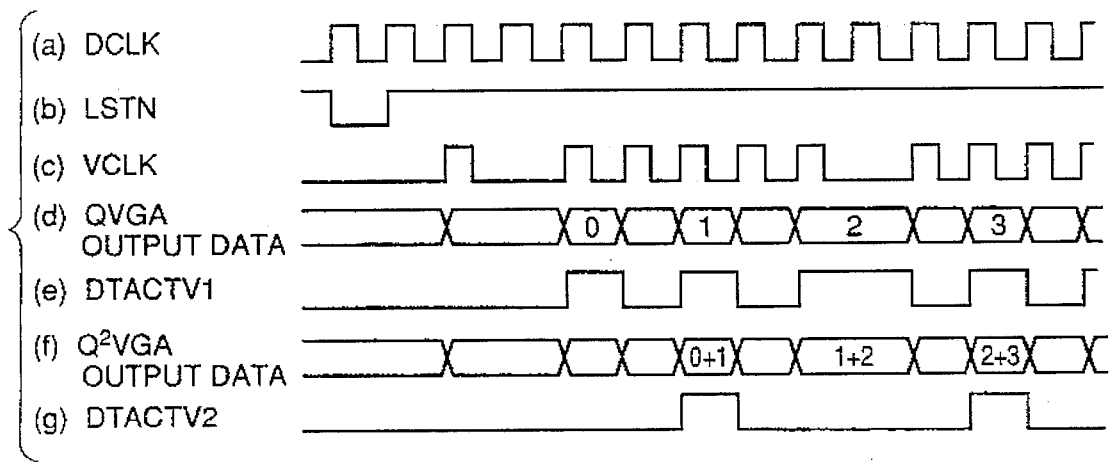

Dot valid/invalid instruction signal generation unit 676 generates a second data active signal DTACTV2 which becomes active for every other first data active signal DTACTV1 in response to first data active signal DTACTV1 shown in FIG. 40(e) and dot clock signal DCLK shown in FIG. 40(a).

The calculation result shown in FIG. 40(f) using clock signal VCLK shown in FIG. 40(c) as a clock which was used for QVGA conversion cannot be obtained by just averaging the input adjacent data in horizontal ½ calculation unit 674. Calculation between data spaced apart by 1 dot must be carried out.

Therefore, horizontal ½ calculation unit 674 of the present embodiment includes three stages of flipflops 664–666, whereby calculation of the output of the first stage flipflop 664 and the output of the third stage flipflop 666 are carried out by calculation unit 667.

The data valid timing signal indicating whether Q$^2$VGA output data of Q$^2$VGA conversion circuit 67 is valid/invalid is the ANDed output of first data active signal DTACTV1, the above-mentioned field identification pulse, line active signal LNAV, and second data active signal DTACTV2. This data valid timing signal is provided together with the Q$^2$VGA output.

Valid/invalid control circuit 68 shown in FIG. 35 responds to a specified mode and allows only the conversion operation of VGA conversion circuit 65 and inhibits the conversion operations of QVGA conversion circuit 66 and Q$^2$VGA conversion circuit 67 when a VGA mode is specified. Also, VGA output data from VGA conversion circuit 65 and a data valid timing signal are passed through. When a QVGA mode is specified, the conversion operation by VGA conversion circuit 65 and QVGA conversion circuit 66 are allowed, and the conversion operation of Q$^2$VGA conversion circuit 67 is inhibited. Also, QVGA output data from QVGA conversion circuit 66 and a data valid timing signal are passed through. When a Q$^2$VGA mode is specified, the conversion operation of all conversion circuits 65–67 are allowed.

By providing a QVGA conversion circuit 66 and a Q$^2$VGA conversion circuit 67 at the succeeding stage of VGA conversion circuit 65, conversion of a plurality of formats can be carried out with a relatively simple circuit structure in comparison with the case where each conversion is carried out individually.

Furthermore, because image data can be provided to each of conversion units 65–67 with a common dot clock DCLK, conversion of the transfer rate of the image data is not required. It is also suitable to a FPGA (Field Programmable Gate Array) in which the number of clock lines are limited.

Another specific structure of the Q$^2$VGA conversion circuit of FIG. 35 will be described. Components corresponding to those of FIG. 38 have the same reference characters denoted, and their description will not be repeated.

Figure 42:
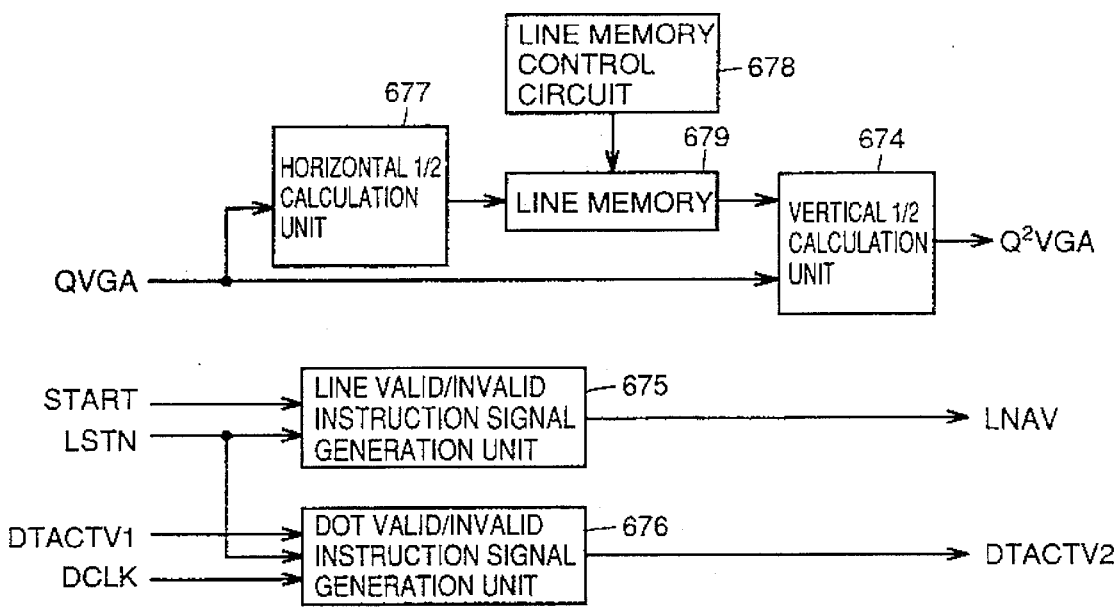
FIG. 42 is a block diagram showing another specific structure of the $Q^2VGA$ conversion circuit of FIG. 35.

The Q$^2$VGA conversion circuit of FIG. 42 includes a horizontal ½ calculation unit 677 at a preceding stage of line memory 379. Second data active signal DTACTV2 is input to line memory control circuit 678, whereby the line memory clock of line memory 678 is merged with second data active signal DTACTV2 indicating the validity of horizontal ½ conversion data.

Figure 43:
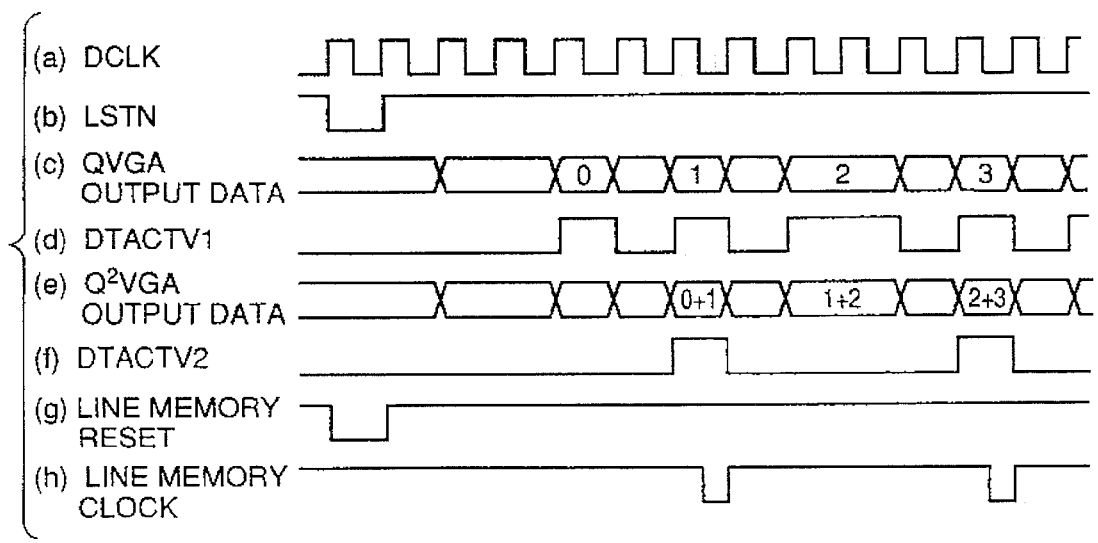
FIG. 43 is a timing chart for describing the operation of the $Q^2VGA$ conversion circuit of FIG. 42.

The operation of the Q²VGA conversion circuit of FIG. 42 will be described hereinafter with reference to FIG. 43. Line memory 679 has the reading and writing pointer reset by the reset pulse shown in FIG. 43(*a*). Reading and writing of position data is carried out by the line memory clock shown in FIG. 43(*h*), whereby reading and writing is carried out with respect to the same address at the same time.

Because the Q²VGA conversion circuit of FIG. 42 writes only the data after horizontal conversion, the capacity of the line memory can be reduced in comparison with that of the Q²VGA conversion circuit of FIG. 38. The remaining structure is similar to that of the above-described embodiment.

Another specific example of an image conversion circuit shown in FIG. 29 will be described hereinafter with reference to FIG. 44. Components in the image conversion circuit of FIG. 44 corresponding to those of FIG. 35 have the same reference characters denoted, and their description will not be repeated.

Figure 44:
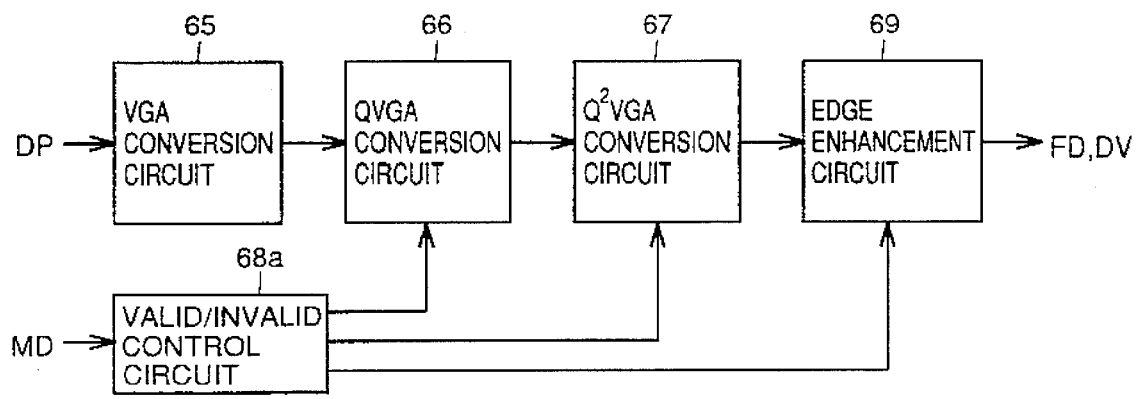
FIG. 44 is a block diagram showing another specific structure of the image conversion circuit of FIG. 29.

The image conversion circuit of FIG. 44 includes an edge enhancement circuit 69 at the succeeding stage of Q²VGA conversion circuit 67. By valid/invalid control circuit 68a, the enhancement operation of edge enhancement circuit 69 is inhibited or allowed.

Edge enhancement circuit 69 is formed of a conventionally well known filter for edge enhancement to enhance the edge of an image having its contour blurred according to the calculation by each of conversion circuits 65–67. The remaining structure is similar to that of the above-described embodiment.

Application of the present invention to another conversion format will be described hereinafter. For example, the present invention is applicable, in addition to the above-described CCD of 410000 pixels, to a CCD of 220000 (362×582 pixels). It is also applicable to the case of a multi-stage conversion where the first stage of conversion is to a CIF format (352×288 dots), and the second stage of conversion is to a QCIF (176×144 dots) format.

For example, using a first conversion circuit corresponding to VGA conversion circuit 65 of the above-described embodiment, the number of dots is reduced by removing the left 4 dots and the right 6 dots, and the number of lines is reduced by removing the top 3 lines of one field to obtain image data corresponding to a CIF format. This CIF format image data is passed through QVGA conversion circuit 66, and then subjected to a process described above by Q²VGA 67, resulting in a conversion into image data of QCIF format.

Figure 41:
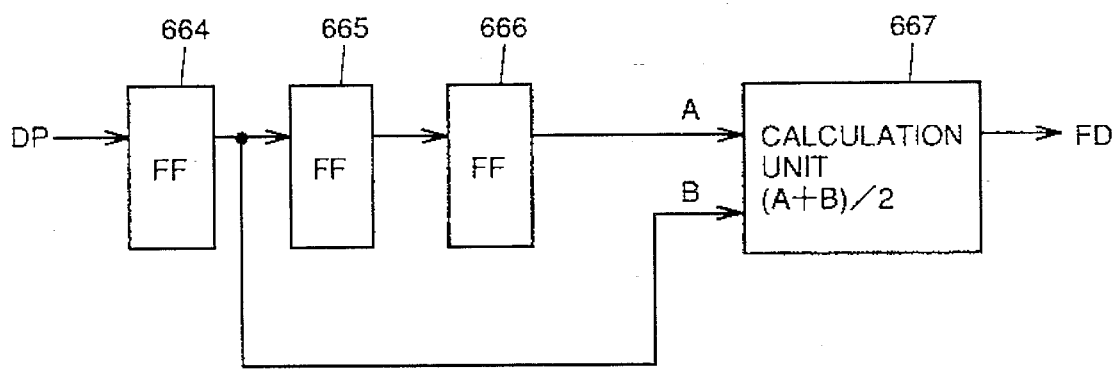
FIG. 41 is a block diagram showing a structure of a horizontal ½ calculation unit of FIG. 38.
Figure 45:
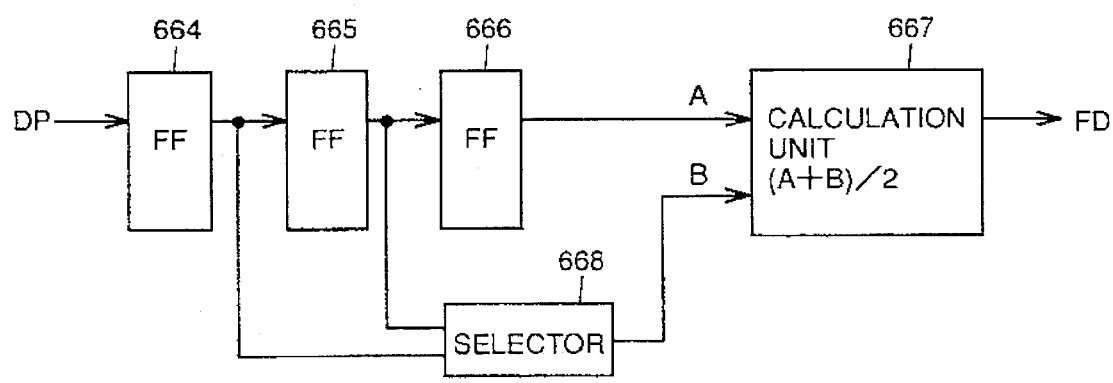
FIG. 45 is a block diagram showing another specific structure of the horizontal ½ calculation unit of FIG. 38.

In this case, the average value calculation in the horizontal direction in Q²VGA conversion circuit 67 is carried out between adjacent dots, and not between dots spaced apart by 1 dot as in the above-described embodiment. Therefore, the horizontal ½ calculation unit of FIG. 41 can be used. As shown in FIG. 45, a selector 668 for selecting either output of flipflop 664 of the first stage or flipflop 665 of the second stage may be provided to select a Q²VGA format conversion or a QCIF format conversion. The present invention is also applicable to a CCD of 270000 pixels (512×492 pixels) wherein a QVGA format conversion is carried out at the first stage, and a Q²VGA format conversion is carried out at the second stage.

In this case, a first conversion circuit corresponding to the above-described VGA conversion circuit 65 reduces the number of 16 dots to 10 dots, and reduces the number of lines of one field by removing the top and bottom 3 lines to obtain image data of a QVGA format. This image data is passed through the above-described QVGA conversion circuit 66, and subjected to a process by a Q²VGA conversion circuit that includes a horizontal ½ calculation unit shown in FIG. 45. Thus, a Q²VGA format conversion is carried out.

As described above, the conversion of two stages effectively uses the Q²VGA conversion circuit including a horizontal ½ calculation unit shown in FIG. 45. Therefore, when an ASIC circuit is formed with 3 conversion circuits 65–67 as one circuit, it is necessary to design the circuit individually according to its usage for the first stage conversion. However, the conversion of the second stage can be carried out using Q²VGA conversion circuit 67, so that the versatility of ASIC is improved, and the efficiency increased. The present invention is not limited to the above-described embodiment where three conversion circuits are provided, and two or four or more conversion circuits may be provided.

Figure 46:
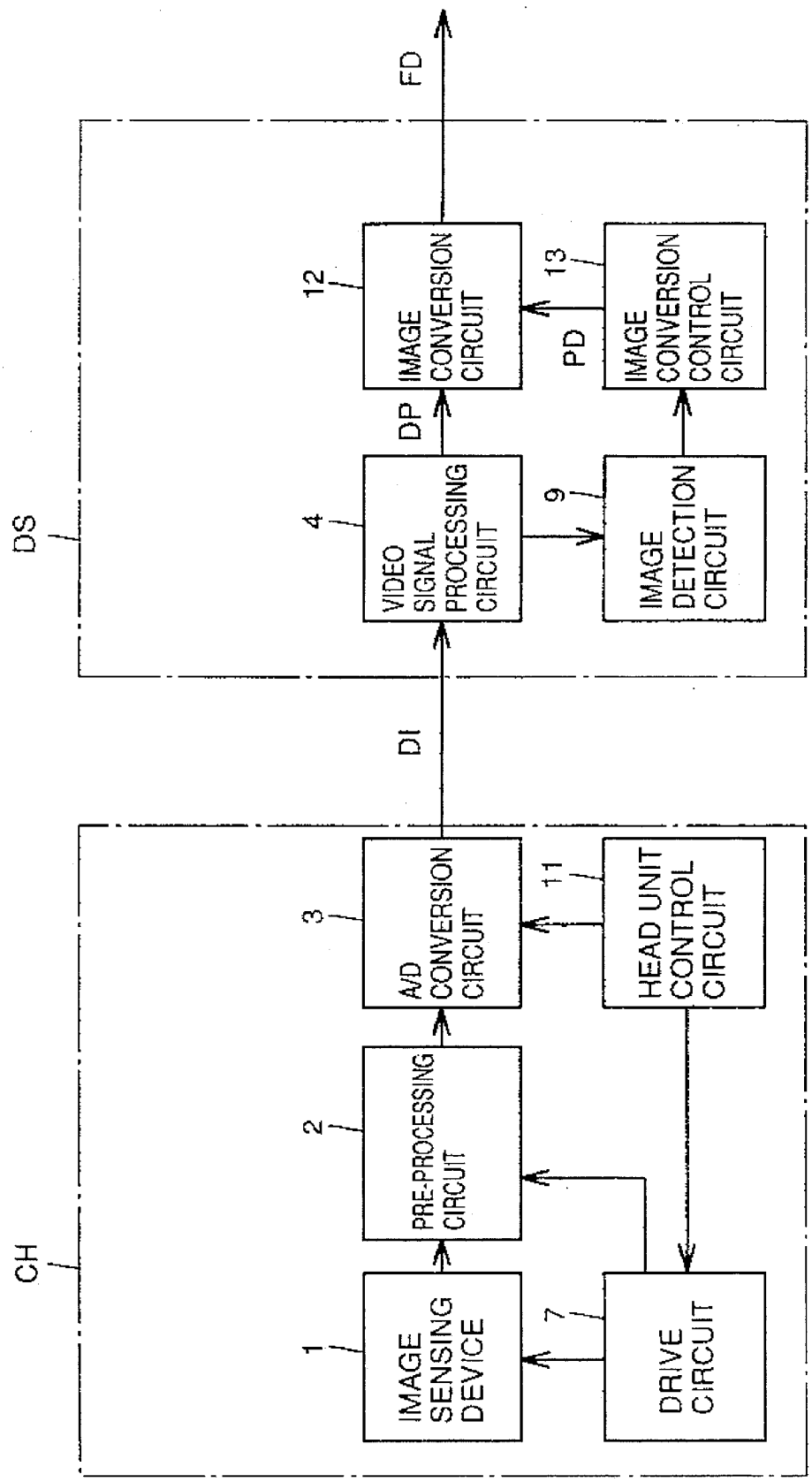
FIG. 46 is a block diagram showing a structure of an image processing apparatus according to an eleventh embodiment of the present invention.

An image processing apparatus according to an eleventh embodiment of the present invention will be described with reference to FIG. 46 showing a block diagram of a structure thereof.

Referring to FIG. 46, an image processing apparatus includes a camera head unit CH, and a digital signal processing unit DS. Cameral head unit CH includes an image sensing device 1, a pre-processing circuit 2, an A/D conversion circuit 3, a drive circuit 7, and a head unit control circuit 11. Digital signal processing unit DS includes a video signal processing circuit 4, an image conversion circuit 12, an image detection circuit 9, and an image conversion control circuit 13. The components of the image processing apparatus of FIG. 46 corresponding to those of the image processing device of the above-described embodiments have the same reference characters denoted, and their description will not be repeated.

Head unit control circuit 11 controls A/D conversion circuit 3 and drive circuit 7 to control the operation of camera head unit CH. Image conversion circuit 12 converts the image data to an image size specified by image conversion control circuit 13, for example converts the data into image data FD of a CIF or a VGA format according to luminance signal Y and color signals R-Y and B-Y provided from video signal processing circuit 4. Image conversion circuit 12 is formed of a FPGA (Field Programmable Gate Array) to have an arbitrary logic programmed according to program data. Image conversion control circuit 13 programs a predetermined logic that realizes the specified optimum image conversion method into an internal logic circuit of image conversion circuit 12.

The control operation of image conversion control circuit 13 of FIG. 46 will be described hereinafter with reference to the flow chart of FIG. 47.

Figure 47:
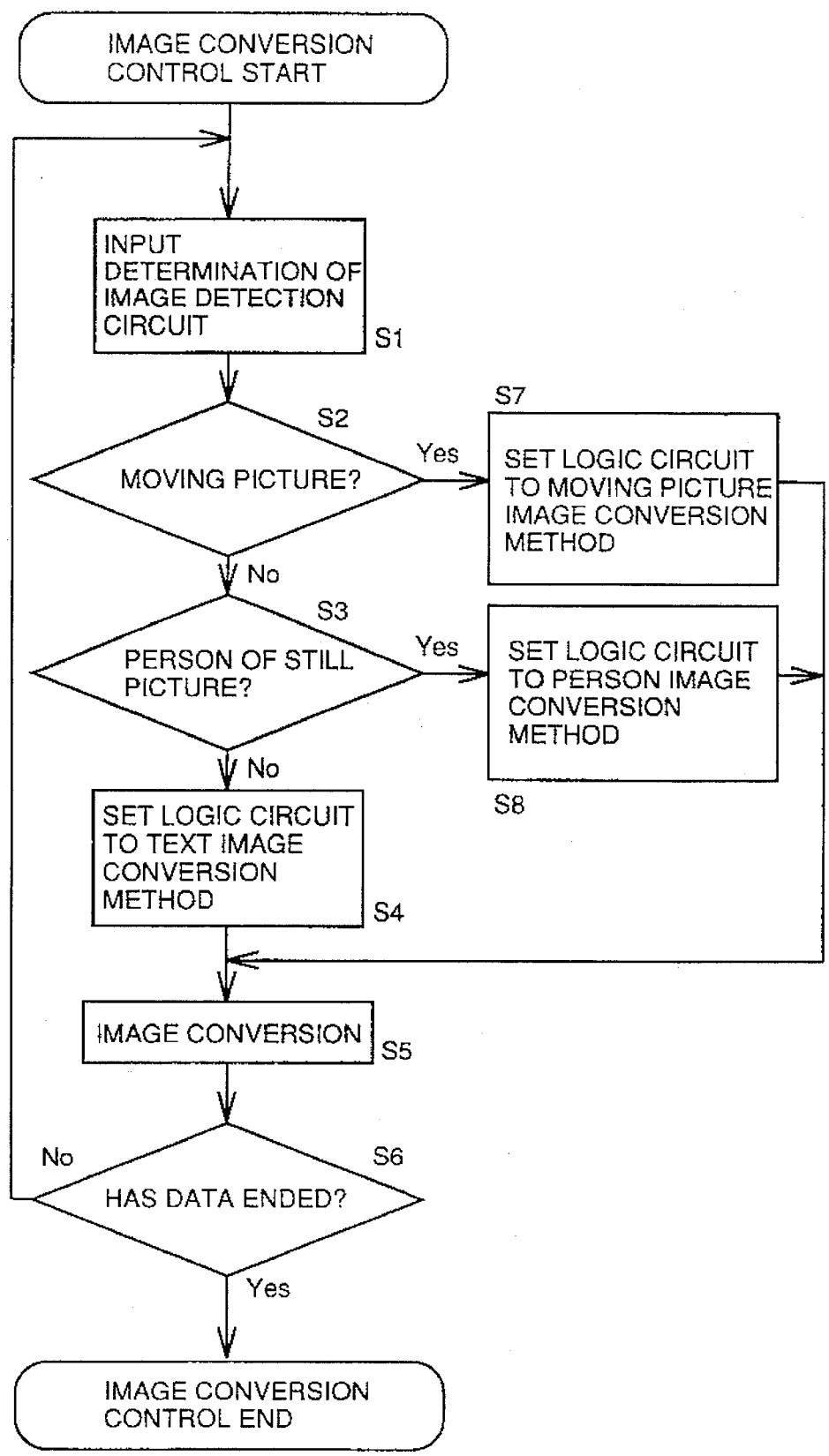
FIG. 47 is a flow chart for describing a control operation of an image conversion control circuit of FIG. 46.

Referring to FIG. 47, at step S1, the determination result of image detection circuit 9 is applied to image conversion control circuit 13. At step S2, confirmation is made whether the determination result indicates a moving picture. If a moving picture is indicated, the program proceeds to step S7, in which a predetermined logic is programmed in the FPGA internal logic circuit to set the image conversion method of the image conversion circuit to that corresponding to a moving picture. When the image is not a moving picture, the control proceeds to step S3 where confirmation is made whether the image is a person in a still picture. If yes, the control proceeds to step S8 where the logic circuit in FPGA is programmed to a predetermined logic to set the image conversion method to that corresponding to a person.

If determination is made that the image is not a still picture, it is assumed that the image is a still picture and a text image. The control proceeds to step S4 where the logic circuit in FPGA is programmed to a predetermined logic to set the image conversion method of image conversion circuit 12 to that for text. Here, image conversion circuit 12 is formed of a programmable logic circuit of a FPGA or the like. A logic circuit in FPGA can easily by set by rewriting the contents of the memory such as an EEPROM (Electric Erasable Programmable Read Only Memory) or the like connected to the FPGA, or by specifying the address of the memory.

When each process of steps S4, S7 and S8 is completed, the control proceeds to step S5. Image conversion circuit 12 converts a digital video signal that is input according to a predetermined image conversion method into image data FD corresponding to a predetermined image format according to the set logic. Then, image data FD is output. At step S6, confirmation is made whether data ends or not. When the data ends, the process is terminated. If the data has not yet ended, the control moves to step S1 to continue the subsequent process. More specifically, in the case of a subsequent data, the logic circuit in image conversion circuit 12 is set according to the determination result of image detection circuit 9 again, and an image format conversion corresponding to the feature of the image is executed according to the set predetermined logic. Then, image data FD of a predetermined image format is output.

Figure 48:
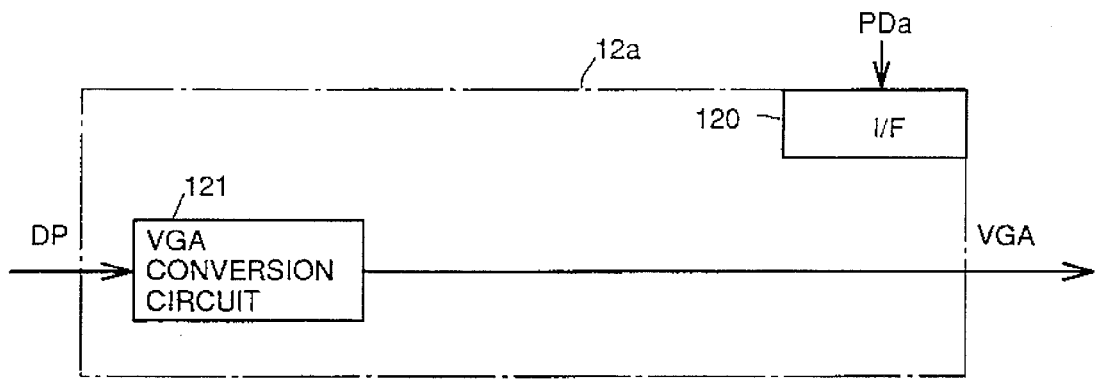
FIGS. 48, 49 and 50 are block diagram showing a first, a second, and a third, specific structure, respectively, of the image conversion control circuit of FIG. 46.

A specific example of image conversion circuit 12 set in the above process will be described hereinafter. FIG. 48 is a block diagram showing a first specific structure of the image conversion circuit of FIG. 46. The first specific example shows the case where image conversion control circuit 13 sets image conversion circuit 12 as an image conversion circuit 12a that carries out an image conversion for text according to the above-described flow chart.

Referring to FIG. 48, image conversion circuit 12a includes an interface (I/F) 120, and a VGA conversion circuit 121. VGA conversion circuit 121 reduces the number of dots in the horizontal direction and the number of lines in the vertical direction of the input digital video signal DP. More specifically, the top 4 lines and the bottom 3 lines of each odd number and even number field are removed, and the data of 6 dots is reduced to 5 dots, resulting in an output of image data VGA corresponding to a VGA format. The logic circuit of the FPGA is programmed according to program data PDa output from image conversion control circuit 13 via interface 120 to form VGA conversion circuit 121.

Figure 49:
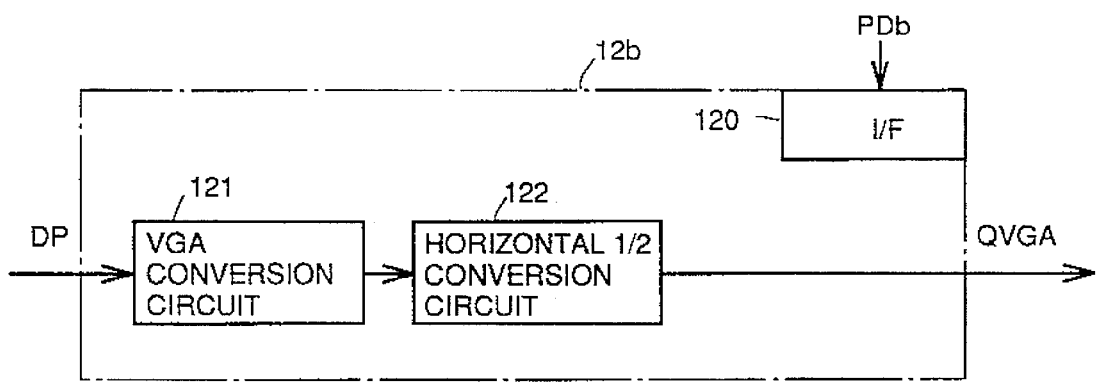

A second specific example of the image conversion circuit of FIG. 46 will be described hereinafter with reference to FIG. 49 showing a block diagram of a structure thereof. In the second specific example, image conversion control circuit 13 sets image conversion circuit 12 as an image conversion circuit 12b that carries out an image conversion for a person according to the above-described flow chart.

Referring to FIG. 49, image conversion circuit 12b includes an interface 120, a VGA conversion circuit 121, and a horizontal ½ conversion circuit 122. The logic circuit in the FPGA is programmed to a logic that carries out a person image conversion in response to program data PDb output from image conversion control circuit 13 via interface 120 to form VGA conversion circuit 121 and horizontal ½ conversion circuit 122. VGA conversion circuit 121 converts digital video signal DP to image data corresponding to a VGA format similar to VGA conversion circuit 121 shown in FIG. 48, and provides the same to horizontal ½ conversion circuit 122. Horizontal ½ conversion circuit 122 reduces the number of dots of the input image data to ½ in the horizontal direction, and outputs image data QVGA corresponding to a QVGA format.

A third specific example of the image conversion circuit of FIG. 46 will be described hereinafter with reference to FIG. 50 which is a block diagram showing a structure thereof. In the third specific example, image conversion control circuit 13 sets image conversion circuit 12 as an image conversion circuit 12c that carries out an image conversion for a moving picture according to the above-described flow chart.

Figure 50:
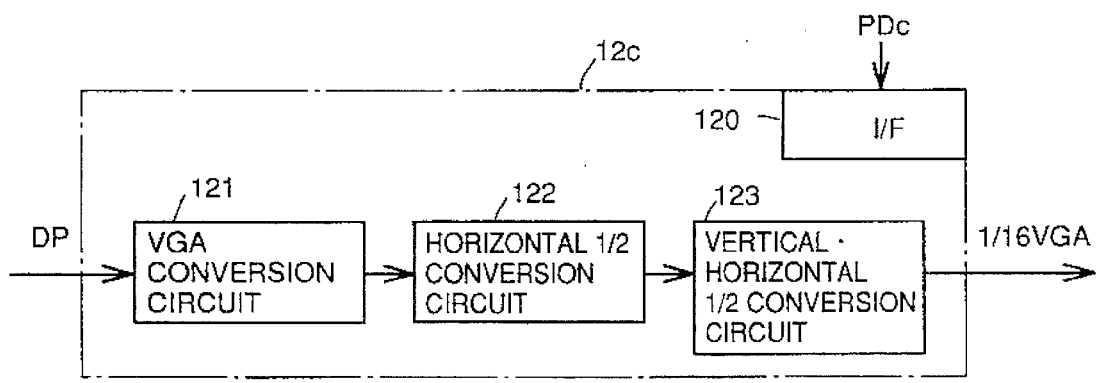

Referring to FIG. 50, image conversion circuit 12c includes an interface 120, a VGA conversion circuit 121, a horizontal ½ conversion circuit 122, and a vertical.horizontal ½ conversion circuit 123. According to program data PDc output from image conversion control circuit 13 via interface 120, the logic circuit in the FPGA is programmed to a predetermined logic that carries out image conversion for a moving image to form VGA conversion circuit 121, horizontal ½ conversion circuit 122, and vertical.horizontal ½ conversion circuit 123. Similar to the image conversion circuit of FIG. 49, VGA conversion circuit 121 and horizontal ½ conversion circuit 122 provides image data corresponding to a QVGA format to vertical-horizontal ½ conversion circuit 123. Vertical.horizontal ½ conversion circuit 123 reduces the input image data to ½ the number of lines in the vertical direction, and ½ the number of dots in the horizontal direction, and outputs image data ¹⁄₁₆ VGA corresponding to a ¹⁄₁₆ VGA format.

By programming an image conversion circuit 12 formed of one FPGA according to a predetermined logic in the prevent eleventh embodiment, image data corresponding to an image format conversion method conforming to the feature of the image can be output. An arbitrary image format conversion process can be carried out without increasing circuit complexity. It is also not necessary to additionally provide a circuit corresponding to each conversion method in carrying out an image format conversion of another format, for example a CIF format, a SIF format, or the like. By providing a FPGA circuit having the minimum number of required components for conversion in advance, an image conversion circuit corresponding to any conversion format can be formed. Therefore, increase in circuit complexity can be suppressed.

Figure 51:
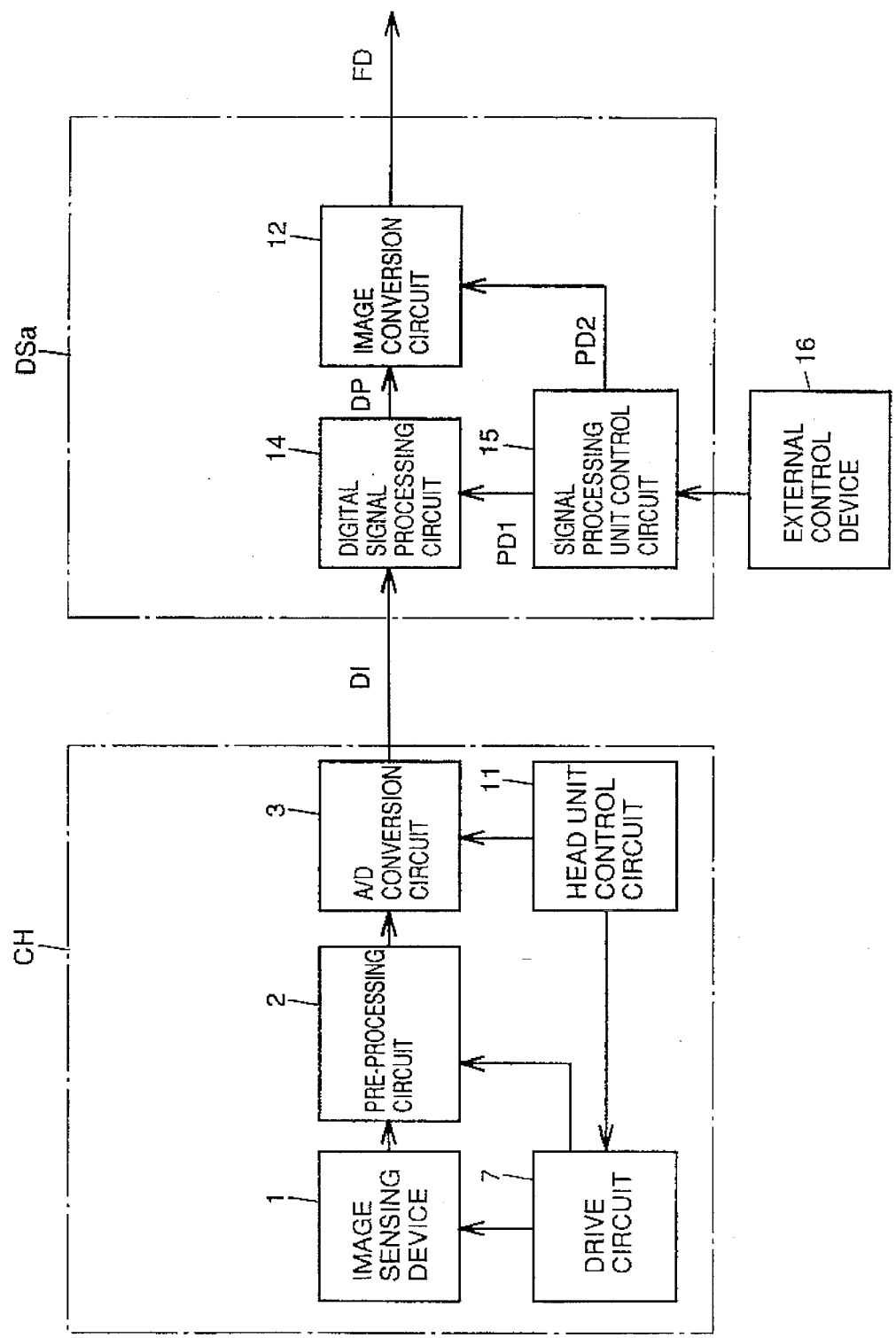
FIG. 51 is a block diagram showing a structure of an image processing apparatus according to a twelfth embodiment of the present invention.

An image processing apparatus according to a twelfth embodiment of the present invention will be described hereinafter with reference to the block diagram of FIG. 51 showing a structure thereof. The image processing circuit of FIG. 51 differs from the image processing apparatus of FIG. 46 in that the digital signal processing unit is modified to a digital signal processing unit DSa that operates upon receiving a control signal from an external control device 16. The remaining components are similar to those shown in FIG. 46, with the corresponding components having the same reference characters denoted. Their description will not be repeated.

Referring to FIG. 51, digital signal processing unit DSa includes an image conversion circuit 12, a digital signal processing circuit 14, and a signal processing unit control circuit 15. Digital signal processing circuit 14 and image conversion circuit 12 are formed of a FPGA that can have an arbitrary logic programmed therein. Signal processing unit control circuit 15 receives a control signal concerning the specification of the resolution of image sensing device 1 and the conversion method of image conversion circuit 12. On the basis of the input control signal, signal processing unit control circuit 15 provides program data PD1 to digital signal processing circuit 14, and program data PD2 to image conversion circuit 12. Digital signal processing circuit 14 has the internal logic circuit programmed according to program data PD1 to form a digital signal processing circuit 14 that carries out a predetermined video signal process. Image conversion circuit 12 has the internal logic circuit programmed according to program data PD2 to form an image conversion circuit that carries out a predetermined image format conversion process. Digital signal processing circuit 14 receives a digital image signal DI from camera head unit CH to carry out a predetermined video signal process, and then outputs digital video signal DP. Image conversion circuit 12 carries out a predetermined image format conversion on input digital video signal DP, and provides image data FD corresponding to a predetermined image format.

The control operation of the signal processing unit control circuit of FIG. 51 will be described hereinafter with reference to the flow chart of FIG. 52.

Figure 52:
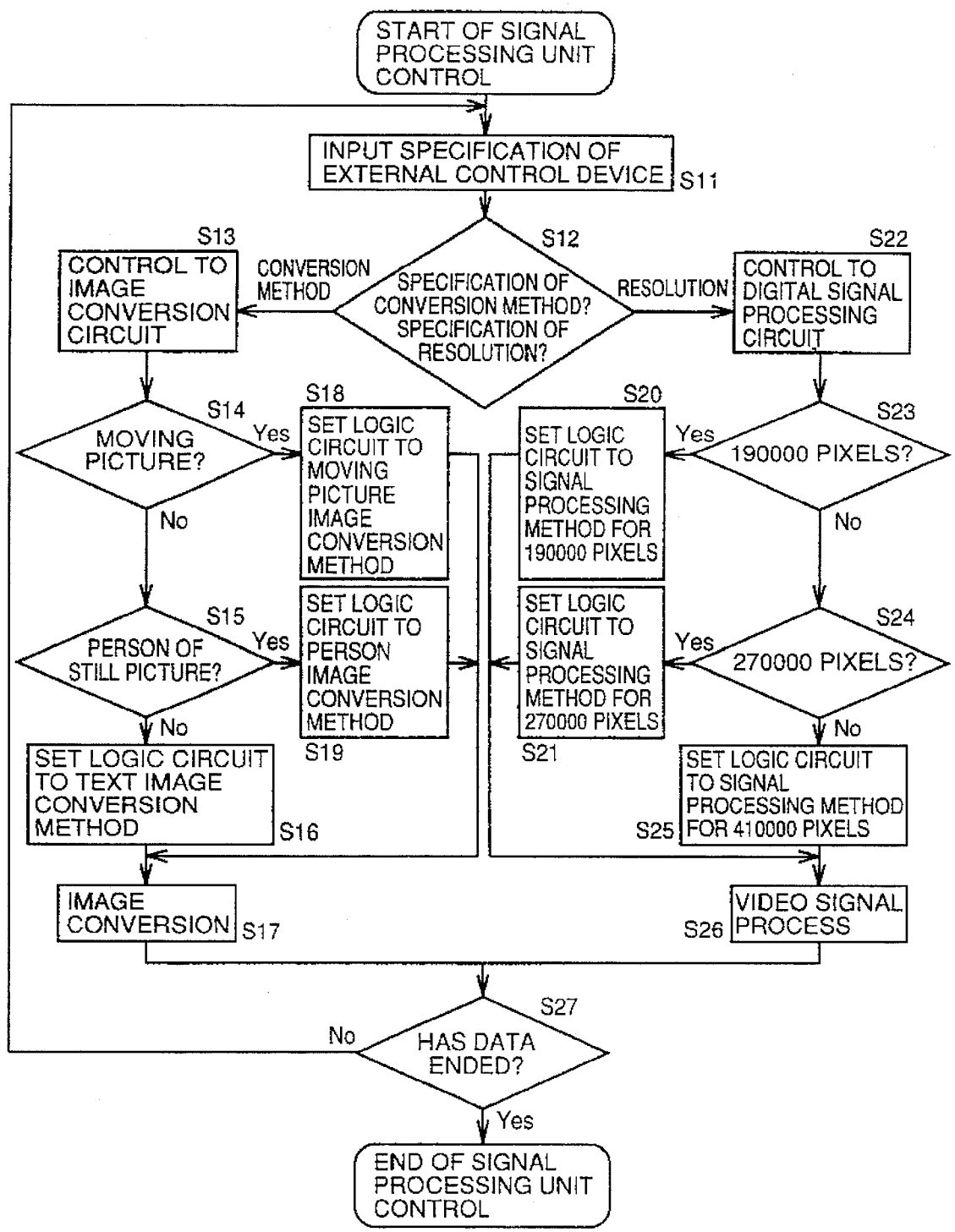
FIG. 52 is a flow chart for describing the control operation of a signal processing unit control circuit of FIG. 51.

Referring to FIG. 52, at step S11, a control signal specifying the resolution of image sensing device 11 and the conversion method of image conversion circuit 12 is input from an external control device such as a microcomputer. At step S12, determination is made whether the input control signal specifies the resolution of image sensing device 1 or specifies a conversion method. When a conversion method is specified, the control proceeds to step S13. When the resolution is specified, the control proceeds to step S22.

When a resolution is specified, control of digital signal processing circuit 14 is initiated at step S22. At step S23, determination is made whether the resolution of image sensing device 1 is 190000 pixels. If YES, the process proceeds to step S20, otherwise to step S24. At step S20, the internal logic circuit of digital signal processing circuit 14 is specified according to the video signal processing method of 190000 pixels. When the resolution is not 190000 pixels, determination is made whether the resolution is 270000 pixels at step S24. If YES, the process proceeds to step S21 to set the internal logic circuit of digital signal processing circuit 14 according to the video signal processing method for 270000 pixels. If the resolution is not 270000 pixels, determination is made that the resolution is 410000 pixels. At step S25, the internal logic circuit of digital signal processing circuit 14 is specified according to the video signal processing method for 410000 pixels. Thus, a digital signal processing circuit 14 that realizes a video signal process according to the resolution of image sensing device 1 can be constructed. At step S26, input digital video signal DI is processed according to the set video signal process, and digital video signal DP is output. At step S27, determination is made whether data input has ended or not. If YES, the process is terminated. If NO, the process returns to step S11 to carry out the subsequent process.

When determination is made that a conversion method is specified at step S12, control of the image conversion circuit is initiated at step S13. At step S14, determination is made whether the conversion is for a moving picture. If YES, a logic circuit corresponding to a moving image conversion method is set in digital signal processing circuit 14 at step S18. If the image is not a moving picture, the process proceeds to step S15 where determination is made whether the conversion is for a person in a still picture. If YES, the process proceeds to step S19 where a logic circuit corresponding to a person oriented image conversion method is specified in image conversion circuit 12. If the conversion is not for a person in a still picture, determination is made that it is a conversion method for text at step S16 to set a logic circuit corresponding to a text oriented image conversion method in image conversion circuit 12. Thus, a logic circuit corresponding to a specified conversion method is set in image conversion circuit 12. Then, at step S17, image format conversion is carried out using the specified image conversion circuit 12, and image data FD corresponding to a predetermined image format is output. At step S27, determination is made whether the data has ended or not. If NO, the process proceeds to step S11. If YES, the process is terminated.

Figure 53:
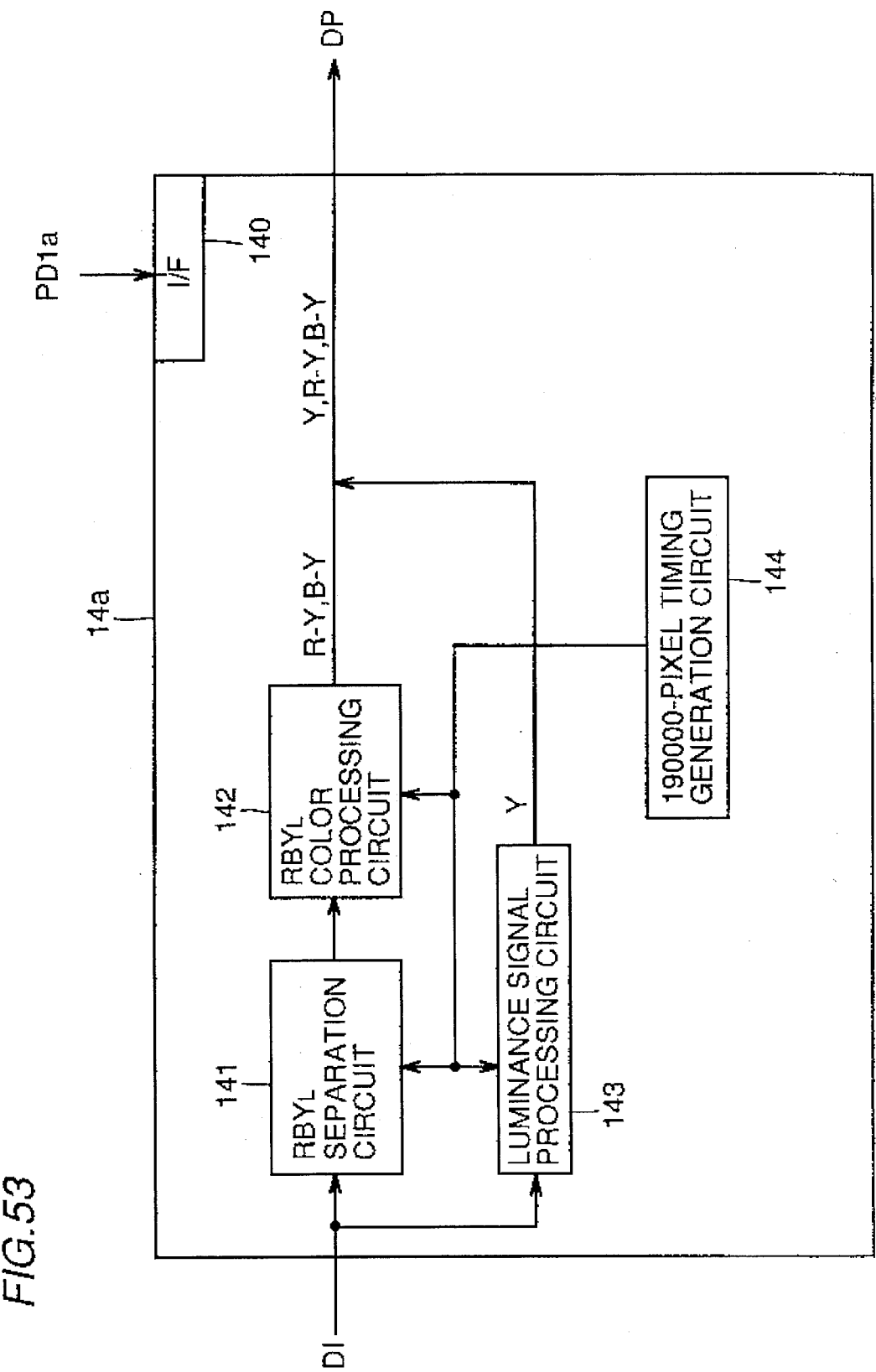
FIGS. 53, 54 and 55 are block diagrams showing a first, a second, and a third specific structure, respectively, of the digital signal processing circuit of FIG. 51.

A specific example of a digital signal processing circuit specified according to the flow chart of FIG. 52 will be described hereinafter with reference to the block diagram of FIG. 53 showing a first specific structure thereof. A digital signal process is carried out using a CCD of 190000 pixels, 270000 pixels, or 410000 pixels as image sensing device 1 of FIG. 51 for output to an image conversion circuit. Here, a digital video signal circuit includes peripheral circuits of the so-called image signal processing circuit and a timing generation circuit for video signal processing.

In the first specific example, signal processing unit control circuit 15 specifies digital signal processing circuit 14 as a digital signal processing circuit 14a that carries out a digital video signal process of 190000 pixels.

Referring to FIG. 53, digital signal processing circuit 14a includes an interface 140, a $RBY_L$ separation circuit 141, a $RBY_L$ color processing circuit 142, a luminance signal processing circuit 143, and a 190000-pixel timing generation circuit 144. According to program data PD1a output from signal processing unit control circuit 15 via interface 140, the internal logic circuit of the FPGA is programmed to a predetermined logic to form $RBY_L$ separation circuit 141, $RBY_L$ color processing circuit 142, luminance signal processing circuit 143, and 190000-pixel timing generation circuit 144.

Digital image data DI output from A/D conversion circuit 3 is applied to $RBY_L$ separation circuit 141 to have color difference signals R-Y and B-Y separated and output to $RBY_L$ color processing circuit 142. $RBY_L$ color processing circuit 142 adjusts the gain and phase of the input color difference signals R-Y and B-Y. Luminance signal processing circuit 143 receives digital image signal DI to adjust the gain and clip level of luminance signal Y. 190000-pixel timing generation circuit 144 provides a predetermined timing signal corresponding to the video signal processing method for 190000 pixels to $RBY_L$ separation circuit 141, $RBY_L$ color processing circuit 142, and luminance signal processing circuit 143, whereby $RBY_L$ separation circuit 141, $RBY_L$ color processing circuit 142 and luminance signal processing circuit 143 carry out the above-described operation in response to an input timing signal. Thus, luminance signal Y and color difference signals R-Y and B-Y subjected to a video signal process of 190000 pixels are output as digital video signal DP.

Figure 54:
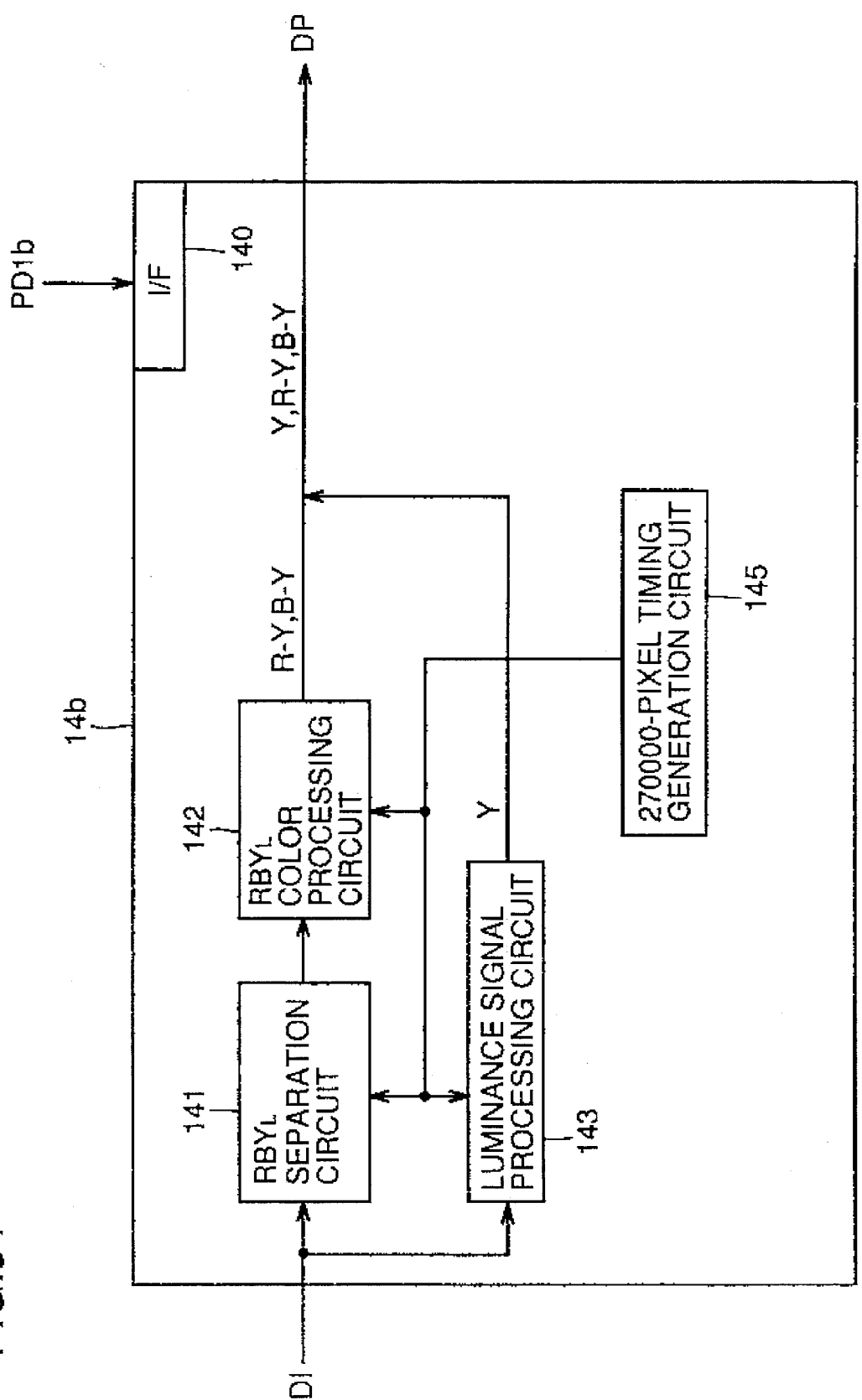

A second specific example of the digital signal processing circuit of FIG. 51 will be described hereinafter with reference to the block diagram of FIG. 54 showing a structure thereof. Here, signal processing unit control circuit 15 specifies digital signal processing circuit 14 as a digital signal processing circuit 14b that carries out a digital signal video process for 270000 pixels according to the flow chart of FIG. 52.

Digital signal processing circuit 14b of FIG. 54 differs from digital signal processing circuit 14a of FIG. 53 in that a 270000-pixel timing generation circuit 145 is formed instead of 190000-pixel timing generation circuit 144. The remaining components are similar to those of the above described digital signal processing circuit 14a, and their description will not be repeated. According to program data PD1b from signal processing unit control circuit 15 via interface 140, the internal logic circuit of the FPGA is programmed to a predetermined logic to form a $RBY_L$ separation circuit 141, a $RBY_L$ color processing circuit 142, a luminance signal processing circuit 143 and a 270000-pixel timing generation circuit 145. 270000-pixel timing generation circuit 145 provides a timing signal suitable for the video signal process for 270000 pixels to $RBY_L$ separation circuit 141, $RBY_L$ color processing circuit 142, and luminance signal processing circuit 143, so that they operate in a manner similar to the operation of the digital signal processing circuit of FIG. 53 in response to an input timing signal. As a result, digital signal processing 14b provides digital video signal DP subjected to a video signal process for 270000 pixels.

Figure 55:
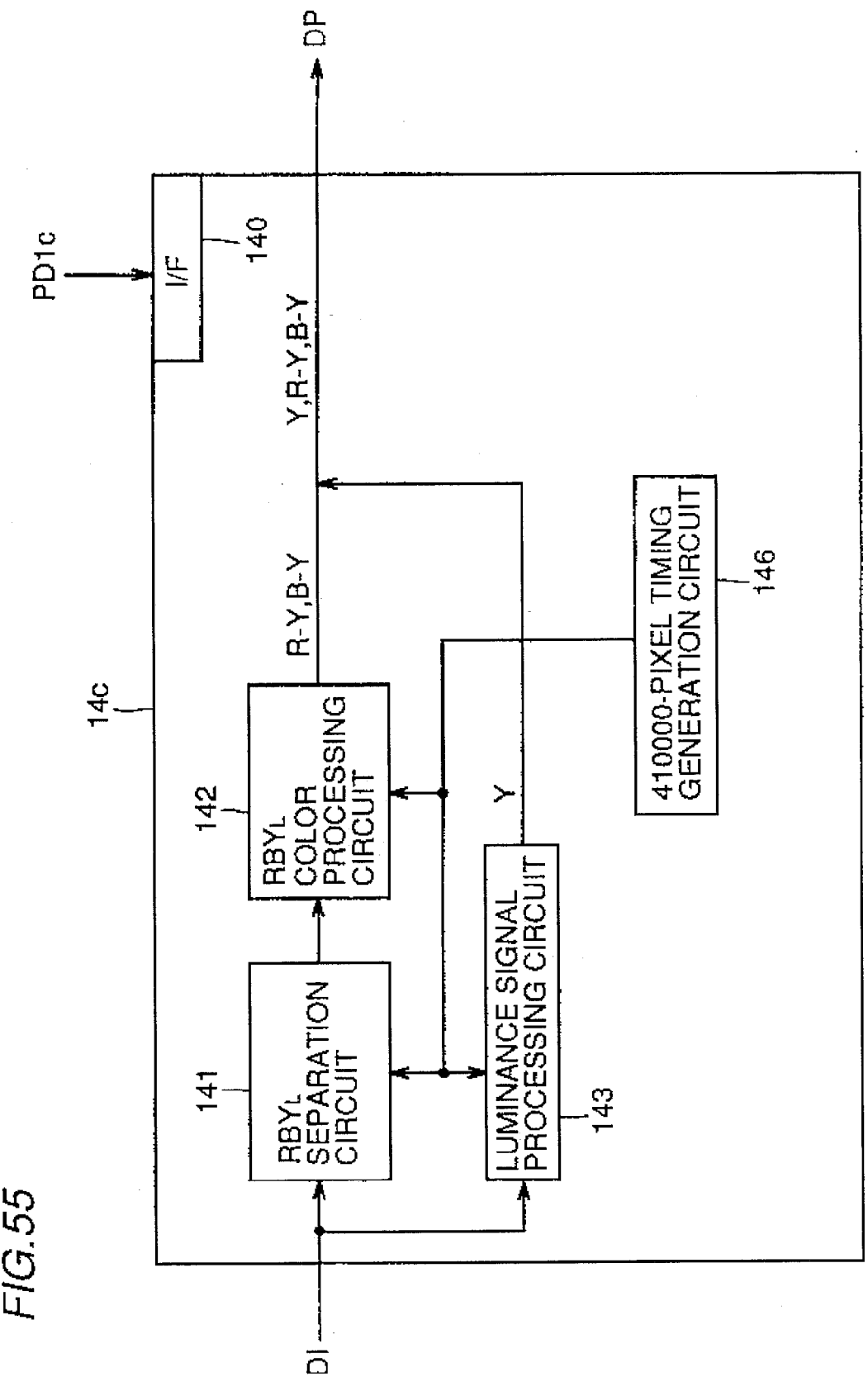

A third specific example of the digital signal processing circuit of FIG. 51 will be described hereinafter with reference to the block diagram of FIG. 55 showing a structure thereof. In the third specific example, signal processing unit control circuit 15 sets digital signal processing circuit 14 as a digital signal processing circuit 14c that carries out a digital signal process for 410000 pixels.

Digital signal processing circuit 14c of FIG. 55 differs from digital signal processing circuit 14a of FIG. 53 in that a 410000-pixel timing generation circuit 146 is formed instead of 190000-pixel timing generation circuit 144. The remaining components are similar to those of the above-described digital signal processing circuit 14a, and their description will not be repeated.

According to program data PD1c output from signal processing unit control circuit 15 via interface 140, the internal logic circuit of the FPGA is programmed to a predetermined logic to form a $RBY_L$ separation circuit 141, a $RBY_L$ color processing circuit 142, a luminance signal processing circuit 143, and a 410000-pixel timing generation circuit 146. 410000-pixel timing generation circuit 146 provides a timing signal suitable for a video signal process of 410000 pixels to $RBY_L$ separation circuit 141, $RBY_L$ color separation circuit 142, and luminance signal processing circuit 143, so that these circuits operate in a manner similar to the operation of the digital signal processing circuit shown in FIG. 53. As a result, digital signal processing circuit 14c provides a digital video signal DP subjected to a video signal process for 410000 pixels.

Because digital signal processing circuit 14 is formed of a FPGA, an arbitrary video signal process can be realized by setting a predetermined logic program by a predetermined logic data. An arbitrary video signal process can be carried out by one FPGA. Therefore, the circuit complexity is not increased, and an arbitrary video signal process can be carried out.

Image conversion circuit 12 of FIG. 51 is formed of a FPGA as in the image conversion circuit of FIG. 46 to realize an arbitrary image format conversion process according to program data output from signal processing unit control circuit 15. Therefore, digital signal processing circuit 14 and image conversion circuit 12 can realize an arbitrary video signal process and image format conversion process according to the resolution of image sensing device 1 or the specified conversion method. Even if a line sensor used in a scanner is employed as image sensing device 1, a circuit does not have to be newly provided. A video signal process and an image format conversion process according to the resolution of the line sensor can be carried out.

Figure 56:
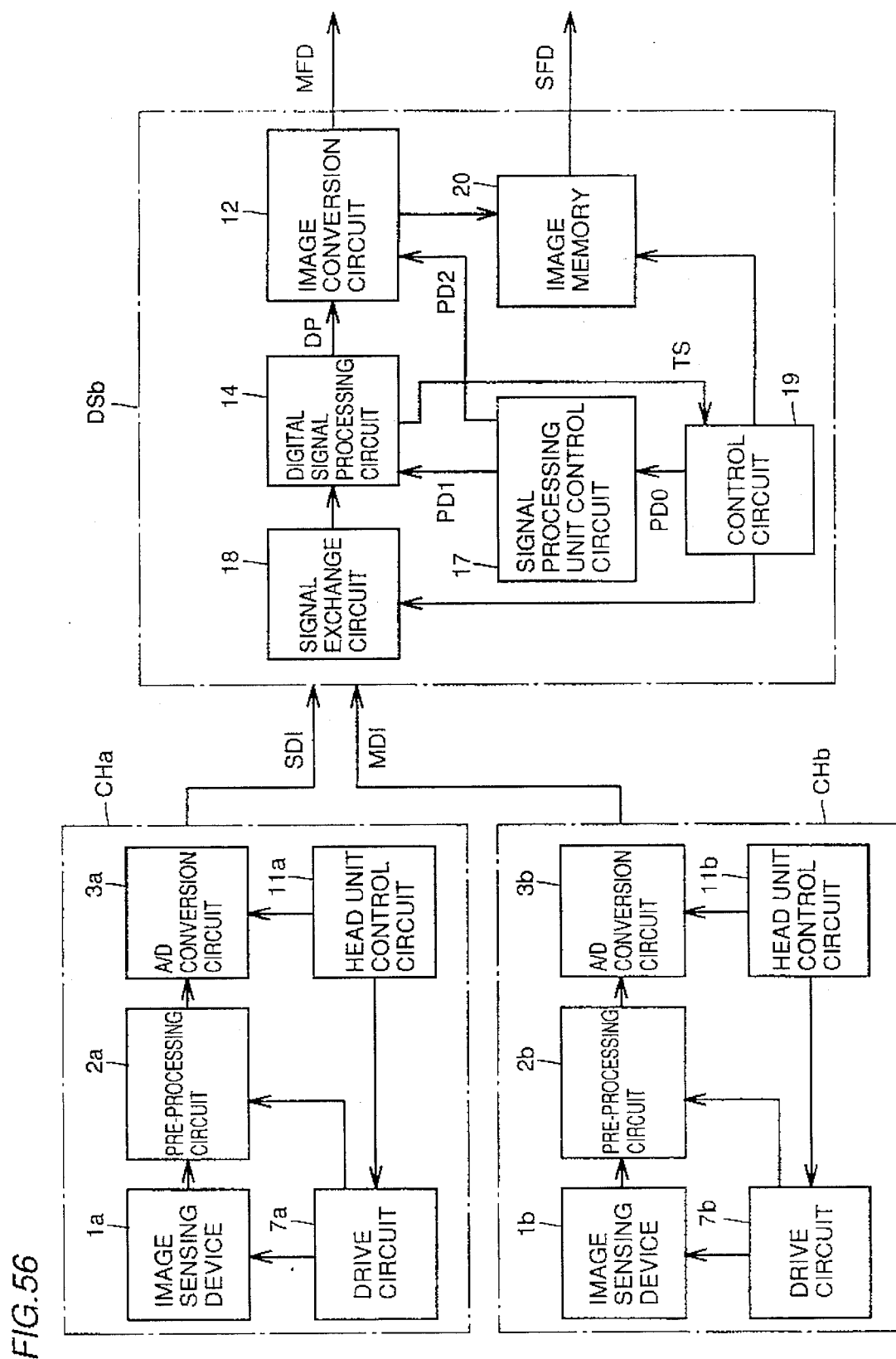
FIG. 56 is a block diagram showing a structure of an image processing apparatus according to a thirteenth embodiment of the present invention.

An image processing apparatus according to a thirteenth embodiment of the present invention will be described hereinafter with reference to the block diagram of FIG. 56 showing a structure thereof.

Referring to FIG. 56, the present image processing apparatus includes a still picture camera head unit CHa, a moving picture camera head unit CHb, and a digital signal processing unit DSb. Still picture camera head unit CHa includes an image sensing device 1a, a pre-processing circuit 2a, an A/D conversion circuit 3a, a drive circuit 7a, and a head unit control circuit 11a. Moving picture camera head unit CHb includes an image sensing device 1b, a pre-processing circuit 2b, an A/D conversion circuit 3b, a drive circuit 7b, and a head unit control circuit 11b. Digital signal processing unit DSb includes a signal switching circuit 18, a digital signal processing circuit 14, an image conversion circuit 12, a signal processing unit control circuit 17, a control circuit 19, and an image memory 20.

A CCD of 190000 pixels is used as image sensing device 1a, and a CCD of 410000 pixels is used as image sensing device 1b. Alternatively, a line sensor or the like used in a scanner may be employed as image sensing device 1a. Still picture and moving picture camera head units CHa and CHb operate in a manner similar to that of camera head unit CH of FIG. 46, and outputs a digital image signal SDI of a still picture and digital image signal MDI of a moving picture respectively.

According to the control of control circuit 19, signal switching circuit 18 selects either the input digital image signal SDI or MDI to provide the same to digital signal processing circuit 14. Digital signal processing circuit 14 and image conversion circuit 12 are formed of a FPGA similar to that of the second embodiment, and have an arbitrary logic programmed according to program data PD1 or PD2 output from signal processing unit control circuit 17. According to the programmed logic, digital signal processing circuit 14 generates a digital video signal DP of luminance signal Y and color signal R-Y and B-Y, and carries out a white balance process, a gamma correction process, or the like. Image conversion circuit 12 converts the image data into an image size specified by signal processing unit control circuit 17, for example a CIF, a FPGA, or the like format according to the input luminance signal Y and color signals R-Y and B-Y.

According to the control of control circuit 19, image memory 20 stores digital data of a still picture subjected to an image conversion process by image conversion circuit 12. According to the resolution and image format conversion method specified by control circuit 19, signal processing unit control circuit 17 programs digital signal processing circuit 14 and image conversion circuit 12 with a predetermined logic.

Control circuit 19 is formed of a microcomputer or the like to control signal processing unit control circuit 17, signal switching circuit 18, and image memory 20 as set forth in the following. When digital image signal MDI for a moving picture attains a blanking period, signal switching circuit 18 provides digital video signal SDI of a still picture to digital signal processing circuit 14. Digital signal processing circuit 14 and image conversion circuit 12 executes an image signal process and a part of an image format conversion process suitable for the resolution of image sensing device 1a and the process for a still image, whereby the generated image data is sequentially stored in image memory 20.

When all the input image data are stored and the process is completed, image memory 20 outputs still image data SFD. When digital image signal MDI of a moving picture does not attain a blanking period, signal switching circuit 18 provides digital video signal MDI of a moving picture to digital signal processing circuit 14. Digital signal processing circuit 14 and image conversion circuit 12 execute a video signal process and an image format conversion process that matches the resolution of the image sensing device 1b and the moving picture to output moving data MFD.

The control operation of the control circuit of FIG. 56 will be described hereinafter with reference to the flow chart of FIG. 57.

Figure 57:
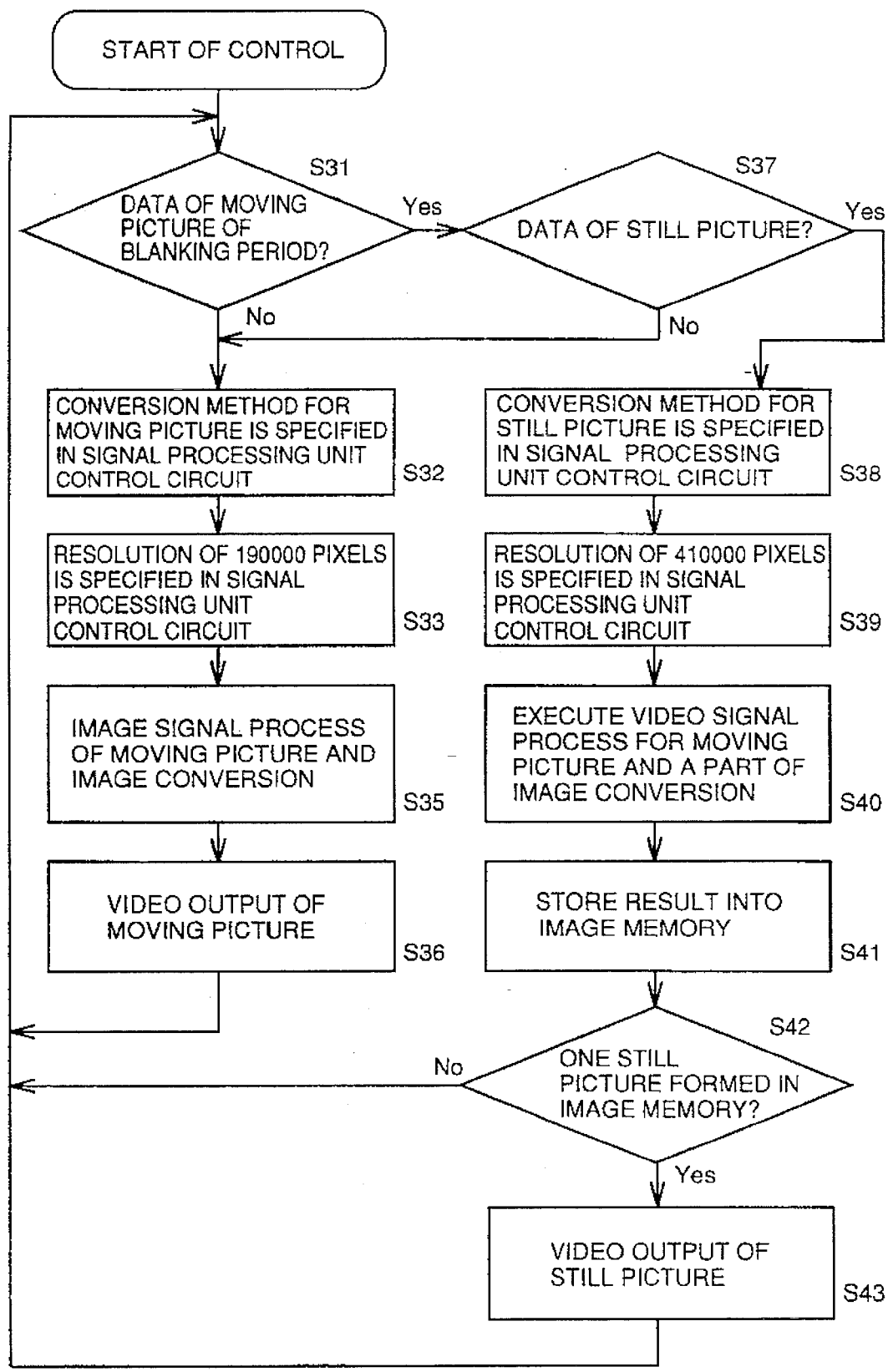
FIG. 57 is a flow chart for describing the control operation of the control circuit of FIG. 56.

Referring to FIG. 57, at step S31, determination is made whether digital image signal MDI of a moving picture provided from moving picture head camera unit 1b which is a camera for a moving picture attains a blanking period or not. If YES, the process proceeds to step S37, otherwise to step S32. If not at a blanking period, a conversion method for a moving picture is specified in signal processing unit control circuit 17 at step S32. At step S33, the resolution of 190000 pixels is specified in signal processing unit control circuit 17. At step S35, signal processing unit control circuit 16 carries out specification so that digital signal processing circuit 14 and image conversion circuit 12 carry out a video signal process and an image format conversion process for a moving picture. At step S36, a process for a moving picture is carried out using the specified digital signal processing circuit 14 and image conversion circuit 12 to output image data MFD of a moving picture. Then, the process returns to step S31 to carry out the subsequent process.

When digital image signal MDI of a moving picture attains a blanking period, determination is made whether digital video signal SDI of a still picture is output or not at step S37. If NO, the process proceeds to step S32 to carry out the subsequent process. If digital image signal SDI is output, the process proceeds to step S38. When digital image signal SDI of a still picture is input, a conversion method for a still picture is specified in signal processing unit control circuit 17 at step S38. At step S39, the resolution is set to 410000 pixels in signal processing unit control circuit 17. At step S40, signal processing unit control circuit 17 programs digital signal processing circuit 14 and image conversion circuit 12 to achieve a logic corresponding to an image signal process and an image format conversion process for a still picture. Digital signal processing circuit 14 and image conversion circuit 12 execute a still image video signal process and a part of the image format conversion process according to the specified logic, and provides the converted image data to image memory 20.

At step S41, image memory 20 stores the converted result. At step S42, determination is made whether the data stored in image memory 20 forms one still picture video or not. When one still picture is not yet formed, the process returns to step S31 to carry out the subsequent process. If 1 still picture is formed, the process proceeds to step S43 where the one still picture stored in video memory 20 is output as image data SFD.

According to the above operation, digital image signal SDI of a still picture is processed during the blanking period, i.e. when digital image signal MD of a moving picture does not have to be processed by digital signal processing circuit 14 and image conversion circuit 12. Therefore, the process for a moving picture and a still picture can be effectively carried out. Because the above-described process is carried out by digital signal processing circuit 14 and image conversion circuit 12 formed by a FPGA, circuit complexity is not increased. In the thirteenth embodiment, a video signal process and an image format conversion process according to the resolution of the image sensing device and the feature of the image can be carried out. An optimum image signal process and image format conversion process can be realized without increasing the circuit complexity.

The present invention is not limited to the above embodiment where two types of videos are processed by two camera head units, and three or more types of video can be processed if the rate of the process of digital signal processing unit DSb is high enough. Furthermore, for several types of moving pictures which are forwarded for a television conference or the like, a still picture process can be carried out at high speed by the image memory to improve the efficiency of the entire process.

An image processing apparatus according to a fourteenth embodiment of the present invention which is a digital camera will be described hereinafter with reference to the block diagram of FIG. 58.

Figure 58:
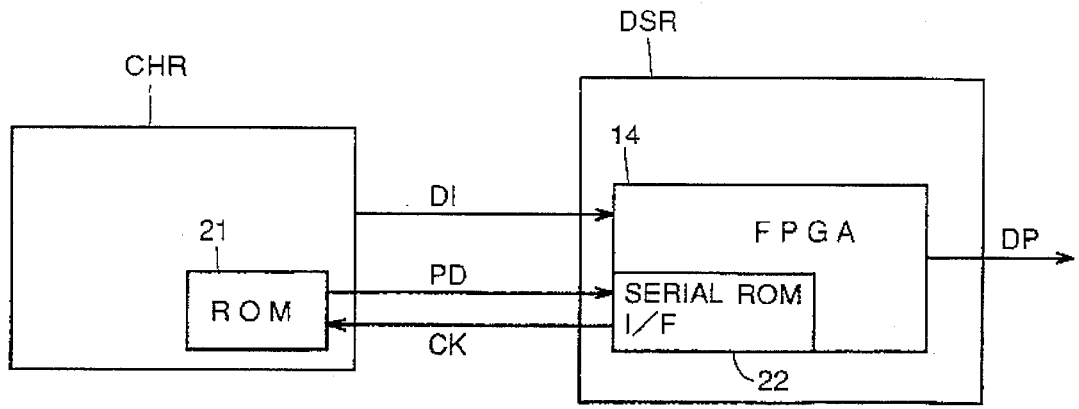
FIG. 58 is a block diagram showing a structure of an image processing apparatus according to a fourteenth embodiment of the present invention.

Referring to FIG. 58, an image processing apparatus includes a camera head unit CHR, and a digital signal processing unit DSR. Camera head unit CHR includes a ROM (Read Only Memory) 21. Digital signal processing unit DSR includes a digital signal processing circuit 14 and a serial ROMI/F22.

Digital signal processing unit DSR is formed of a FPGA to program an arbitrary logic according to programmed with data. Camera head CHR includes ROM 21 that holds program data for programming the FPGA logic circuit in digital signal processing circuit 14.

Digital signal processing circuit 14 provides a clock CK to read out data to ROM 21 via serial ROMI/F22 when the power is turned on. Upon receiving clock CK, ROM21 provides to digital signal processing circuit 14 program data PD which is serial data in synchronization with clock CK.

Digital signal processing circuit 14 forms an internal logic circuit according to the input program data. The above-described operation is automatically carried out by digital signal processing circuit 14o When the programming of the internal logic circuit ends, digital signal processing circuit 14 attains an operating state to convert digital image signal DI output from camera head unit CHR into a video signal DP corresponding to a predetermined video method according to the program data stored in ROM 21.

The program data stored in ROM 21 is generated by being automatically converted from a net list of the logic circuit by a FPGA development device (not shown).

Figure 59:
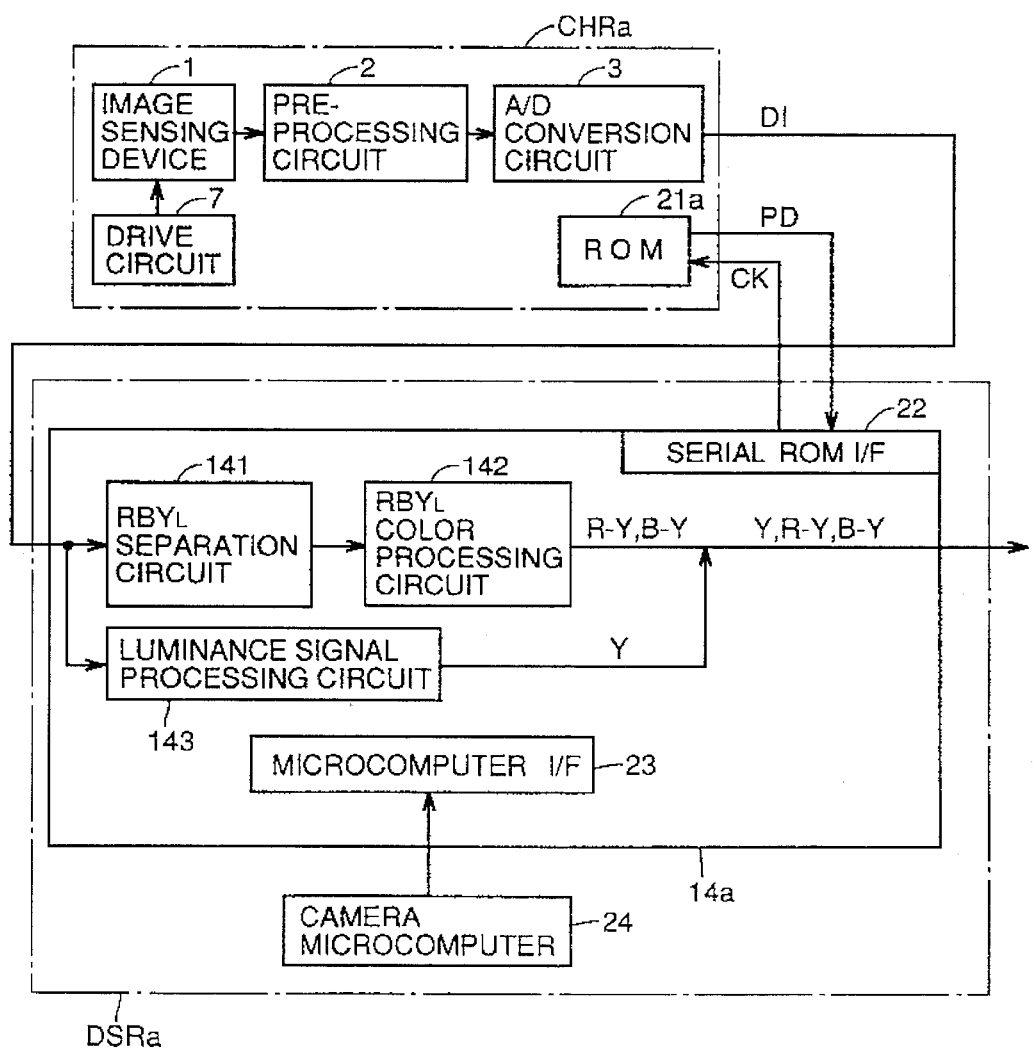
FIGS. 59, 60, and 61 are block diagrams showing a first, a second, and a third specific structure, respectively, of the image processing apparatus shown in FIG. 58.

A specific structure of the image processing apparatus of FIG. 58 will be described hereinafter. Each following embodiment can select a desired structure by modifying the program data stored in ROM 21. FIG. 59 is a block diagram showing a first specific example of the image processing apparatus of FIG. 58 for providing a digital video signal of a color difference system.

Referring to FIG. 59, an image processing apparatus includes a camera head unit CHRa and a digital signal processing unit DSRa. Camera head unit CHRa includes an image sensing device 1, a pre-processing circuit 2, an A/D conversion circuit 3, a drive circuit 7, and a ROM 21a. Digital signal processing unit DSRa includes a digital signal processing circuit 14a, a serial ROMI/F22, and a camera microcomputer 24. Digital signal processing circuit 14a includes a $RBY_L$ separation circuit 141, a $RBY_L$color processing circuit 142, a luminance signal processing circuit 143, and a microcomputer I/F23.

$RBY_L$ separation circuit 141 separates and provides a R signal, a B signal and a $Y_L$ signal (low frequency components of the luminance) from the digital image data output from A/D conversion circuit 3. $RBY_L$ color processing circuit 142 carries out a white balance control, a conversion into a color difference signal, specification of color difference gain, and the like on signals R, B, and $Y_L$ output from $RBY_L$ color separation circuit 141 to provide color difference signals of R-Y and B-Y. Luminance signal processing circuit 143 extracts luminance signal Y from the digital image signal output from A/D conversion circuit 3 to carry out a contour correction or the like. Camera microcomputer 24 controls the white balance and the iris via microcomputer I/F23.

The above-described $RBY_L$ separation circuit 141, $RBY_L$ color processing circuit 142 and luminance signal processing circuit 143 are formed according to the logic circuit of digital signal processing circuit 14 of the FPGA programmed by program data PD applied from ROM 21a via serial ROMI/F22. By the above-described operation, the image processing apparatus of FIG. 59 provides digital video signals Y, R-Y and B-Y of the color difference system.

A second specific embodiment of the image processing apparatus of FIG. 58 will be described hereinafter with reference to the block diagram of FIG. 60. The corresponding components in the image processing apparatus of FIG. 60 and that of FIG. 59 have the same reference character denoted, and their description will not be repeated.

Figure 60:
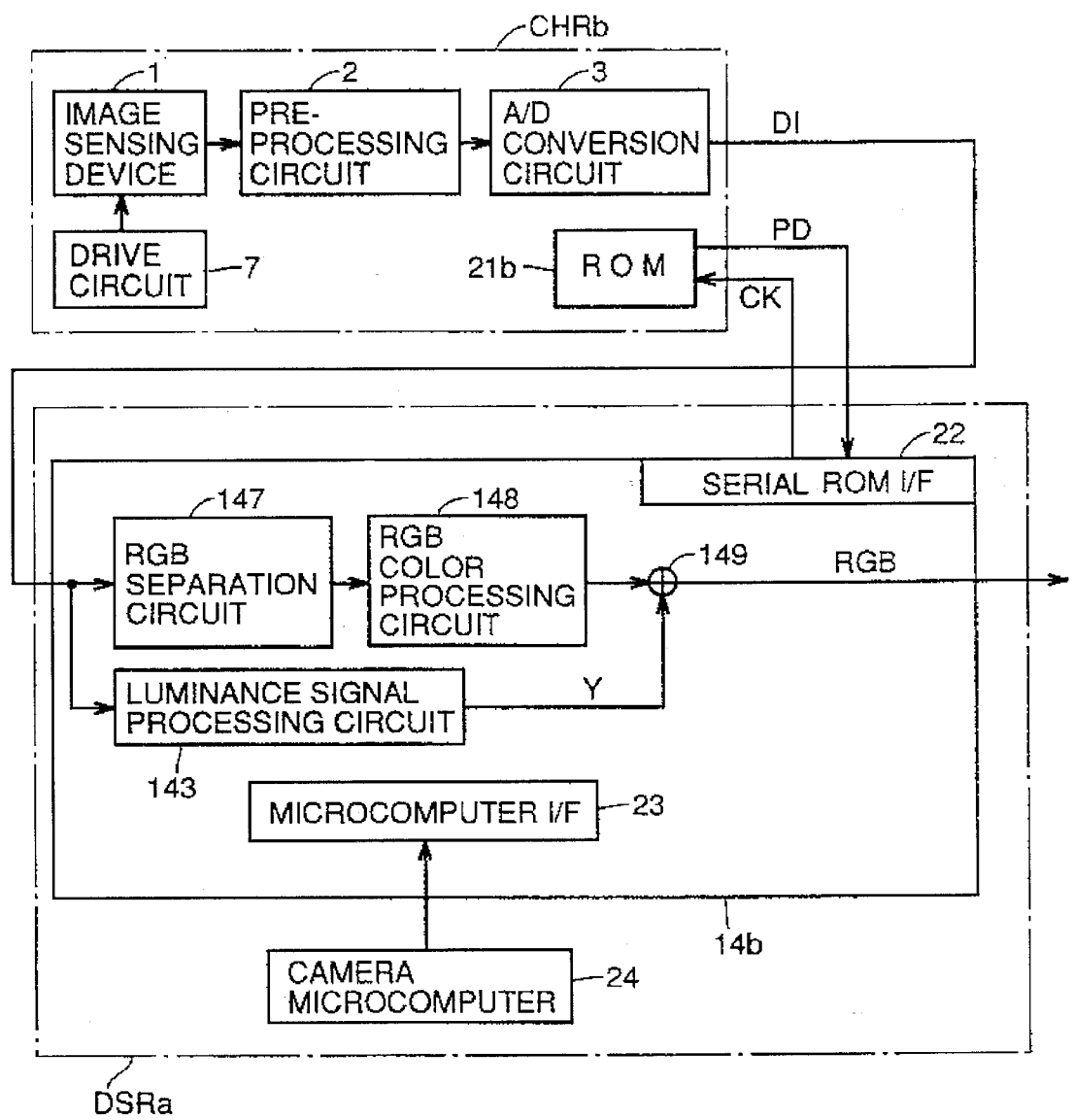

The image processing apparatus of FIG. 60 provides a digital signal of a primary color system. Instead of $RBY_L$ separation circuit 141 and $RBY_L$ color processing circuit 142 shown in FIG. 59, a digital signal processing circuit 14b of FIG. 60 includes a RGB separation circuit 147, a RGB color processing circuit 148, and an adder 149. RGB separation circuit 147, RGB color processing circuit 148, and adder 149 are formed according to the FPGA logic circuit programmed by program data stored in ROM 21b.

RGB separation circuit 147 separates and provides a R signal, a B signal, and a G signal from the digital image data output from A/D conversion circuit 3. RGB color processing circuit 148 applies a white balance control, gain specification, and the like on the input RGB signal, which is then provided to adder 149.

Luminance signal processing circuit 143 extracts luminance signal Y from the digital image data from A/D conversion circuit 3 to apply contour correction thereon. The corrected luminance signal Y is provided to adder 149. Adder 149 adds the color signals and the luminance signal to provide a digital video signal of a RGB system. By the above-described operation, a digital video signal of a primary color system is output from digital signal processing unit DSRb.

A third specific example of the image processing apparatus of FIG. 58 will be described hereinafter with reference to the block diagram of FIG. 61. The corresponding components in the image processing apparatuses of FIGS. 61 and 59 have the same reference characters denoted, and their description will not be repeated.

Figure 61:
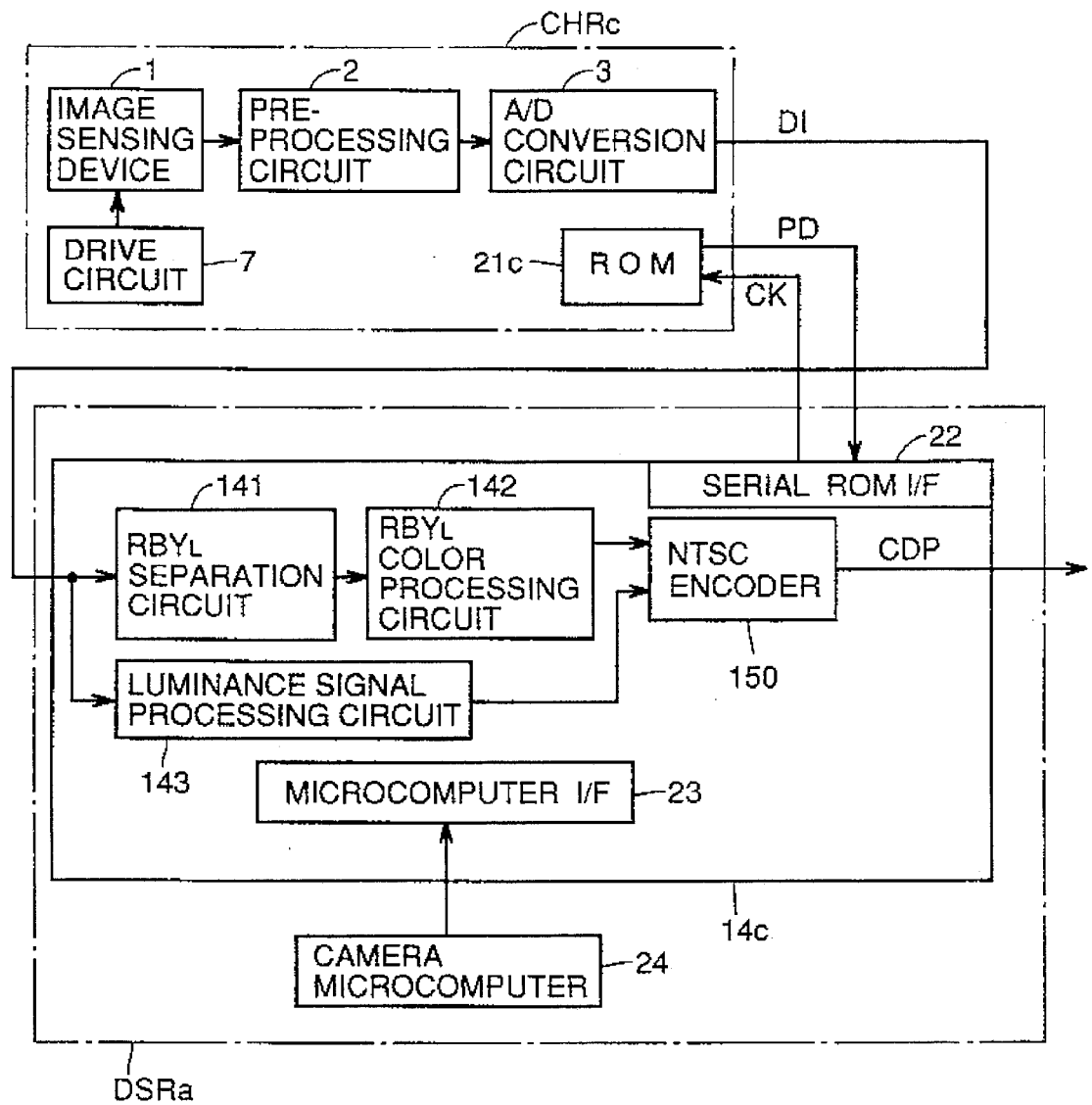

The image processing apparatus of FIG. 61 provides a video signal of a composite system. In addition to the components of the image processing apparatus of FIG. 59, the image processing apparatus of FIG. 61 includes an NTSC encoder 150. NTSC encoder 150 modulates a video signal of a color difference system and outputs a video signal CDP of a composite system. $RBY_L$ separation circuit 141, $RBY_L$ color processing circuit 142, luminance signal processing circuit 143 and NTSC encoder 150 is formed according to the FPGA logic circuit programmed by the program data stored in ROM 21c. Therefore, the image processing apparatus of FIG. 61 can output a video signal of a composite system.

The image processing apparatuses of FIGS. 59–61 are formed having digital signal processing circuit 14 of the FPGA programmed by the program data stored in ROM 21. In other words, a video signal corresponding to three types of video systems can be output using one FPGA. The image processing apparatus of the fourteenth embodiment can output a video signal corresponding to a desired video system without increasing circuit complexity.

An image processing apparatus according to a fifteenth embodiment of the present invention will be described hereinafter with reference to the block diagram of FIG. 62.

Figure 62:
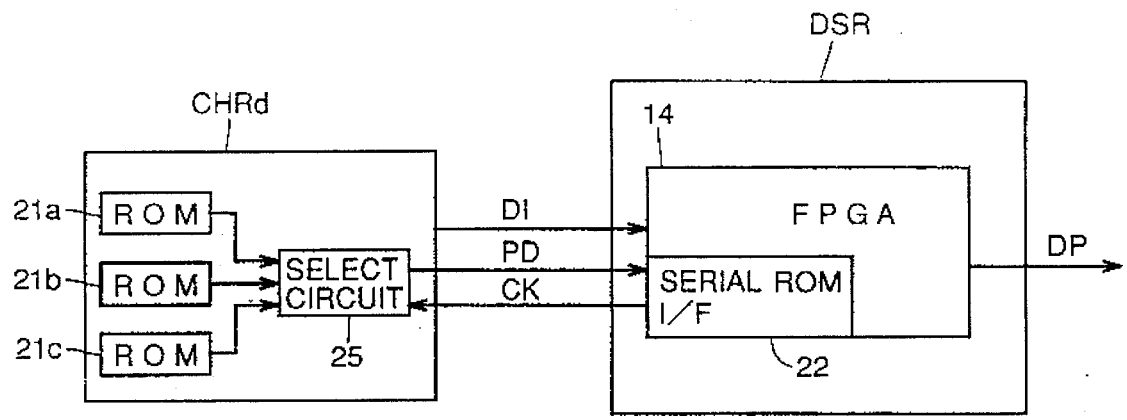
FIGS. 62 and 63 are block diagrams showing a structure of an image processing apparatus of a fifteenth embodiment and a sixteen embodiment, respectively, of the present invention.

Referring to FIG. 62, an image processing apparatus includes a camera head CHRd, and a digital signal processing unit DSR. Camera head unit CHRd includes ROMs 21a–21c, and a select circuit 25. Digital signal processing unit DSR includes a digital signal processing circuit 14 and a serial ROMI/F22.

Program data is stored in ROM 21a so that digital signal processing circuit 14 formed of a FPGA provides a digital signal of a color difference system. Program data for providing a digital video signal of a primary color system is stored in ROM 21b. Program data for providing a video signal of a composite system is stored in ROM 21c.

Select circuit 25 selects one of ROMs 21a–21c. Select circuit 25 selects a video system corresponding to data set by a dip switch (not shown) provided in camera head unit CHRd, or according to an externally applied select signal. When the power is turned on, digital signal processing circuit 14 reads out the program data from the selected ROM to form an internal logic circuit according to the logic of the program data. Then, digital signal processing circuit 14 enters an operating state to provide a video signal of a predetermined video system according to the program data. By the above-described operation, a video signal corresponding to a desired video system can be output without increasing the circuit complexity in the fifteenth embodiment.

An image processing apparatus according to a sixteenth embodiment of the present invention will be described hereinafter with reference to the block diagram of FIG. 63.

Figure 63:
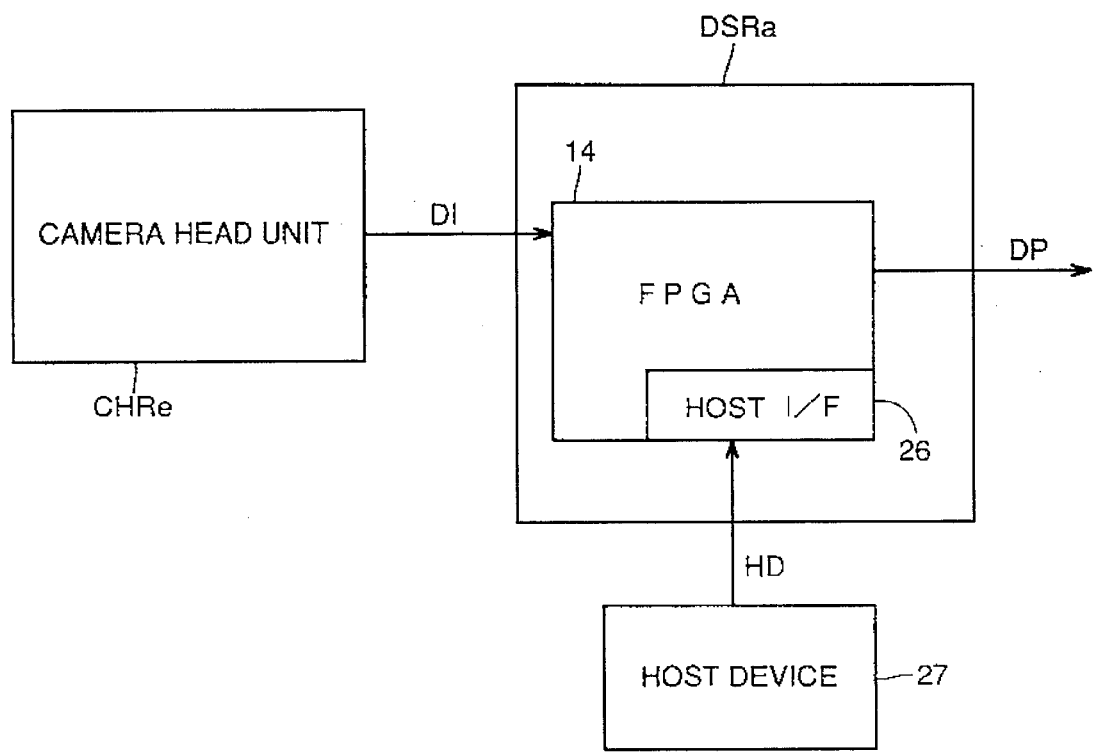

Referring to FIG. 63, an image processing device includes a camera head unit CHRe, and a digital signal processing unit DSRa. Digital signal processing unit DSRe includes a digital signal processing circuit 14 and a host I/F26.

Camera head unit CHRe is similar to that of camera head CHRa of FIG. 59 provided that ROM 21a is removed. Camera head unit CHRe converts image sensed light incident from an object into an electrical signal, and further converts that electrical signal into a digital image signal DI which is provided to digital signal processing unit DSRe. Digital signal processing unit DSRe includes a host I/F26 to transmit data with host device 27. For example, the programming data of the FPGA, a hand shake signal, and the like are provided from host device 27 to digital signal processing circuit 14 via host I/F26. Digital signal processing circuit 14 formed of a FPGA has the internal logic circuit programmed according to program data from host device 27 to form an internal logic circuit corresponding to a desired video system similar to that of the first embodiment. Digital signal processing circuit 14 converts the input digital image data DI into a digital video signal DP corresponding to a predetermined video system according to the program data output from host device 27.

Figure 64:
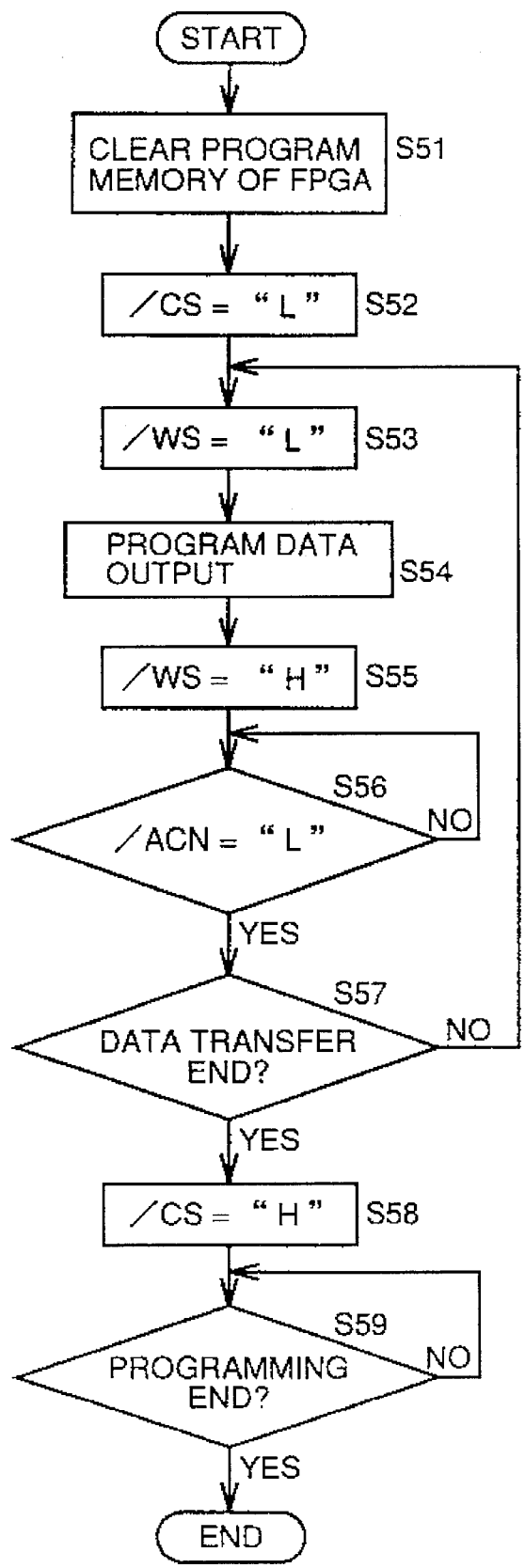
FIG. 64 is a flow chart for describing a FPGA programming method of the image processing apparatus of FIG. 63.

A FPGA programming method of the image processing apparatus of FIG. 63 will be described hereinafter with reference to the flow chart of FIG. 64.

When a chip select signal/CS ("/" implies a low active signal) attains an active state, digital signal processing circuit 14 formed of a FPGA fetches program data of 1 byte in response to a rise of a write strobe signal/WS. When this entry is completed, digital signal processing circuit 14 renders/ACN signal to an active state. A digital signal processing circuit 14 formed of a FPGA can have the internal logic circuit programmed according to the programming method shown in FIG. 64.

At step S51, the program memory of the FPGA is cleared. At step S52, chip select signal/CS is set to a L level to enter an active state. At step S53, write strobe signal/WS is set to a L level to become active. At step S54, program data is output from host device 27. At step S55, write strobe signal/WS is set to a H level to enter an inactive state. At step S56, confirmation is made whether signal/ACN attains a L level or not. This confirmation operation is repeated until a L level is attained. When signal/ACN attains a L level, the process proceeds to step S57 where confirmation is made whether the transfer of program data from host device 27 has ended or not. If program data transfer has not ended, the program proceeds to step S53 where the subsequent process is continued. If program data transfer has ended, the program proceeds to step S58 where chip select signal/CS is set to a H level and chip select signal/CS is set to an inactive state. At step S59, confirmation is made whether the programming has ended or not. The confirmation operation is repeated until the programming ends. When the programming ends, the process is completed.

According to the above-described operation, host device 27 clears the FPGA programming memory before data transfer. When data transfer ends, host device 27 waits for a signal indicating the end of programming from the FPGA, and the programming operation is completed.

According to the sixteenth embodiment, an internal logic circuit of digital signal processing circuit 14 formed of a FPGA is programmed according to program data output from an external host device, so that a logic is established corresponding to a predetermined video system according to the program data. As a result, a video signal corresponding to a desired video system can be output on the basis of programming data output from host device 27 without increasing the circuit complexity.

The present invention is not limited to the above-described sixteenth embodiment where only a host I/F is included, and a serial ROMI/F may further be included as in the fourteenth embodiment. When a ROM is included in a camera head unit, an internal logic circuit of a digital signal processing circuit can be programmed according to the program data in the ROM in the camera head unit. A video signal according to a desired video system can be output according to an external host device and an internal ROM.

An image processing apparatus according to a seventeenth embodiment will be described hereinafter with reference to the block diagram of FIG. 65. The components in the image processing apparatus of FIG. 65 corresponding to those in the image processing apparatus of FIG. 58 have the same reference characters denoted, and their description will not be repeated.

Figure 65:
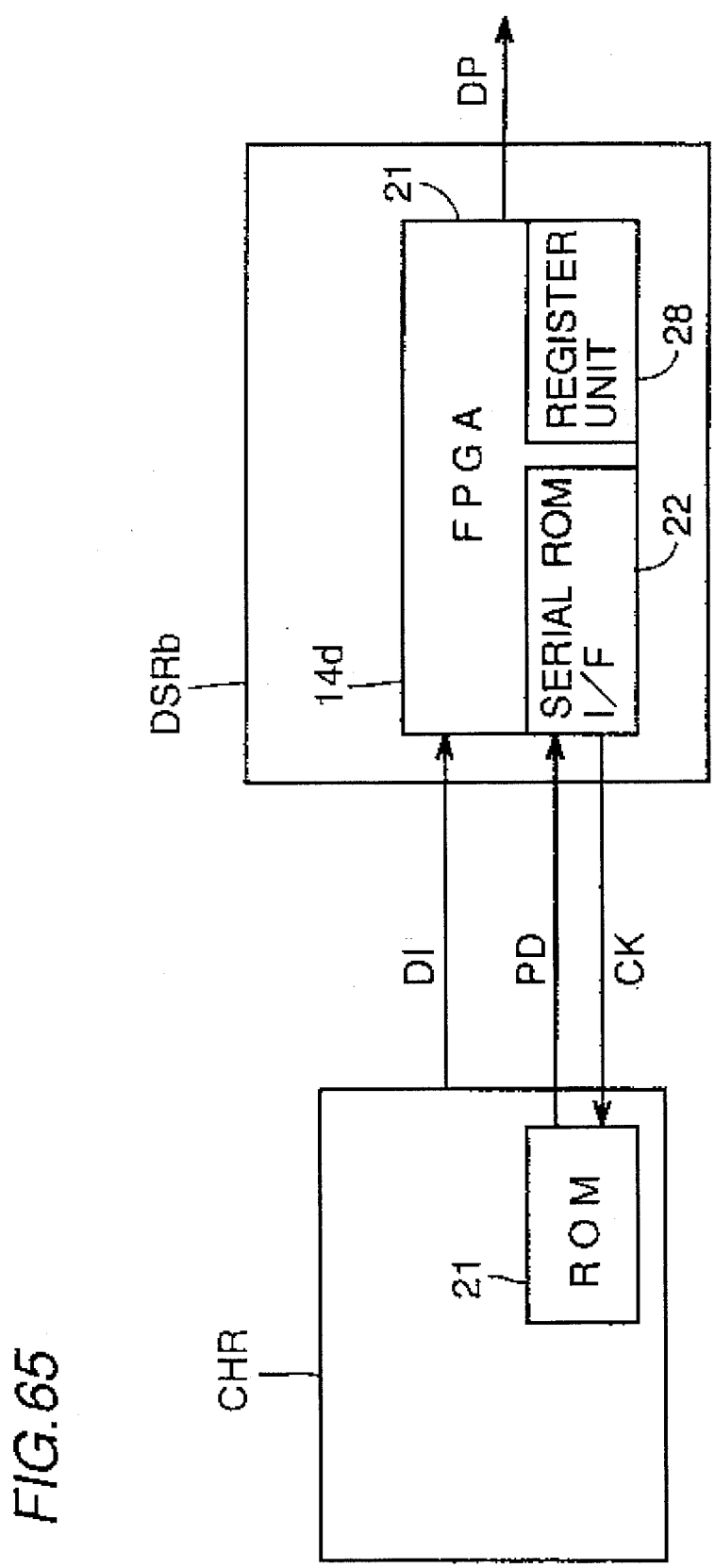
FIG. 65 is a block diagram showing a structure of an image processing apparatus according to a seventeenth embodiment of the present invention.

Referring to FIG. 65, a digital signal processing circuit 14*d* further includes a register unit 28. In digital signal processing circuit 14*d*, data such as a coefficient for correcting color reproduction in the color separation circuit and for contour correction must be initialized. Therefore, register unit 28 of digital signal processing circuit 14*d* includes a plurality of registers for setting such coefficients. These registers can have the register value set by providing an address signal, a data signal, and a strobe signal from the camera microcomputer. Therefore, an optimum adjustment data can be obtained by varying the value of the register at the time of adjustment, and modify the program data of the internal logic circuit of digital signal processing circuit 14*d* according to the obtained adjustment data.

Figure 66:
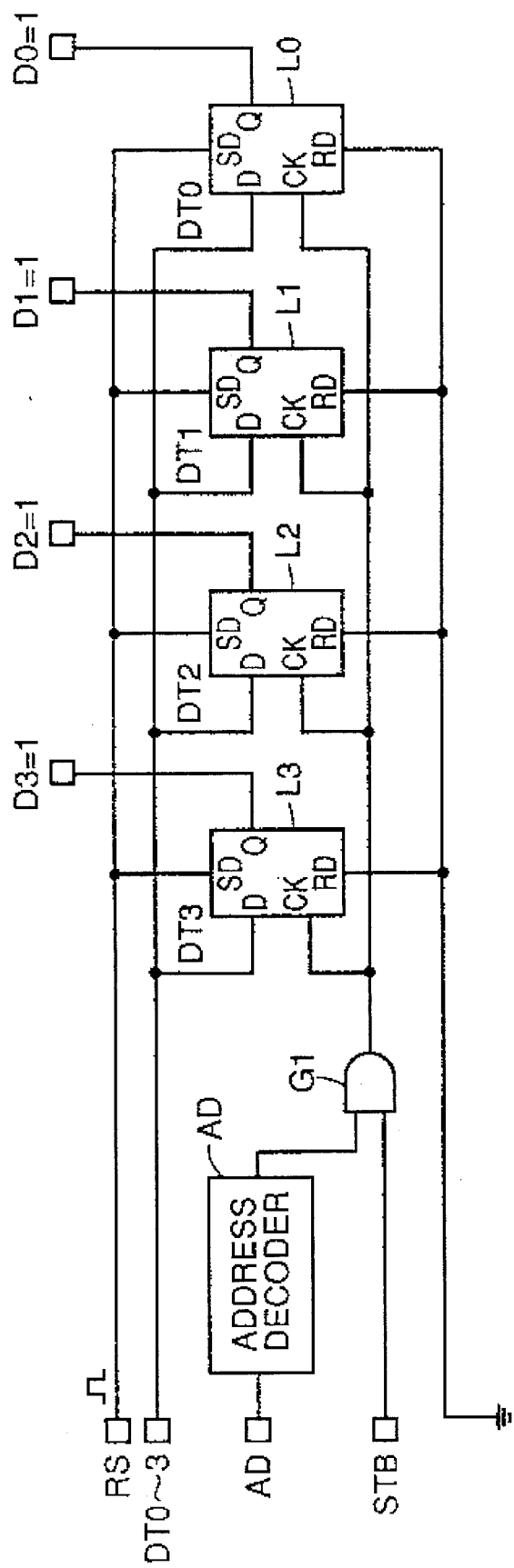
FIGS. 66 and 67 are circuit diagrams of a first and a second structure, respectively, of a register in a register unit shown in FIG. 65.
Figure 67:
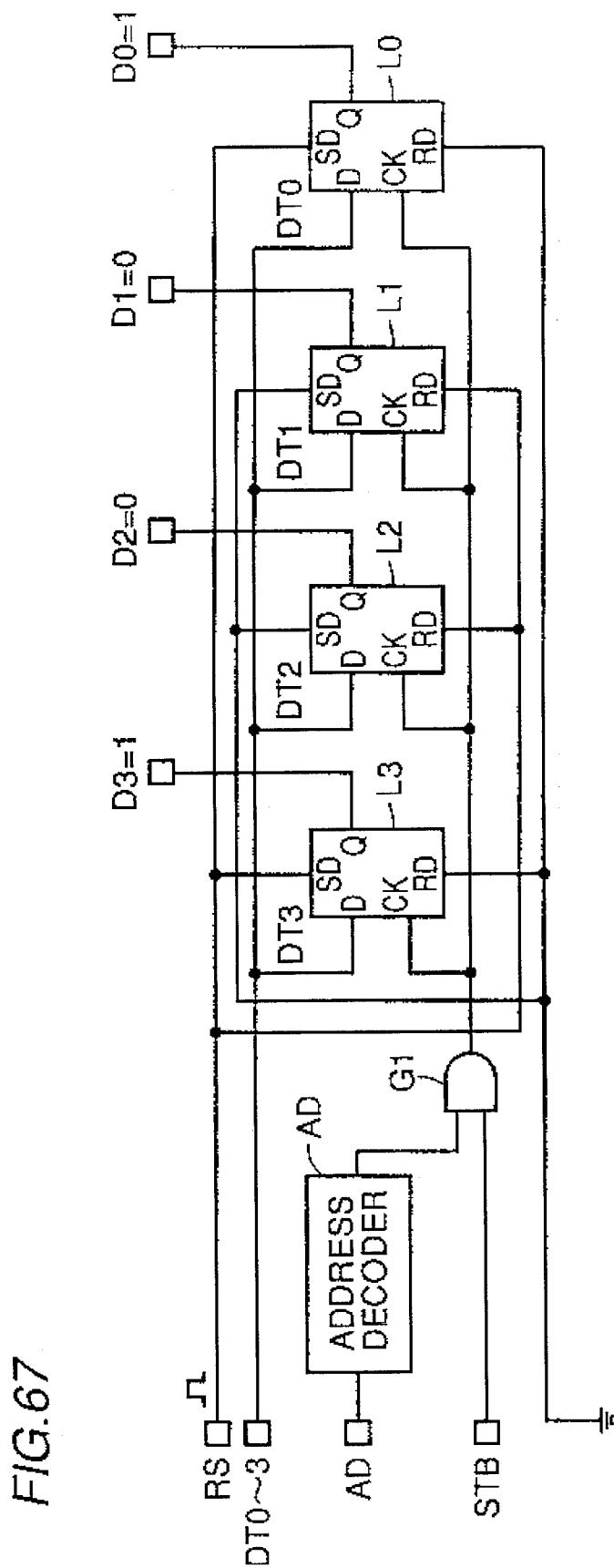

Modification of the register specification is described hereinafter. FIGS. 66 and 67 are circuit diagrams showing first and second structures of a register included in the register unit of FIG. 65.

Referring to FIG. 66, a register includes an address decoder AD, an AND gate G1, and D flipflops L0–L3.

A reset signal RS is applied to a set terminal SD of each of D flipflops L0–L3. Data TD0-TD3 are applied to respective input terminals D of D flipflops L0–L3 via a data bus. An address signal AD is applied to address decoder AD via an address bus, and a decode signal of address signal AD is applied to AND gate G1. Also, a strobe signal STB is applied to AND gate G1. The output of AND gate G1 is applied to a clock terminal CK of each of D flipflops L0–L3. Reset terminals RD of D flipflops L0–L3 are connected to ground potential GND. Specification data D0–D3 from the output terminals Q of D flipflop L0–L3 are respectively provided.

According to the above-described structure, the register shown in FIG. 66 is set to the initialization value of "1111" of specification data D0–D3.

Then, the structure of the register shown in FIG. 66 is modified to the structure of the register shown in FIG. 67. As a result, the register of FIG. 67 has the value of specification data D0–D3 set to "1001". Program data corresponding to the above-described modification of the circuit structure is generated and stored in ROM 21 of camera head unit CHR. By obtaining an optimum adjustment data during adjustment, and storing the obtained adjustment data in ROM 21, optimum initialization according to the characteristics of the camera head unit CHR is carried out by the program data of ROM 21. The internal logic circuit of digital signal processing circuit 20*f* is programmed, and initialization of each coefficient is carried out simultaneously.

Because the above-described seventeenth embodiment has program data corresponding to the above-described adjustment data stored in ROM 21 in camera head unit CHR, program data including the optimum adjustment data corresponding to the feature of the image sensing device in camera head unit CHR can be provided at the camera head unit CHR side even if camera head unit CHR is exchanged. Thus, optimum adjustment can be carried out even when camera head unit CHR is exchanged.

An image processing apparatus according to an eighteenth embodiment of the present invention is described hereinafter with reference to the block diagram of FIG. 68.

Figure 68:
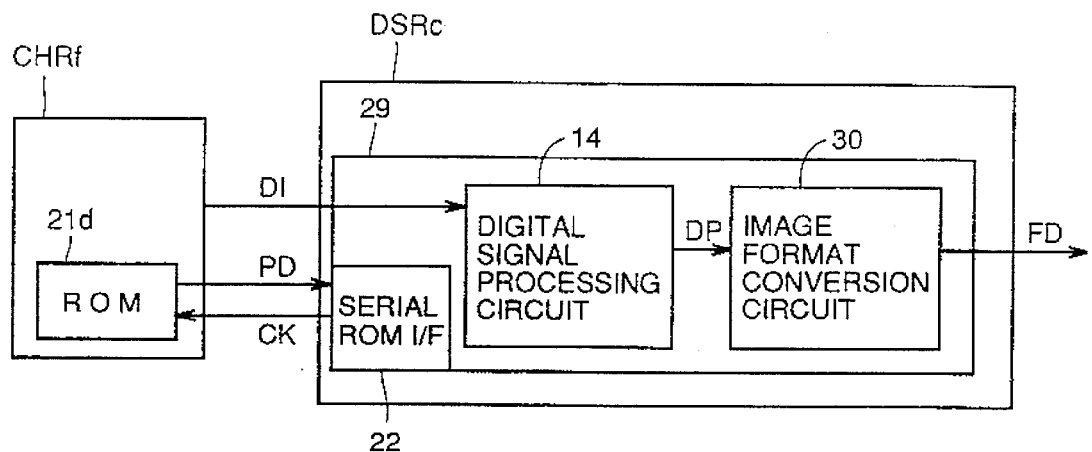
FIG. 68 is a block diagram showing a structure of an image processing apparatus according to an eighteenth embodiment of the present invention.

Referring to FIG. 68, an image processing apparatus includes a camera head unit CHRf, and a digital signal processing unit DSRc. A camera head unit CHRf includes a ROM 21*d*. Digital signal processing circuit DSRc includes a FPGA 29, and a serial ROMI/F22. FPGA29 includes a digital signal processing circuit 14 and an image conversion circuit 30.

Digital signal processing circuit 14 and image conversion circuit 30 are formed of a FPGA 29 to have a predetermined logic established by programming the logic circuit of FPGA 29. The program data of FPGA 29 is stored in ROM 21*d* in camera head unit CHRf. More specifically, ROM 21*d* stores the signal processing programming data for forming digital signal processing circuit 14 and the format conversion programming data for forming image conversion circuit 30. When the power is turned on, FPGA 29 provides to ROM 21*d* a clock CK for reading out data via serial ROMI/F22. ROM 21*d* provides to FPGA 29 via serial ROMI/F22 program data PD which is serial data in synchronization with the input clock CK. FPGA 29 forms an internal logic circuit according to the input program data to program digital signal processing circuit 14 and image conversion circuit 30 corresponding to the predetermined logic. The above-described operation is automatically carried out by FPGA 29.

FPGA 29 enters an operating state when the programming of the internal logic circuit is completed. More specifically, digital signal processing circuit 14 converts digital image signal DI output from camera head unit CHRf into a video signal corresponding to a predetermined video system according to the signal processing program data stored in ROM 21d. The inverted video signal is output to image conversion circuit 30. Image conversion circuit 30 converts the input video signal into image data FD of a format corresponding to a predetermined format conversion system according to the format conversion program data stored in ROM 21d. The data of ROM 21d is automatically converted and generated according to the net list of the logic circuit by a FPGA development device.

A specific structure of the image processing circuit of FIG. 68 will be described hereinafter. In each of the following embodiments, an arbitrary structure can be selected by modifying the program data stored in ROM 21d.

Figure 69:
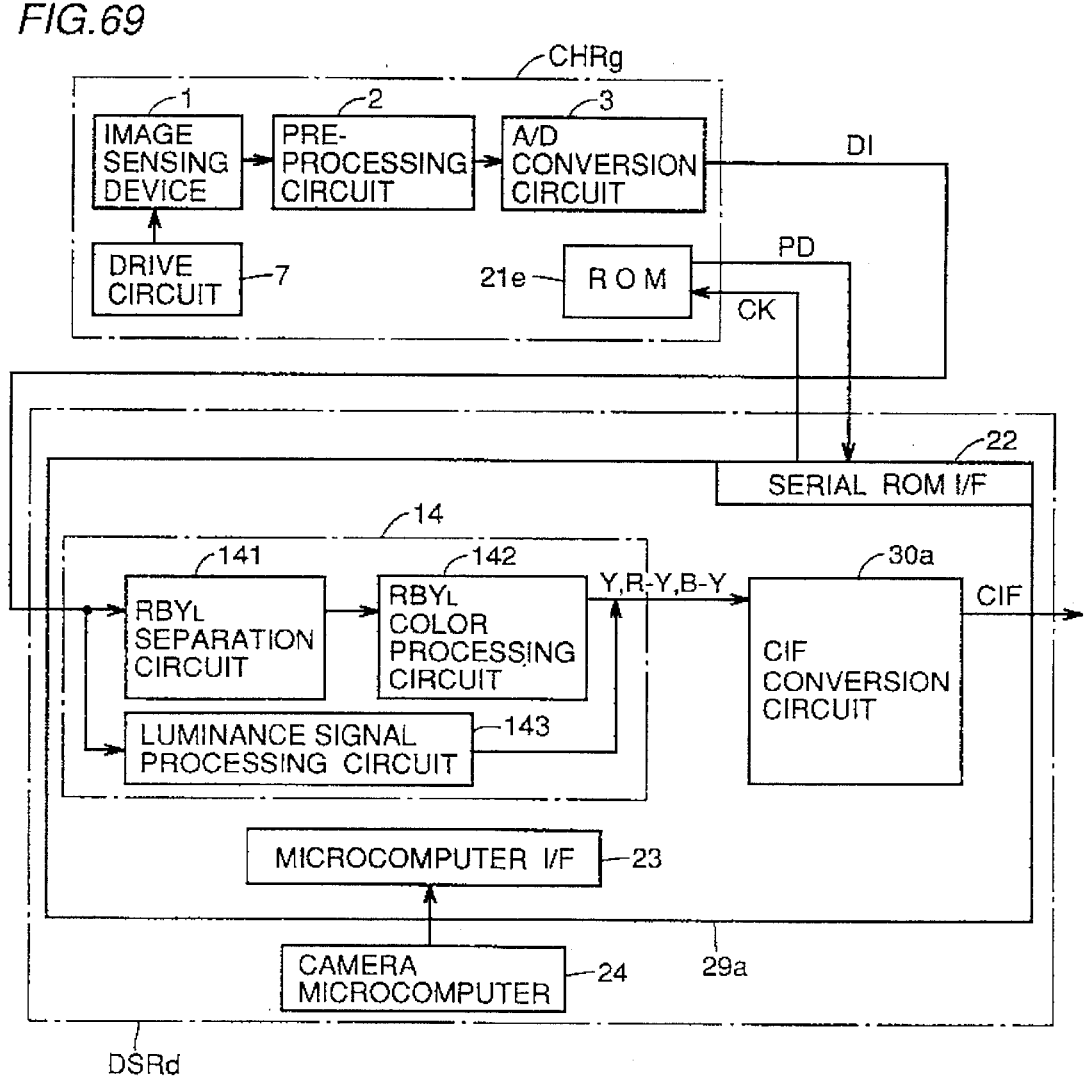
FIGS. 69 and 70 are block diagrams showing first and second specific structures, respectively, of the image processing apparatus of FIG. 68.

FIG. 69 is a block diagram showing a structure of a first specific example of the image processing apparatus of FIG. 68. The image processing apparatus of FIG. 69 converts a digital image signal into a digital video signal of a color difference system, and then converts the video signal into image data of a CIF format.

Referring to FIG. 69, an image processing apparatus includes a camera head unit CHRg and a digital signal processing unit DSRd. Camera head unit CHRg includes an image sensing device 1, a pre-scanning circuit 2, an A/D conversion circuit 3, a drive circuit 7, and a ROM 21e. Digital signal processing unit DSRd includes a FPGA 29a, a serial ROMI/F22, and a camera microcomputer 24. FPGA 29a includes a digital signal processing circuit 14, a CIR conversion circuit 30a and a microcomputer I/F23. Image sensing device 1 is a CCD of 320000 pixels. ROM 21e stores signal processing program data for forming digital signal circuit 14 that outputs a digital video signal of a color difference system and an image conversion program data for forming a CIF conversion circuit providing an image data of a CIF format. FPGA 29a programs the internal circuit according to the program data stored in ROM 21e via serial ROMI/F22, and forms a $RBY_L$ separation circuit 141, a $RBY_L$ color processing circuit 142, a luminance signal processing circuit 143, and a CIF conversion circuit 30a. Similar to the image processing apparatus of FIG. 59, the present digital signal processing circuit 14 converts digital image data into a digital video signal of a color difference system, and provides the same to CIF conversion circuit 30a. CIF conversion circuit 30a converts the digital video signal of a color difference system into image data of a CIF format.

The case of a CIF format conversion will be described when an image sensing device 1 of 320000 pixels is used. The number of pixels of image sensing device 1 is 512(h)×582(v). According to drive circuit 7, non-interlace read out is carried out from image sensing device 1. The non-interlace read out signal is converted into a video signal of a color difference system by pre-scanning circuit 2, A/D conversion circuit 3, and digital signal processing circuit 14. As a result, luminance data Y, color data (dot sequential color difference) R-Y, and B-Y of 512(H)×291(V) pixels are obtained. The obtained luminance data Y and color data R-Y and B-Y are converted into image data CIF of a CIF format of the resolution of 352(H)×288(V) by CIF conversion circuit 30a.

A second specific example of the image processing apparatus of FIG. 68 will be described hereinafter with reference to the block diagram of FIG. 70. The image processing apparatus of FIG. 70 converts digital image data into a digital video data of a color difference system, and converts the same further into image data of a VGA (Video Graphic Array) format.

Figure 70:
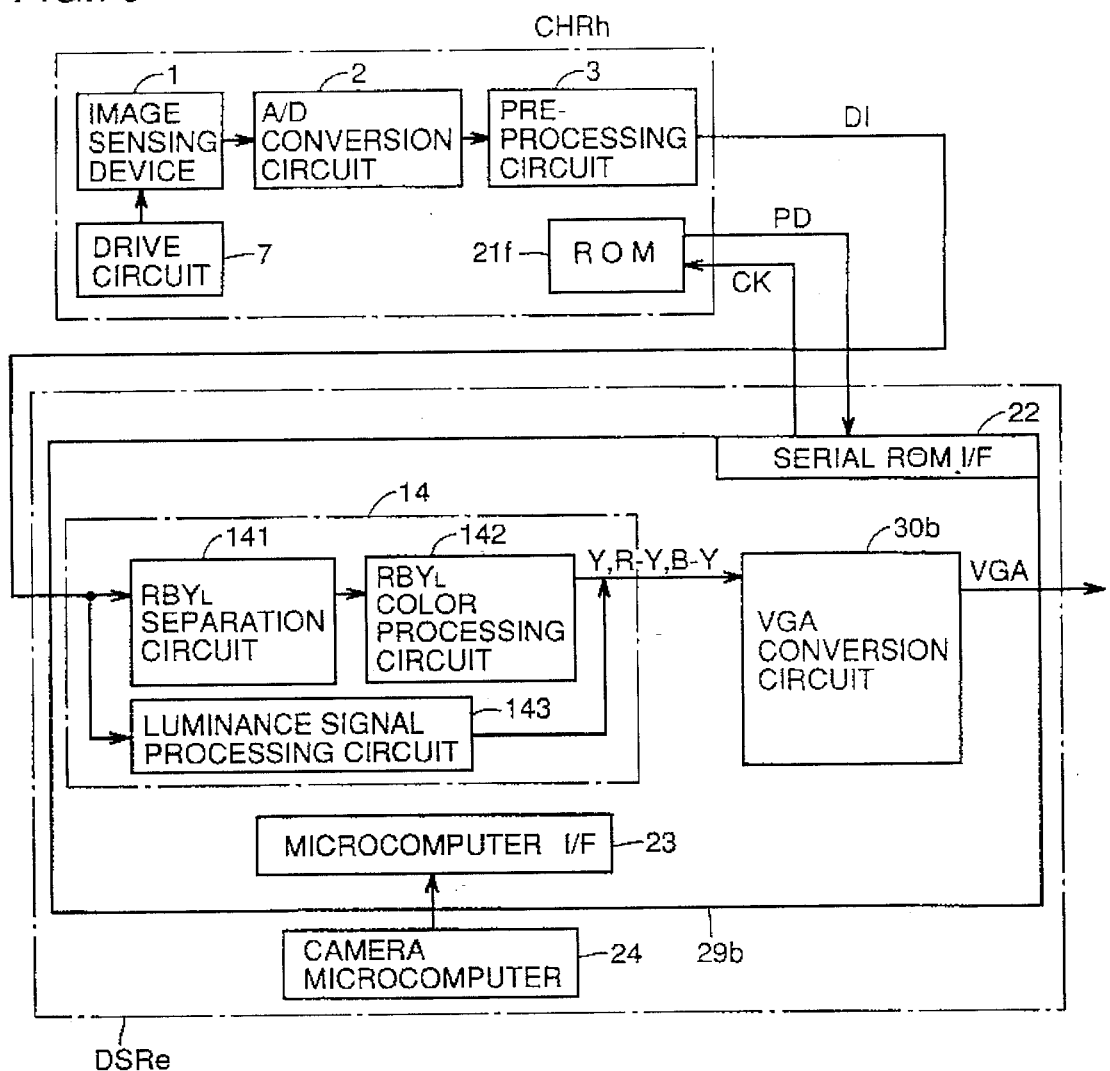
Figure 71:
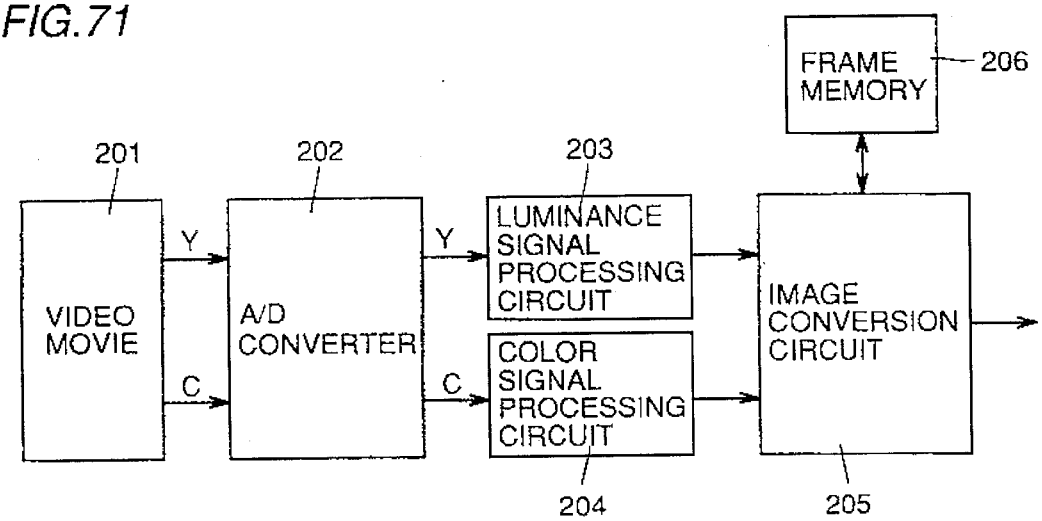
FIG. 71 is a block diagram showing a structure of a conventional image processing apparatus.

The image processing apparatus of FIG. 70 differs from that of FIG. 69 in that the number of pixels of the image sensing device is changed from 320000 to 410000, CIF conversion circuit 30a is modified to a VGA conversion circuit 30b, and ROM21e storing signal processing program data corresponding to a video signal of a color difference system and image conversion programming data is modified to a ROM 21f storing signal processing program data corresponding to a video signal of a color difference system and an image conversion program data corresponding to a VGA format. The remaining components are similar to those of the image processing apparatus of FIG. 69 which have the same reference characters denoted. Their description will not be repeated.

FPGA 29b receives program data PD from ROM 21f via serial ROMI/F22 to program the internal logic circuit, and forms a video signal processing circuit 14 that provides a video signal of a color difference system and a VGA conversion circuit 30b that provides image data of a VGA format. A signal read out from image sensing device 1b by drive circuit 7 is converted into digital image data DI by pre-processing circuit 2 and A/D conversion circuit 3, and then converted into luminance data Y and color data R-Y and B-Y of 768(H)×247(V) by digital signal processing circuit 32 to be provided to VGA conversion circuit 30b. VGA conversion circuit 30b removes the top 4 lines and the bottom 3 lines in the vertical direction, and reduces 12 dots to 10 dots in the horizontal direction, and provides image data VGA of a 640(H)×480(V) resolution corresponding to a VGA format.

According to the above-described eighteenth embodiment, a digital signal processing circuit corresponding to a desired video system and an image conversion circuit corresponding to a desired image conversion system can be formed by a FPGA to provide a video signal corresponding to a desired video system and image conversion system without increasing the circuit complexity. When image format is to be converted using an image sensing device differing in the number of pixels, a ROM storing program data corresponding to a desired image conversion system is provided in a camera head, so that exchange of an image sensing device and modification of the logic circuit of an image format conversion circuit can be carried out simultaneously by just exchanging a camera head unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:

image signal output means for converting sensed light incident from an object into a digital video signal, signal processing means for applying a signal process on said digital video signal to output a digital video signal, first conversion means for converting said digital video signal into image data having a first image format, second conversion means for converting said image data of the first format into image data of a second format, the second format being a modified version of the first format, conversion control means, responsive to a format specification signal that specifies a format conversion, for selecting and controlling the operation of only said first conversion means to convert the image data into the first format and for selecting and controlling the operation of both the first and second conversion means to convert the image data into the second format, and output means, connected to each of the first and second conversion means, for outputting the converted image data in one of the first and second formats.

2. The image processing apparatus according to claim 1, further comprising:

detection means for detecting a feature of an image from said digital video signal, wherein said conversion control means selects at least one of the first and second conversion means for performance of at least one of a plurality of image format conversions according to the feature detected by said detection means.

3. The image processing apparatus according to claim 1, wherein said first conversion means converts said digital video signal into image data corresponding to a CIF format of 352 pixels×288 lines, and said second conversion means receives said image data corresponding to the CIF format output from said first conversion means and converts said image data corresponding to the CIF format into image data corresponding to another format, and said conversion control means selectively provides said converted image data to the output means, corresponding to one of the CIF format from the first conversion means and corresponding to the another format from the second conversion means.

4. The image processing apparatus according to claim 3, wherein said second conversion means comprises ½ conversion means for converting said image data corresponding to the CIF format into image data that is reduced by ½ in a horizontal direction and a vertical direction to generate image data corresponding to a QCIF format of 176 pixels× 144 lines.

5. The image processing apparatus according to claim 1, further comprising:

third conversion means for converting said image data of the second format into image data of a third format, the third format being a modified version of the second format, wherein the conversion control means, responsive to a format specification signal that specifies a format conversion, further selects and controls the operation of each of said first, second and third conversion means to convert the image data into the third format and wherein the output means is further connected to the third conversion means and outputs the converted image data in one of the first, second and third formats.

6. The image processing apparatus according to claim 5, wherein at least one of said first, second and third conversion means includes, vertical conversion means for receiving said digital video signal and for carrying out conversion in the vertical direction of said image data corresponding to the predetermined image format, and wherein at least one of said first, second and third conversion means includes, horizontal conversion means connected in series with said vertical conversion means for carrying out conversion in the horizontal direction of said image data corresponding to the predetermined image format, wherein said vertical conversion means generates expanded image data having scanning lines expanded by interpolating said digital video signal and provides an expanded data control signal for indicating a valid timing of said expanded image data when the number of scanning lines of said digital video signal is smaller than that of said image data corresponding to the predetermined image format.

7. The image processing apparatus according to claim 5, wherein at least one of said first, second and third conversion means includes, vertical conversion means for receiving said digital video signal and for carrying out conversion in the vertical direction of said image data corresponding to the predetermined image format, and wherein at least one of said first, second and third conversion means includes, horizontal conversion means connected in series with said vertical conversion means for carrying out conversion in the horizontal direction of said image data corresponding to the predetermined image format, wherein said horizontal conversion means provides compressed image data having said digital video signal compressed in the horizontal direction and provides a compressed data control signal indicating the valid timing of said compressed image data when the number of dots of said digital video signal in the horizontal direction is greater than that of said image data corresponding to the predetermined image format.

8. The image processing apparatus according to claim 7, further comprising:

data control means responsive to said compressed data control signal for sequentially storing said compressed image data and providing said stored compressed image data when one line of said compressed image data is obtained.

9. The image processing apparatus according to claim 5, wherein said first conversion means comprises square pixel conversion means for converting said digital video signal into image data of a first format corresponding to a square pixel.

10. The image processing apparatus according to claim 9, wherein said first conversion means converts said digital video signal output from said signal processing means into image data of a first format corresponding to said square pixel, second conversion means converts said image data of the first format into image data of a second format in which the number of lines and the number of pixels in the second format are reduced by ½ with respect to the first format, and third conversion means converts said image data of the second format into image data of a third format in which the number of lines and the number of pixels in the third format are reduced by ½ with respect to the second format, and conversion control means responsive to a format specification signal for specifying a conversion format for controlling the conversion operation of said first, second and third conversion means.

11. The image processing apparatus according to claim 10, wherein said square pixel conversion means further comprises contour enhancement means for enhancing the contour of converted image data.

12. The image processing apparatus according to claim 10, wherein said signal processing means outputs said digital video signal in synchronization with a predetermined clock signal, wherein said first conversion means further comprises
first data conversion means for converting said digital video signal input in synchronization with said predetermined clock signal into image data of said first format, and outputting said image data of the first format in synchronization with said predetermined clock signal, and
first timing signal generation means for generating a first timing signal indicating the valid timing of said image data of the first format, wherein said second conversion means further comprises
second data conversion means for converting said image data of the first format input in synchronization with said predetermined clock signal into image data of the second format, and outputting said image data of the second format in synchronization with said predetermined clock signal, and
second timing signal generation means for generating a second timing signal indicating the valid timing of said image data of the second format, and wherein said third conversion means further comprises
third data conversion means for converting said image data of the second format input in synchronization with said predetermined clock signal into image data of the third format, and outputting said image data of the third format in synchronization with said predetermined clock signal, and
third timing signal generation means for generating a third timing signal indicating the valid timing of said image data of the third format.

13. The image processing apparatus according to claim 12, wherein said second data conversion means selects image data of one of an odd number and an even number field of said image data of the first format, for converting the number of lines to ½ the number of lines in the first format, wherein said third data conversion means comprises horizontal calculation means for converting the number of pixels in the horizontal direction of said image data of the second format to ½ the number of pixels in the second format by a calculation process, wherein said horizontal calculation means selects either image data of two adjacent pixels or image data of two pixels spaced apart by 1 pixel.

14. The image processing apparatus according to claim 12, wherein said third data conversion means further comprises:

horizontal calculation means for converting the number of pixels in the horizontal direction of said image data of the second format to ½ the number of pixels in the second format by a calculation process, a line memory for storing image data having the number of pixels in the horizontal direction converted to ½ the number of pixels in the second format by said horizontal calculation means, and vertical calculation means for converting the number of lines in the vertical direction of said image data of the second format to ½ the number of the lines in the second format by carrying out a calculation process on the image data output from said horizontal calculation means and said line memory.

15. The image processing apparatus according to claim 14, wherein said first format comprises a VGA format with a resolution of 640×480 pixels.

16. The image processing apparatus according to claim 1, wherein one of said conversion means further comprises:

programmable image conversion logic means, and programming means for programming a predetermined logic in said programmable image conversion logic means, wherein said programmable image conversion logic means converts said digital video signal into image data corresponding to a predetermined image format according to said predetermined logic programmed by said programming means, and outputs said image data corresponding to the predetermined image format.

17. The image processing apparatus according to claim 16, further comprising:

detection means for detecting a feature of an image from said digital video signal, wherein said programming means determines an image format conversion process according to said detected feature for programming a predetermined logic that realizes said image format conversion process in said programmable image conversion logic means, wherein said programmable image conversion logic means carries out said image format conversion process on said digital ideo signal output from said signal processing means according to said predetermined logic programmed by said programming means, and outputs said image data corresponding to said image format.

18. The image processing apparatus according to claim 16, wherein said signal processing means further comprises programmable signal processing logic means, wherein said programming means programs a predetermined logic in said programmable signal processing logic means and said programmable image conversion logic means according to an externally input control data.

19. The image processing apparatus according to claim 18, wherein said image signal output means further comprises image sensing means having a predetermined resolution, wherein said control data comprises data concerning the resolution of said image sensing means, wherein said programming means programs a predetermined logic according to the resolution of said image sensing means in said programmable signal processing logic means and said programmable image conversion logic means, wherein said programmable signal processing logic means carries out a signal process according to the resolution of said image sensing means, and wherein said programmable image conversion logic means carries out an image format conversion process according to the resolution of said image sensing means.

20. The image processing apparatus according to claim 16, wherein said image signal output means further comprises:

still picture output means for providing a digital image signal of a still picture, and a moving picture output means for providing a digital video signal of a moving picture, and wherein said image processing means further comprises
select means for selectively outputting one of said digital image signal of a moving picture output from said moving picture output means and said digital image signal of a still picture output from said still picture output means, and wherein said signal processing means is a programmable signal processing means, wherein said image processing apparatus further comprises control means for:
controlling said select means such that said digital video signal of a still picture provided from said still picture output means is output,
controlling said programming means such that a signal process and an image format conversion process that suits said digital image signal of a still picture output from said still picture output means are programmed in said programmable signal process logic means and said programmable image conversion logic means when said digital video signal of a moving picture output from said moving picture output means attains a blanking period,
controlling said select means such that said digital image signal of a moving picture output from said moving picture output means is output, and
controlling said program means such that a signal process and an image format conversion process that suits said digital image signal of a moving picture output from said moving picture output means are programmed in said programmable signal process logic means and said programmable image conversion logic means.

21. The image processing apparatus according to claim 16, further comprising:

memory means for storing signal process program data corresponding to a predetermined video system and image conversion program data corresponding to a predetermined image conversion system, wherein said signal processing means is a programmable signal processing means, wherein said image processing apparatus is separated into an image sensing unit including said image signal output means and said memory means, and a signal processing unit including said programmable signal processing means, said programmable image conversion logic means, and said program means, wherein said image processing apparatus further comprises:
transfer means for transferring said program data from said image sensing unit to said programmable signal processing unit,
wherein said programmable signal processing means has a predetermined logic programmed according to said signal processing program data stored in said memory means for converting said digital image signal into a digital video signal corresponding to a predetermined video system and outputting said digital video signal,
wherein said programmable image conversion logic means has a predetermined logic programmable by said conversion program data stored in said memory means for converting said digital video signal output from said programmable signal processing means into image data of a format corresponding to said predetermined image conversion system.

* * * * *